(12) United States Patent
Tazawa

(10) Patent No.: US 9,535,191 B2
(45) Date of Patent: Jan. 3, 2017

(54) OPTICAL ELEMENT, METHOD FOR PRODUCING THE SAME, AND DISPLAY APPARATUS

(75) Inventor: Hiroshi Tazawa, Miyagi (JP)

(73) Assignee: Sony Corporation, Tokyo (JP)

( * ) Notice: Subject to any disclaimer, the term of this patent is extended or adjusted under 35 U.S.C. 154(b) by 1192 days.

(21) Appl. No.: 12/822,895

(22) Filed: Jun. 24, 2010

(65) Prior Publication Data

US 2011/0002041 A1 Jan. 6, 2011

(30) Foreign Application Priority Data

Jul. 3, 2009 (JP) ................ P2009-159357
Jun. 8, 2010 (JP) ................ P2010-131534

(51) Int. Cl.
*G02B 1/11* (2015.01)
*G02B 1/118* (2015.01)

(52) U.S. Cl.
CPC ................... *G02B 1/118* (2013.01)

(58) Field of Classification Search
CPC ..... G02B 27/0006; G02B 27/26; G02B 27/00; G02B 1/043; G02B 1/04; G02B 1/111; G02B 1/11; G02B 1/118; G02B 1/105; G02B 1/113; G02B 1/115; G02B 5/3014; G02B 5/3025; G02B 5/045; G02B 5/0808; G02B 5/30; G02B 5/3033; G02B 5/3041; G02B 3/00; G02B 3/0006
USPC .................... 359/577–614; 428/144
See application file for complete search history.

(56) References Cited

U.S. PATENT DOCUMENTS

| 2002/0034008 | A1 | 3/2002 | Ohishi et al. |
| 2006/0216476 | A1* | 9/2006 | Ganti ............ C23C 18/02 428/143 |
| 2007/0178301 | A1* | 8/2007 | Camelio ......... C03C 17/3441 428/336 |
| 2008/0107868 | A1* | 5/2008 | Kuroda .......... G02B 1/118 428/141 |
| 2008/0129188 | A1* | 6/2008 | Egi et al. ........... 313/496 |
| 2008/0265387 | A1* | 10/2008 | D'Urso ............ B05D 5/083 257/678 |
| 2008/0304155 | A1 | 12/2008 | Endoh et al. |

(Continued)

FOREIGN PATENT DOCUMENTS

| EP | 2128659 | 12/2009 |
| JP | 07-333404 | 12/1995 |

(Continued)

OTHER PUBLICATIONS

Machine Translation of JP2001-315247.*

(Continued)

*Primary Examiner* — Bumsuk Won
*Assistant Examiner* — Jeffrey Madonna
(74) *Attorney, Agent, or Firm* — K&L Gates LLP

(57) ABSTRACT

An optical element having an anti-reflection function includes a base having a main surface, and a plurality of projecting or recessed structures arranged on the main surface of the base at a fine pitch equal to or less than the wavelength of visible light, wherein the main surface of the base, the main surface having the structures thereon, has hydrophilicity, and a contact angle of the main surface of the base, the main surface having the structures thereon, to pure water is 30° or less.

14 Claims, 36 Drawing Sheets

(56) References Cited

U.S. PATENT DOCUMENTS

| | | | |
|---|---|---|---|
| 2009/0041984 A1* | 2/2009 | Mayers | C03C 17/007 428/141 |
| 2009/0185276 A1* | 7/2009 | Matsuhira | 359/601 |
| 2010/0119774 A1* | 5/2010 | Ogawa | C03C 17/006 428/142 |
| 2010/0176304 A1* | 7/2010 | Sogard | G02B 1/10 250/372 |
| 2010/0304123 A1* | 12/2010 | Yoneyama | B32B 17/10018 428/317.9 |
| 2010/0323165 A1* | 12/2010 | Sakuma | G02B 1/118 428/167 |
| 2011/0008630 A1* | 1/2011 | Okazaki | C03C 17/30 428/447 |
| 2012/0009429 A1* | 1/2012 | Shmueli | C03C 17/3411 428/447 |

FOREIGN PATENT DOCUMENTS

| | | | |
|---|---|---|---|
| JP | 10-166495 | | 6/1998 |
| JP | 2001-315247 | * | 11/2001 |
| JP | 2003-239342 | | 8/2003 |
| JP | 2007-187868 | | 7/2007 |
| JP | 2007-313686 | | 12/2007 |
| JP | 2008-158293 | | 7/2008 |
| JP | 2008-304637 | | 12/2008 |
| JP | 4398507 | | 1/2010 |
| WO | 2008/023816 | | 2/2008 |
| WO | 2008-096872 | | 8/2008 |
| WO | 2008/096872 | | 8/2008 |

OTHER PUBLICATIONS

European Search Report for corresponding EP 10 00 6546 issued on Oct. 7, 2010.

Japanese Office Action issued Mar. 4, 2014 in corresponding Japanese Patent Application No. 2010-131534.

Japanese Office Action issued Nov. 25, 2014 in corresponding Japanese Application No. 2010-131534.

* cited by examiner

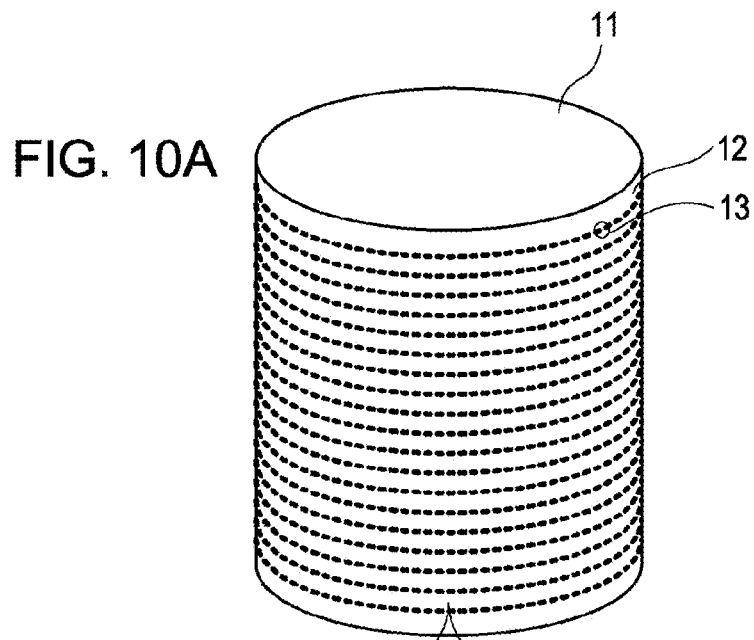
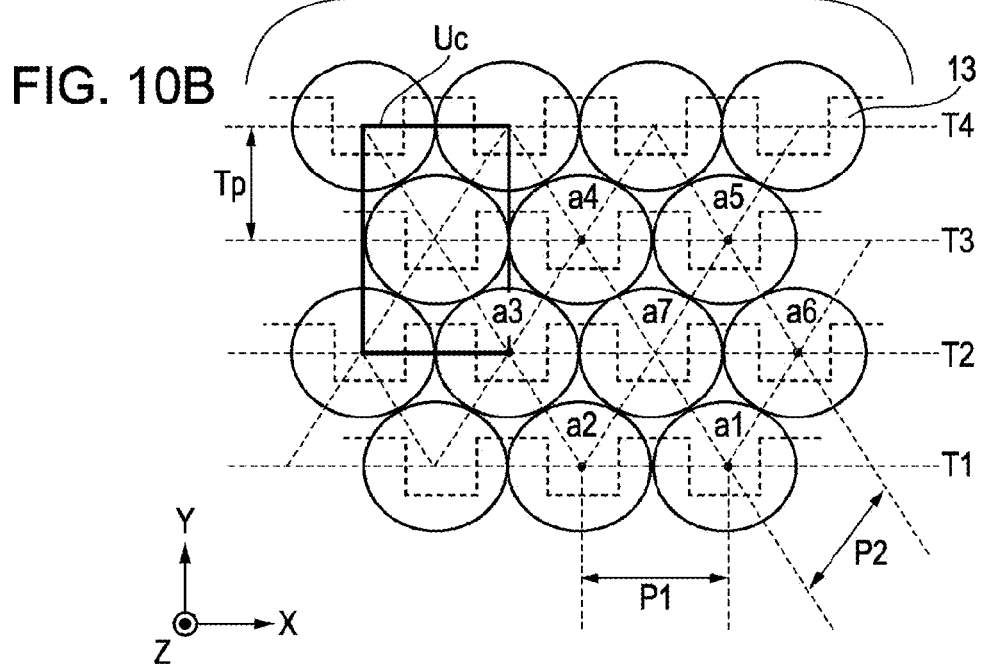

FIG. 17A
FIG. 17B
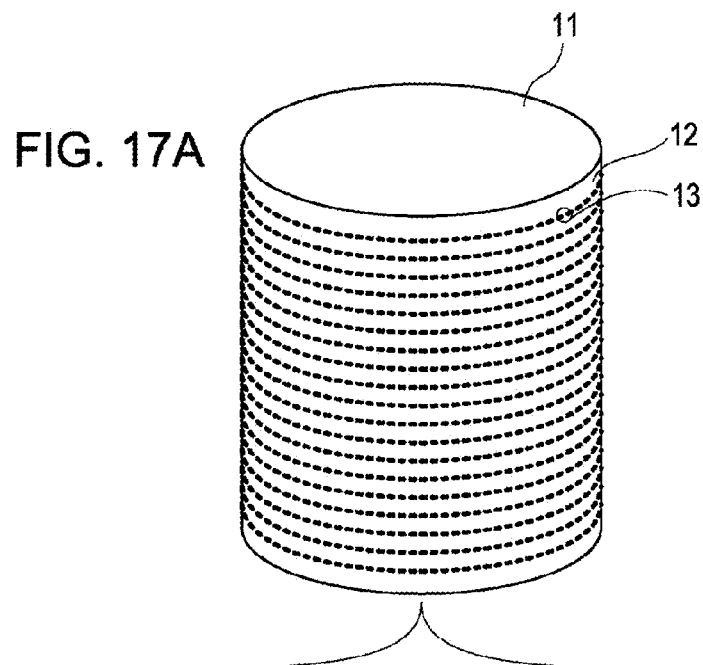
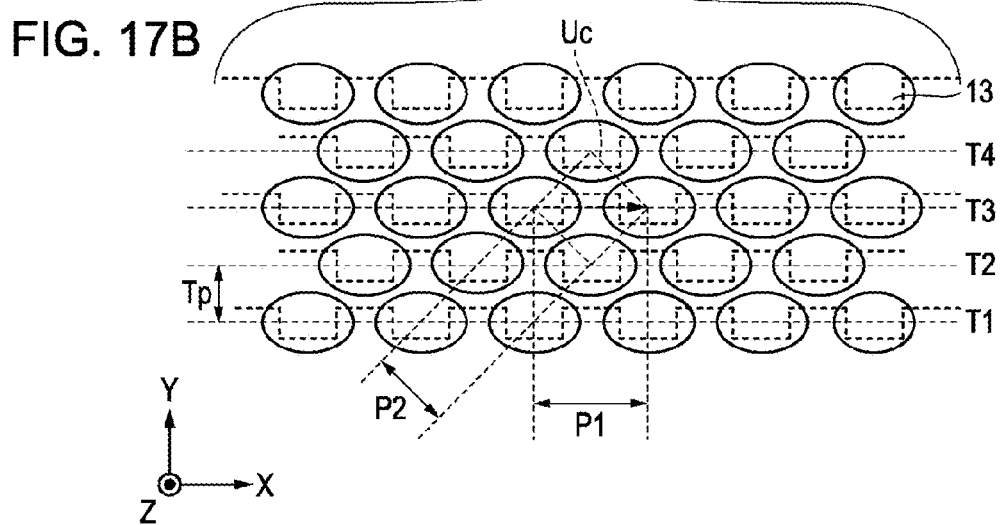

OPTICAL ELEMENT, METHOD FOR PRODUCING THE SAME, AND DISPLAY APPARATUS

CROSS REFERENCES TO RELATED APPLICATIONS

The present application claims priority to Japanese Priority Patent Application JP 2009-159357 filed in the Japan Patent Office on Jul. 3, 2009, and JP 2010-131534 filed in the Japan Patent Office on Jun. 8, 2010, the entire content of which is hereby incorporated by reference.

BACKGROUND

The present application relates to an optical element having an anti-reflection function, a method for producing the same, and a display apparatus including the same. More specifically, the present invention relates to an optical element in which a large number of structures, each of which is composed of a projection or a recess, are arranged on a surface at a fine pitch equal to or less than the wavelength of visible light, and a method for producing the same.

Some existing optical elements including a light-transmissive substrate composed of glass or plastic are subjected to a surface treatment for suppressing surface reflection of light. An example of such a surface treatment is to form fine and dense irregularities (moth eyes) on a surface of an optical element (refer to, for example, "Optical and Electro-Optical Engineering Contact", Vol. 43, No. 11 (2005), pp. 630-637).

In general, when a periodically irregular shape is provided on a surface of an optical element and light is transmitted through the surface, diffraction occurs and rectilinear components of the transmitted light significantly decrease. However, when the pitch of the irregular shape is shorter than the wavelength of light to be transmitted, diffraction does not occur. For example, when the irregular shape is a rectangle described below, it is possible to achieve an anti-reflection effect for light having a single wavelength corresponding to the pitch or the depth of the irregular shape.

A moth-eye structure having a fine tent shape (pitch: about 300 nm, depth: about 400 nm) is disclosed as a moth-eye structure prepared by using an electron beam exposure technique (refer to, for example, NTT Advanced Technology Corporation, "Master mold for forming anti-reflective structure (moth eye) independent from wavelength", [online], [searched on Feb. 27, 2008], Internet <http://keytech.ntt-at.co.jp/nano/prd_0033.html>). In this moth-eye structure, a high-performance anti-reflection characteristic of a reflectivity of 1% or less can be obtained.

In addition, hanging bell-shaped and truncated elliptical cone-shaped moth-eye structures are disclosed as moth-eye structures prepared by a method in which a process for preparing a master of an optical disk and an etching process are combined (refer to, for example, PCT International Publication No. 08/023816 Pamphlet). In these structures, anti-reflection characteristics close to those of the moth-eye structure prepared by the electron beam exposure technique are obtained.

SUMMARY

Recently, in the moth-eye structures described above, it is desirable that when stains such as fingerprints adhere to the structures, the stains can be removed by wiping with water. However, since fine structures are densely arranged in such a moth-eye structure, when stains such as fingerprints adhering to the moth-eye structure, the stains enter inside the structure by capillary action and become difficult to remove. Although such stains can be wiped off after components of the stains are dissolved in a solvent such as an alcohol, this is not a preferable method and has physical and environmental influences.

It is desirable to provide an optical element in which stains such as fingerprints adhering to a surface thereof can be easily removed by wiping with water, a method for producing the same, and a display apparatus including the same.

According to an embodiment, there is provided an optical element having an anti-reflection function, including a base having a main surface, and a plurality of projecting or recessed structures arranged on the main surface of the base at a fine pitch equal to or less than the wavelength of visible light, wherein the main surface of the base, the main surface having the structures thereon, has hydrophilicity, and a contact angle of the main surface of the base, the main surface having the structures thereon, to pure water is 30° or less.

According to an embodiment, there is provided a method for producing an optical element having an anti-reflection function, the method including the steps of forming a plurality of projecting or recessed structures arranged on a main surface of a base at a fine pitch equal to or less than the wavelength of visible light by transferring recesses and projections formed on a surface of a master to a transfer material; and hydrophilizing the main surface of the base, the main surface having the structures thereon, wherein a contact angle of the main surface of the base, the main surface having the structures thereon, to pure water is 30° or less.

In an embodiment, the structures are preferably periodically arranged in a tetragonal lattice pattern or a quasi-tetragonal lattice pattern. Herein, "tetragonal lattice" refers to a regular tetragonal lattice. "Quasi-tetragonal lattice" refers to a distorted regular tetragonal lattice unlike the regular tetragonal lattice.

For example, when the structures are arranged on a straight line, the quasi-tetragonal lattice refers to a tetragonal lattice that is distorted by stretching a regular tetragonal lattice in a linear arrangement direction (track direction). When the structures are arranged in a meandering manner, the quasi-tetragonal lattice refers to a tetragonal lattice obtained by distorting a regular tetragonal lattice along the meandering arrangement of the structures. Alternatively, the quasi-tetragonal lattice refers to a tetragonal lattice that is distorted by stretching a regular tetragonal lattice in a linear arrangement direction (track direction), and in addition, that is distorted along a meandering arrangement of the structures.

In an embodiment, the structures are preferably periodically arranged in a hexagonal lattice pattern or a quasi-hexagonal lattice pattern. Herein, "hexagonal lattice" refers to a regular hexagonal lattice. "Quasi-hexagonal lattice" refers to a distorted regular hexagonal lattice unlike the regular hexagonal lattice.

For example, when the structures are arranged on a straight line, the quasi-hexagonal lattice refers to a hexagonal lattice that is distorted by stretching a regular hexagonal lattice in a linear arrangement direction (track direction). When the structures are arranged in a meandering manner, the quasi-hexagonal lattice refers to a hexagonal lattice obtained by distorting a regular hexagonal lattice along the meandering arrangement of the structures. Alternatively, the quasi-hexagonal lattice refers to a hexagonal lattice that is distorted by stretching a regular hexagonal lattice in a linear arrangement direction (track direction), and in addition, that is distorted along a meandering arrangement of the structures.

In an embodiment, hydrophilicity also includes superhydrophilicity.

In an embodiment, an ellipse includes not only a perfect ellipse that is mathematically defined but also a somewhat distorted ellipse. A circle includes not only a perfect circle (true circle) that is mathematically defined but also a somewhat distorted circle.

In an embodiment, an arrangement pitch P1 of the structures in the same track is preferably longer than an arrangement pitch P2 of the structures between two adjacent tracks. In this case, since the filling factor of the structures each having an elliptical cone shape or a truncated elliptical cone shape can be improved, anti-reflection characteristics can be improved.

In an embodiment, in the case where the structures form a hexagonal lattice pattern or a quasi-hexagonal lattice pattern on the surface of the base, when an arrangement pitch of the structures in the same track is represented by P1 and an arrangement pitch of the structures between two adjacent tracks is represented by P2, the ratio P1/P2 preferably satisfies the relationship $1.00 \leq P1/P2 \leq 1.1$ or $1.00 < P1/P2 \leq 1.1$. By controlling the ratio to be within this numerical range, the filling factor of the structures each having an elliptical cone shape or a truncated elliptical cone shape can be improved and thus anti-reflection characteristics can be improved.

In an embodiment, when the structures form a hexagonal lattice pattern or a quasi-hexagonal lattice pattern on the surface of the base, the structures each preferably have an elliptical cone shape or truncated elliptical cone shape, a major axis direction of which is a direction in which the tracks extend, and in which the slope of the central portion is steeper than the slope of the top portion and the bottom portion. With such a shape, anti-reflection characteristics and transmission characteristics can be improved.

In an embodiment, when the structures form a hexagonal lattice pattern or a quasi-hexagonal lattice pattern on the surface of the base, a height or a depth of each of the structures in the direction in which the tracks extend is preferably smaller than a height or a depth of each of the structures in a row direction of the tracks. When this relationship is not satisfied, it is necessary that the arrangement pitch in the direction in which the tracks extend be made to be long and thus the filling factor of the structures in the direction in which the tracks extend decreases. Such a decrease in the filling factor may result in a decrease in reflection characteristics.

In an embodiment, when the structures form a tetragonal lattice pattern or a quasi-tetragonal lattice pattern on the surface of the base, an arrangement pitch P1 of the structures in the same track is preferably longer than an arrangement pitch P2 of the structures between two adjacent tracks. In this case, since the filling factor of the structures each having an elliptical cone shape or a truncated elliptical cone shape can be improved, anti-reflection characteristics can be improved.

In an embodiment, in the case where the structures form a tetragonal lattice pattern or a quasi-tetragonal lattice pattern on the surface of the base, when an arrangement pitch of the structures in the same track is represented by P1 and an arrangement pitch of the structures between two adjacent tracks is represented by P2, the ratio P1/P2 preferably satisfies the relationship $1.4 < P1/P2 \leq 1.5$. By controlling the ratio to be within this numerical range, the filling factor of the structures each having an elliptical cone shape or a truncated elliptical cone shape can be improved and thus anti-reflection characteristics can be improved.

In an embodiment, when the structures form a tetragonal lattice pattern or a quasi-tetragonal lattice pattern on the surface of the base, the structures each preferably have an elliptical cone shape or truncated elliptical cone shape, a major axis direction of which is a direction in which the tracks extend, and in which the slope of the central portion is steeper than the slope of the top portion and the bottom portion. With such a shape, anti-reflection characteristics and transmission characteristics can be improved.

In an embodiment, when the structures form a tetragonal lattice pattern or a quasi-tetragonal lattice pattern on the surface of the base, a height or a depth of each of the structures in a direction of 45 degrees or about 45 degrees with respect to the tracks is preferably smaller than a height or a depth of each of the structures in a row direction of the tracks. When this relationship is not satisfied, it is necessary that the arrangement pitch in the direction of 45 degrees or about 45 degrees with respect to the tracks be made to be long and thus the filling factor of the structures in the direction of 45 degrees or about 45 degrees with respect to the tracks decreases. Such a decrease in the filling factor may result in a decrease in reflection characteristics.

In an embodiment, preferably, a plurality of structures arranged on a surface of a base at a fine pitch form a plurality of rows of tracks, and form a hexagonal lattice pattern, a quasi-hexagonal lattice pattern, a tetragonal lattice pattern, or a quasi-tetragonal lattice pattern in three adjacent tracks. When such a pattern is formed, a filling density of the structures on the surface can be increased. Consequently, the efficiency of preventing reflection of visible light is increased, and an optical element having good anti-reflection characteristics and an extremely high transmittance can be obtained. Furthermore, when a recording technique of an optical disk is employed in preparation of structures, a master for preparing an optical element can be efficiently produced in a short time and an increase in the size of a base can also be realized. Accordingly, an improvement in productivity of an optical element can be achieved. Furthermore, when a fine arrangement of the structures is provided not only on a light incident surface but also on a light-emitting surface, transmission characteristics can be further improved.

In the optical element according to the embodiments of the present invention, a plurality of projecting or recessed structures are arranged on a main surface of a base at a fine pitch equal to or less than the wavelength of visible light, hydrophilicity is imparted to the main surface of the base, the main surface having the structures thereon, and a contact angle of the main surface to pure water is 30° or less. Thus, an anti-reflection function can be imparted to the surface of the optical element, and stains adhering to the surface of the optical element can be easily removed by wiping with water.

As described above, according to the embodiments of the present invention, stains such as fingerprints adhering to a surface can be easily removed by wiping with water.

Additional features and advantages are described herein, and will be apparent from the following Detailed Description and the figures.

BRIEF DESCRIPTION OF THE FIGURES

in FIG. 1B;

in FIG. 1B;

FIG. 10A is a perspective view showing an example of the structure of a roll master for preparing an optical element;

FIG. 10B is a plan view showing an example of the structure of the roll master for preparing an optical element;

in FIG. 14B;

in FIG. 14B;

in FIG. 15B;

in FIG. 15B;

FIG. 17A is a perspective view showing an example of the structure of a roll master for preparing an optical element;

FIG. 17B is a plan view showing an example of the structure of the roll master for preparing an optical element;

in FIG. 19B;

in FIG. 19B;

DETAILED DESCRIPTION

Figure 1A:
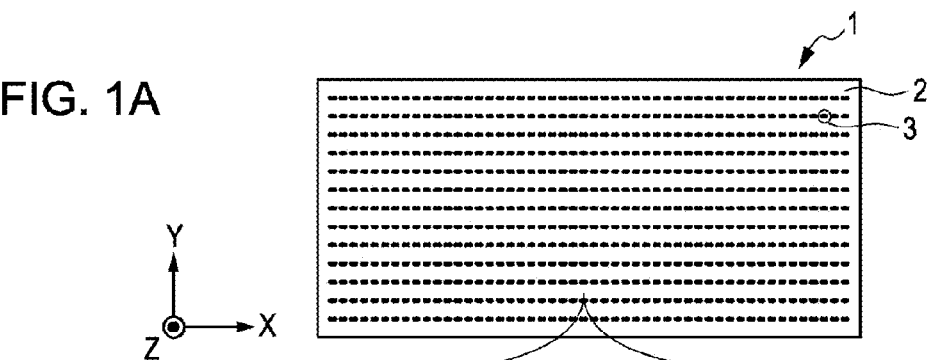
FIG. 1A is a schematic plan view showing an example of the structure of an optical element according to a first embodiment.

The present application will be described below with reference to the drawings according to an embodiment. Note that, in all the drawings of the embodiments below, the same or corresponding parts are assigned the same reference numerals.

First Embodiment (An example in which structures are two-dimensionally arranged in a hexagonal lattice pattern)

[Structure of Optical Element]

Figure 1B:
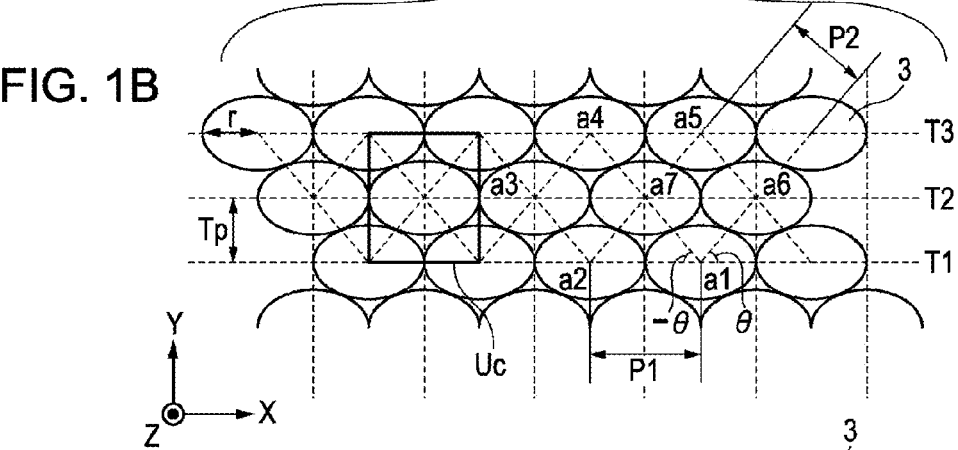
FIG. 1B is an enlarged plan view showing a part of the optical element shown in FIG. 1A.
Figure 1C:
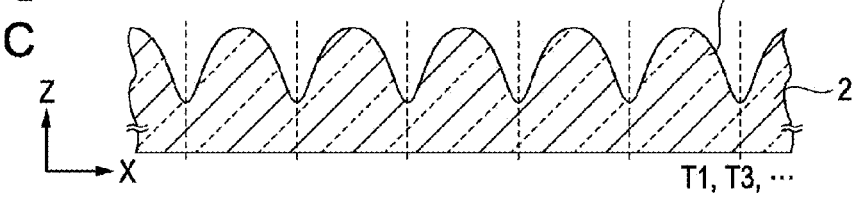
FIG. 1C is a cross-sectional view taken along tracks T1, T3, . . .
Figure 1D:
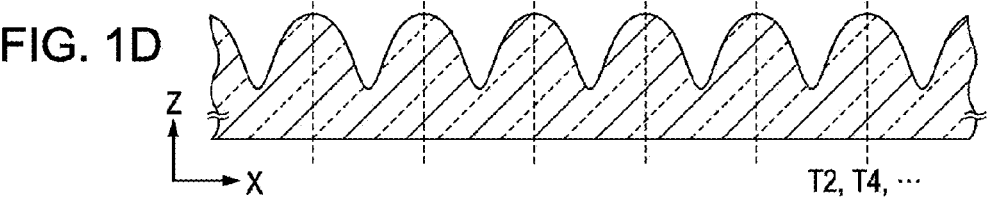
FIG. 1D is a cross-sectional view taken along tracks T2, T4, . . .
Figure 1E:
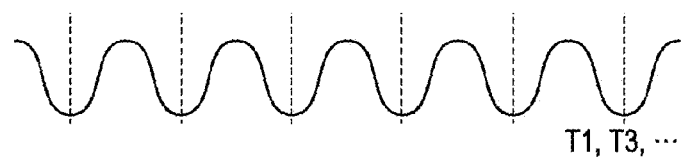
FIG. 1E is a schematic diagram showing a modulation waveform of a laser beam used in forming latent images corresponding to tracks T1, T3 . . . shown in FIG. 1B.
Figure 1F:
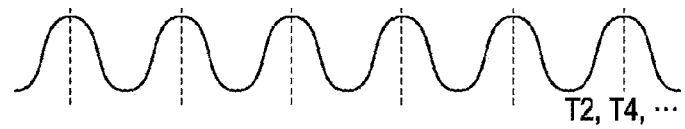
FIG. 1F is a schematic diagram showing a modulation waveform of a laser beam used in forming latent images corresponding to tracks T2, T4 . . . shown in FIG. 1B.

FIG. 1A is a schematic plan view showing an example of the structure of an optical element 1 according to a first embodiment. FIG. 1B is an enlarged plan view showing a part of the optical element 1 shown in FIG. 1A. FIG. 1C is a cross-sectional view taken along tracks T1, T3, . . . in FIG. 1B. FIG. 1D is a cross-sectional view taken along tracks T2, T4, . . . in FIG. 1B. FIG. 1E is a schematic diagram showing a modulation waveform of a laser beam used in forming latent images corresponding to tracks T1, T3 . . . shown in FIG. 1B. FIG. 1F is a schematic diagram showing a modulation waveform of a laser beam used in forming latent images corresponding to tracks T2, T4 . . . shown in FIG. 1B. FIGS. 2, 4, 5, and 6 are enlarged perspective views each showing a part of the optical element 1 shown in FIG. 1A. FIG. 3A is a cross-sectional view of the optical element 1 shown in FIG. 1A in a direction in which the tracks extend (X direction (hereinafter, may also be referred to as "track direction")). FIG. 3B is a cross-sectional view of the optical element 1 shown in FIG. 1A in the θ direction.

This optical element 1 is suitably applied to various optical devices such as displays, optoelectronics, optical communications (optical fibers), solar cells, and illuminating devices. For example, the optical element 1 is applicable to an anti-reflection substrate or a light guide plate suitable for preventing reflection of light having the wavelength range of visible light. Also, the optical element 1 can be applicable to an optical filter having a transmittance corresponding to the angle of incidence of incident light and a backlight device using such an optical filter. The optical element 1 has an anti-reflection function, and the reflectivity thereof is preferably 0.2% or less.

The optical element 1 according to the first embodiment has a structure in which a large number of structures 3, which are projections, are arranged on a surface of a base 2 at a pitch substantially the same as the wavelength of visible light. This optical element 1 has a function of preventing reflection of light passing through the base 2 in the Z direction of FIG. 2 at an interface between the structures 3 and air around the structures 3. Here, "wavelength of visible light" refers to a wavelength of about 400 nm or less.

A part of the surface of the optical element 1, the part having the plurality of structures 3 thereon, has hydrophilicity. The surface of the optical element 1 has hydrophilicity as mentioned above, and thus, when stains such as grease (e.g., fingerprints) adhere to the surface of the optical element 1, the stains can be easily removed by wiping with water. Here, the entire surface having the large number of structures 3 thereon preferably has hydrophilicity, but a part of the surface may have hydrophilicity. The surface of the optical element 1 preferably contains one or more types of functional groups having hydrophilicity. Examples of the functional groups having hydrophilicity include a hydroxyl group, a carboxyl group, and a carbonyl group. The fact that these functional groups having hydrophilicity are contained in the surface of the optical element 1 can be confirmed by X-ray photoelectron spectroscopy (XPS).

The contact angle of the surface of the optical element 1 having hydrophilicity to pure water is preferably 30° or less, and more preferably 2° or more and 30° or less. At a contact angle of less than 2°, when stains adhere, the stains tend to spread over the entire surface. On the other hand, at a contact angle of more than 30°, wiping off the stains tends to be difficult. The contact angle of the surface of the optical element 1 having hydrophilicity to oleic acid is preferably 30° or less, and more preferably 5° or more and 30° or less. At a contact angle of less than 5°, when stains adhere, the stains tend to spread over the entire surface. On the other hand, at a contact angle of more than 30°, wiping off the stains tends to be difficult. The contact angle to oleic acid is preferably larger than the contact angle to pure water. The reason for this is believed that water easily intrudes under grease adhering to the surface of the optical element 1, and the grease can be more easily wiped off.

The base 2 is a transparent base having transparency and contains, as a main component, glass or a transparent synthetic resin such as polycarbonate (PC) or polyethylene terephthalate (PET). Examples of the shape of the base 2 include, but are not particularly limited to, a film shape, a sheet shape, a plate shape, and a block shape. The shape of the base 2 is preferably selected in accordance with, for example, the shape of a main body portion of various optical devices that have a certain anti-reflection function, such as displays, optoelectronics, optical communications, solar cells, and illuminating devices. Alternatively, the shape of the base 2 is preferably selected and determined in accordance with, for example, the shape of a sheet-like or film-like component having an anti-reflection function, the component being attached to these optical devices.

The structures 3 of the optical element 1 have an arrangement form in which a plurality of rows of tracks T1, T2, T3, . . . (hereinafter, generically referred to as "tracks T") are formed on the surface of the base 2. In embodiments of the present invention, "track" refers to a portion in which the structures 3 are linearly arranged in a row. Also, "row direction" refers to a direction orthogonal to the direction in which the tracks extend (X direction) on a molded surface of the base 2.

As for the respective structures 3, in two adjacent tracks T, structures 3 arranged in one track (for example, T2) are arranged at half-way positions (positions shifted by a half pitch) of corresponding structures 3 arranged in another track (for example, T1). As a result, as shown in FIG. 1B, the structures 3 are arranged so as to form a hexagonal lattice pattern or a quasi-hexagonal lattice pattern in which the centers of the structures 3 are located at points a1 to a7 in three adjacent tracks (T1 to T3). In embodiments of the present invention, "quasi-hexagonal lattice pattern" means a hexagonal lattice pattern that is distorted by stretching in the direction in which the tracks extend (X direction) unlike a regular hexagonal lattice pattern.

In the above-described quasi-hexagonal lattice, as shown in FIG. 1B, an arrangement pitch P1 (the distance between a1 and a2) of the structures 3 in the same track (e.g., T1) is longer than an arrangement pitch of the structures 3 between two adjacent tracks (e.g., T1 and T2). That is, the arrangement pitch P1 is longer than an arrangement pitch P2 (for example, the distance between a1 and a7 or between a2 and a7) of the structures 3 in a direction of about ±60° with respect to the direction in which the tracks extend. By arranging the structures 3 in this manner, a filling density of the structures 3 can be further improved.

Figure 2:
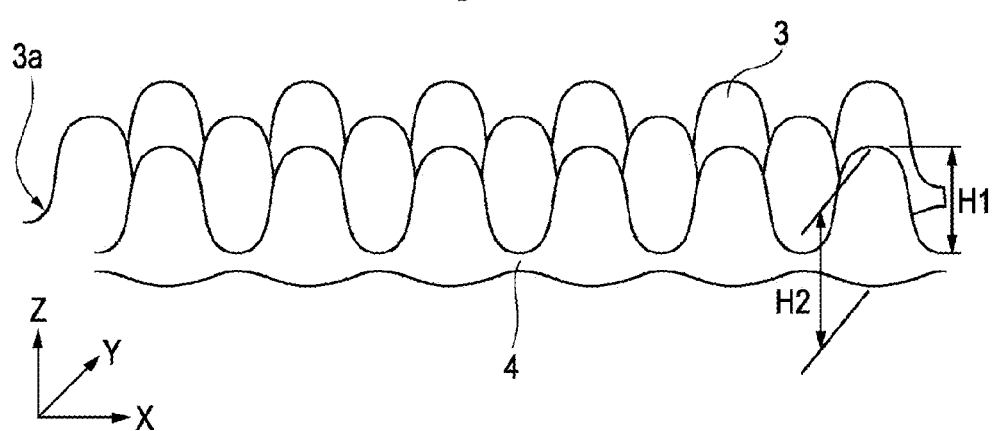
FIG. 2 is an enlarged perspective view showing a part of the optical element shown in FIG. 1A.
Figure 3A:
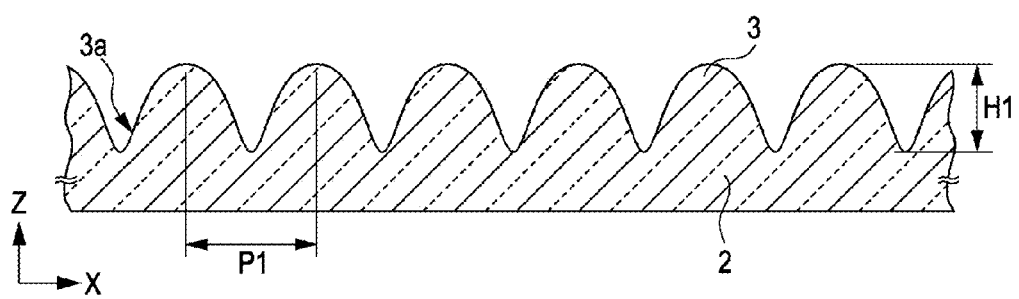
FIG. 3A is a cross-sectional view of the optical element shown in FIG. 1A in a direction in which tracks extend.
Figure 3B:
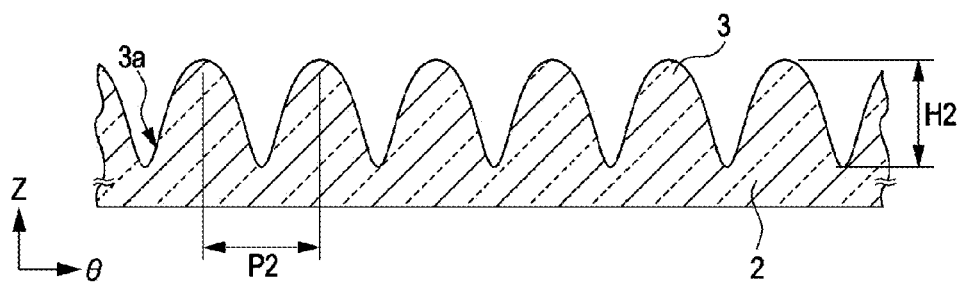
FIG. 3B is a cross-sectional view of the optical element shown in FIG. 1A in the θ direction.
Figure 4:
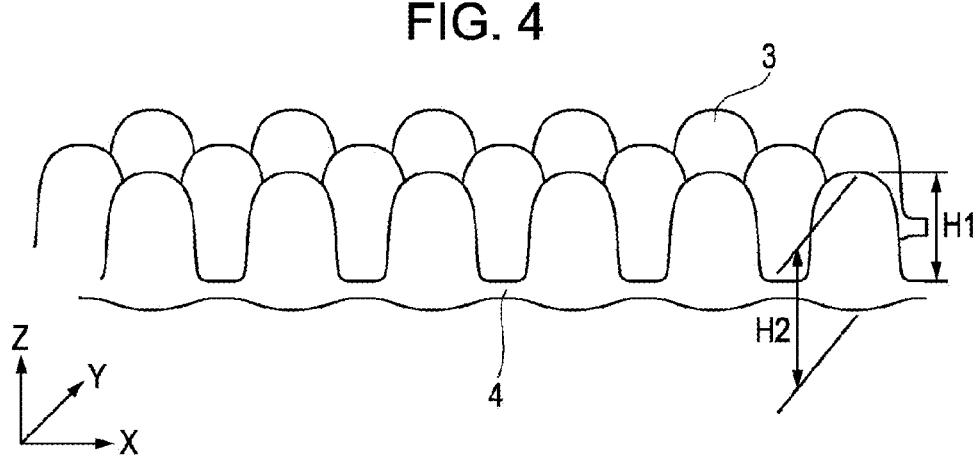
FIG. 4 is an enlarged perspective view showing a part of the optical element shown in FIG. 1A.
Figure 5:
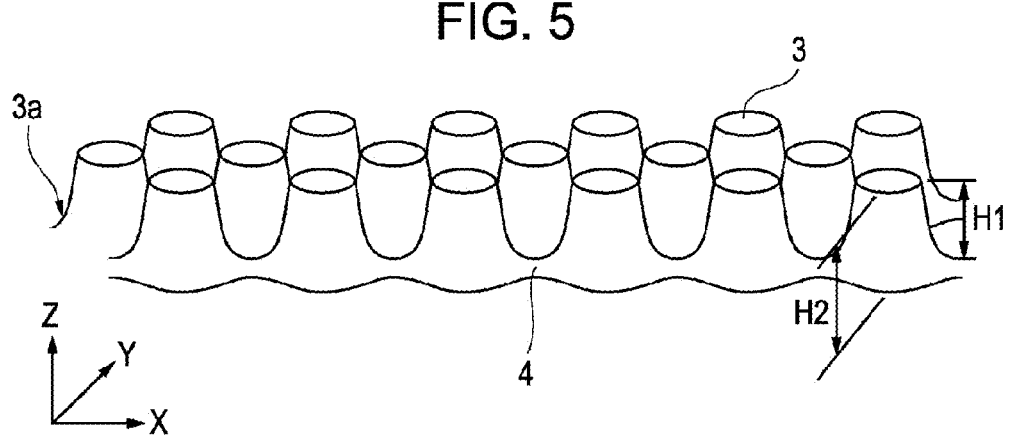
FIG. 5 is an enlarged perspective view showing a part of the optical element shown in FIG. 1A.

As shown in FIGS. 2 and 4, each of the structures 3 preferably has a conical structure, the bottom surface of which is an elliptical, oval, or egg shape having a major axis and a minor axis, and has an elliptical cone shape, the top portion of which has a curved surface. Alternatively, as shown in FIG. 5, each of the structures 3 preferably has a conical structure, the bottom surface of which is an elliptical, oval, or egg shape having a major axis and a minor axis, and has a truncated elliptical cone shape, the top portion of which is flat. This is because the filling factor in the row direction can be improved in such a shape. From the standpoint of improving reflection characteristics and transmission characteristics, an elliptical cone shape in which the slope of the central portion is steeper than that of the bottom portion and the top portion (refer to FIG. 2) or a truncated elliptical cone shape in which the top portion is flat (refer to FIG. 5) is preferable. When each of the structures 3 has an elliptical cone shape or a truncated elliptical cone shape, a direction of the major axis of the bottom surface thereof is preferably parallel to the direction in which the tracks extend. In FIGS. 1A to 1D, all the structures 3 have the same shape. However, the shape of the structures 3 is not limited to this. Structures 3 having two or more types of shapes may be formed on the surface of the base. Alternatively, the structures 3 may be formed integrally with the base 2.

Figure 6:
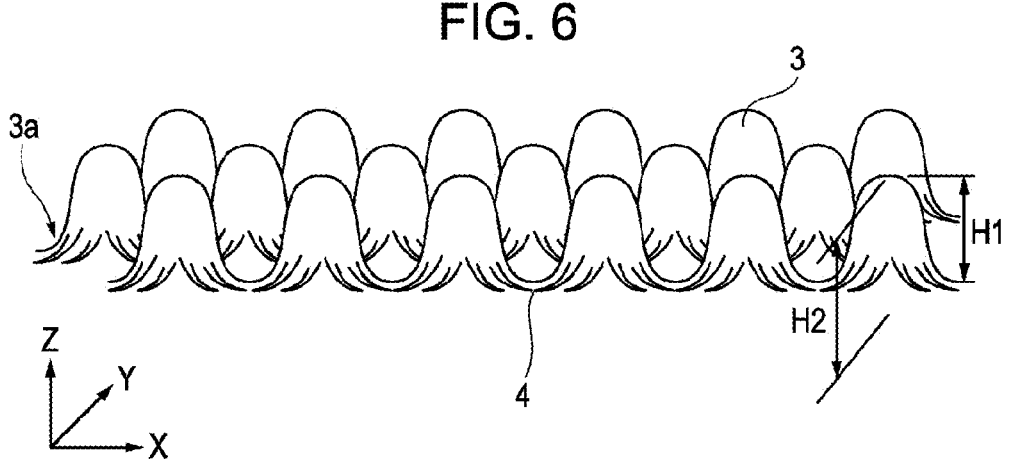
FIG. 6 is an enlarged perspective view showing a part of the optical element shown in FIG. 1A.

In addition, as shown in FIG. 2 and FIGS. 4 to 6, a protruding portion 4 is preferably provided on some or all of the peripheries of the structures 3. This is because the reflectivity can be reduced in such a structure even when the filling factor of the structures 3 is low. Specifically, for example, the protruding portion 4 is provided between adjacent structures 3, as shown in FIGS. 2, 4, and 5. Alternatively, as shown in FIG. 6, narrow and long protruding portions 4 may be provided on the entire periphery of the structures 3. Examples of the shape of the protruding portion 4 include a triangular shape in cross section and a rectangular shape in cross section. However, the shape of the protruding portion 4 is not particularly limited thereto, and can be selected in consideration of the ease of forming and the like. Alternatively, a roughened shape may be formed on some or all of the peripheries of the structures 3. Specifically, for example, a roughened shape may be formed on a surface between adjacent structures 3.

The structures 3 are not limited to structures each having a projecting shape shown in the figures. Alternatively, the structures 3 may be composed of recesses formed on the surface of the base 2. The height of the structures 3 is not particularly limited, and is, for example, about 420 nm, specifically in the range of 415 to 421 nm. Note that this dimension corresponds to the depth of the structures 3 when the structures 3 each have a recessed shape.

A height H1 of the structures 3 in the direction in which the tracks extend is preferably smaller than a height H2 of the structures 3 in the row direction. That is, the heights H1 and H2 of the structures 3 preferably satisfy the relationship H1<H2. The reason for this is as follows. When the structures 3 are arranged so as to satisfy the relationship H1≥H2, it is necessary that the arrangement pitch P1 in the direction in which the tracks extend be made to be long and thus the filling factor of the structures 3 in the direction in which the tracks extend decreases. Such a decrease in the filling factor results in a decrease in reflection characteristics.

Note that the aspect ratio of all the structures 3 may not be the same as each other. Alternatively, the structures 3 may be configured so as to have a certain height distribution (for example, an aspect ratio in the range of about 0.83 to 1.46). By providing structures 3 having a height distribution, the wavelength dependence of reflection characteristics can be reduced. Accordingly, an optical element 1 having good anti-reflection characteristics can be realized.

Here, "height distribution" means that structures 3 having two or more types of heights (depths) are provided on the surface of the base 2. That is, structures 3 having a standard height and other structures 3 having a height different from the standard height of the structures 3 are provided on the surface of the base 2. The other structures 3 having the height different from the standard height are provided on the surface of the base 2 periodically or aperiodically (randomly), for example. Examples of a direction of the periodicity include the direction in which the tracks extend and the row direction.

A skirt portion 3a is preferably provided on the peripheral portion of the structures 3. This is because the optical element can be easily detached from a mold or the like in the process of producing the optical element. From the standpoint of a detachment property, the skirt portion 3a preferably has a curved surface shape in which the height gradually decreases. Note that the skirt portion 3a may be provided on some of the peripheral portions of the structures 3. However, from the standpoint of improving the detachment property, the skirt portion 3a is preferably provided on all the peripheral portions of the structures 3. When the structures 3 are each composed of a recess, the skirt portion corresponds to a curved surface provided on the periphery of an opening of each of the recesses functioning as the structures 3.

The height (depth) of the structures 3 is not particularly limited and is adequately determined in accordance with the wavelength range of light to be transmitted. The height (depth) of the structures 3 is determined in the range of, for example, about 236 to 450 nm. The aspect ratio (height/arrangement pitch) of the structures 3 is determined preferably in the range of 0.81 to 1.46, and more preferably in the range of 0.94 to 1.28. The reason for this is as follows. When the aspect ratio is less than 0.81, reflection characteristics and transmission characteristics tend to decrease. When the aspect ratio exceeds 1.46, the detachment property decreases in preparation of the optical element and a duplication of a replica tends to be difficult to detach properly.

Furthermore, from the standpoint of further improving reflection characteristics, the aspect ratio of the structures 3 is preferably determined in the range of 0.94 to 1.46. Similarly, from the standpoint of further improving transmission characteristics, the aspect ratio of the structures 3 is preferably determined in the range of 0.81 to 1.28.

Note that, in embodiments of the present invention, the aspect ratio is defined by formula (1) below:

$$\text{Aspect ratio} = H/P \quad (1)$$

wherein H represents a height of a structure and P represents an average arrangement pitch (average period).

Here, the average arrangement pitch P is defined by formula (2) below:

$$\text{Average arrangement pitch } P = (P1 + P2 + P2)/3 \quad (2)$$

wherein P1 represents an arrangement pitch in the direction in which the tracks extend (period in the direction in which the tracks extend), and P2 represents an arrangement pitch (period in the θ direction) in a direction of ±θ (wherein θ=60°−δ, where δ satisfies preferably 0°<δ≤11° and more preferably 3°≤δ≤6°) with respect to the direction in which the tracks extend.

In addition, the height H of the structures 3 is assumed to be the height of the structures 3 in the row direction. The height of the structures 3 in the direction in which the tracks extend (X direction) is smaller than the height in the row direction (Y direction), and the height of portions of the structures 3 in directions other than the direction in which the tracks extend is substantially the same as the height in the row direction. Accordingly, the height of the sub-wavelength structures is represented by the height in the row direction. However, when the structures 3 are each composed of a recess, the height H of the structures in formula (1) above is assumed to be a depth H of the structures.

When the arrangement pitch of the structures 3 in the same track is represented by P1 and the arrangement pitch of the structures 3 between two adjacent tracks is represented by P2, the ratio P1/P2 preferably satisfies the relationship 1.00≤P1/P2≤1.1 or 1.00<P1/P2≤1.1. By controlling the ratio to be within these numerical ranges, the filling factor of the structures 3 each having an elliptical cone shape or a truncated elliptical cone shape can be improved. Thus, anti-reflection characteristics can be improved.

The filling factor of the structures 3 on the surface of the base is in the range of 65% or more, preferably 73% or more, and more preferably 86% or more, and the upper limit thereof is 100%. By controlling the filling factor to be within these ranges, anti-reflection characteristics can be improved. In order to improve the filling factor, preferably, the lower portions of adjacent structures 3 are joined to each other, or distortion is provided to the structures 3 by, for example, adjusting the ellipticity of the bottom surfaces of the structures.

Here, the filling factor (average filling factor) of the structures 3 is a value determined as follows.

First, a photograph of the surface of the optical element 1 is taken in top view with a scanning electron microscope (SEM). Next, a unit cell Uc is selected from the obtained SEM photograph at random, and the arrangement pitch P1 and a track pitch Tp of the unit cell Uc are measured (refer to FIG. 1B). In addition, the area S of the bottom surface of the structure 3 located at the center of the unit cell Uc is measured by image processing. Next, the filling factor is determined by formula (3) below using the measured arrangement pitch P1, the track pitch Tp, and the area S of the bottom surface.

$$\text{Filling factor} = (S(\text{hex.})/S(\text{unit})) \times 100 \quad (3)$$

Area of unit cell: S(unit)=P1×2Tp

Area of bottom surfaces of structures present in unit cell: S(hex.)=2S

The above-described process of calculating the filling factor is performed for ten unit cells selected from the obtained SEM photograph at random. The measured values are simply averaged (arithmetically averaged) to determine the average factor of the filling factor. This value is defined as the filling factor of the structures 3 on the surface of the base.

When the structures 3 overlap each other or when substructures such as protruding portions 4 are provided between the structures 3, the filling factor can be determined by a method in which a portion corresponding to a height of 5% relative to the height of the structures 3 is defined as a threshold to determine the area ratio.

Figure 7:
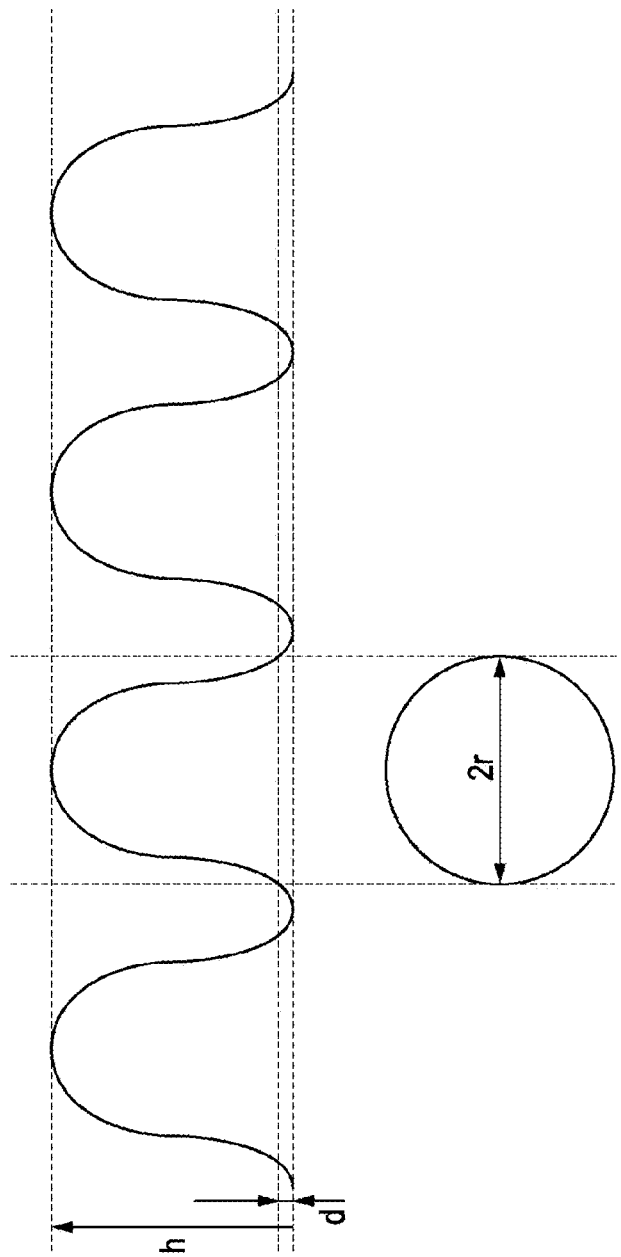
FIG. 7 is a view illustrating a method for determining the bottom surface of each structure when the boundary of structures is not clear.
Figure 8A:
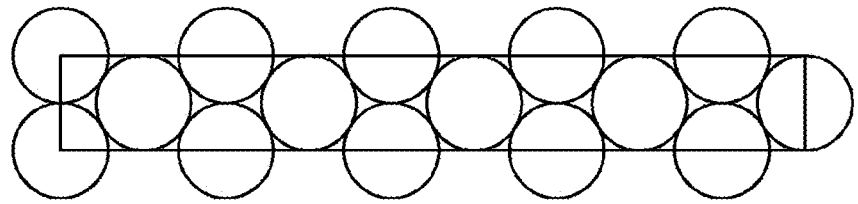
FIGS. 8A to 8D are views each showing the shape of the bottom surface when the ellipticity of the bottom surface of structures is changed.
Figure 8B:
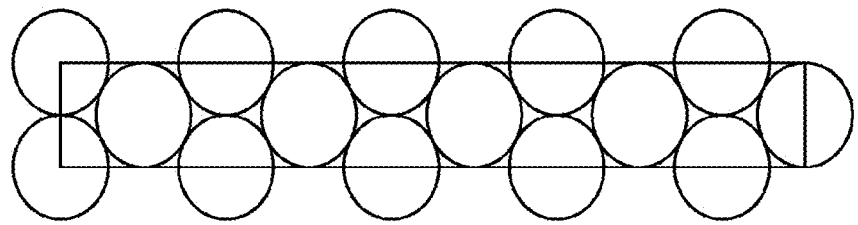
Figure 8C:
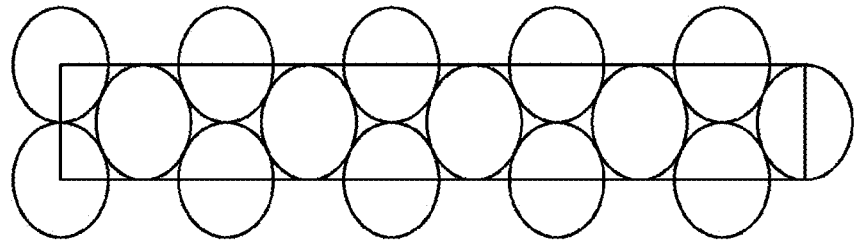
Figure 8D:
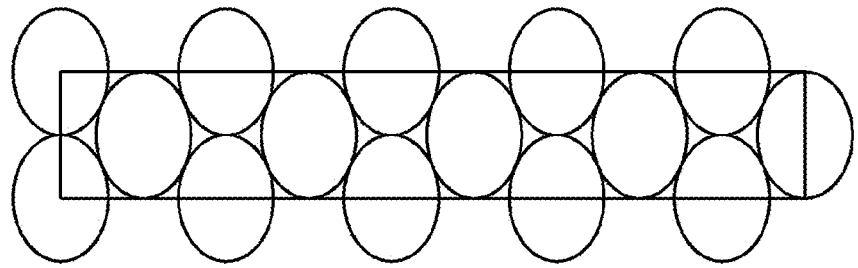

FIG. 7 is a view illustrating a method for calculating the filling factor when the boundary of structures 3 is not clear. When the boundary of the structures 3 is not clear, the filling factor is determined as follows. As shown in FIG. 7, a portion corresponding 5% (=(d/h)×100) of the height h of the structures 3 is defined as a threshold by cross-sectional SEM observation, and the diameter of the structures 3 is converted at the height d to determine the filling factor. When the bottom surface of the structures 3 is an ellipse, the same process is conducted by using the major axis and the minor axis thereof FIGS. 8A to 8D are views showing the shape of the bottom surface when the ellipticity of the bottom surface of the structures 3 is changed. The ellipticities of the ellipses shown in FIGS. 8A to 8D are 100%, 110%, 120%, and 141%, respectively. By changing the ellipticity in this manner, the filling factor of the structures 3 on the surface of the base can be changed. When the structures 3 form a quasi-hexagonal lattice pattern, the ellipticity e of the bottom surface of the structures is preferably 100%<e<150%. This is because, by controlling the ellipticity e to be within this range, the filling factor of the structures 3 can be improved to obtain good anti-reflection characteristics.

Here, when the diameter of the bottom surface of a structure in the track direction (X direction) is represented by a and the diameter of the structure in the row direction (Y direction) orthogonal to the track direction is represented by b, the ellipticity e is defined as (a/b)×100. Note that the diameters a and b of the structures 3 are values determined as follows. A photograph of the surface of the optical element 1 is taken in top view with a scanning electron microscope (SEM), and ten structures 3 are extracted from the obtained SEM photograph at random. Next, the diameters a and b of the bottom surfaces of the respective extracted structures 3 are measured. Subsequently, the measured values a and b are respectively simply averaged (arithmetically averaged) to determine the averages of the diameters a and b. These values are defined as the diameters a and b of the structures 3.

Figure 9A:
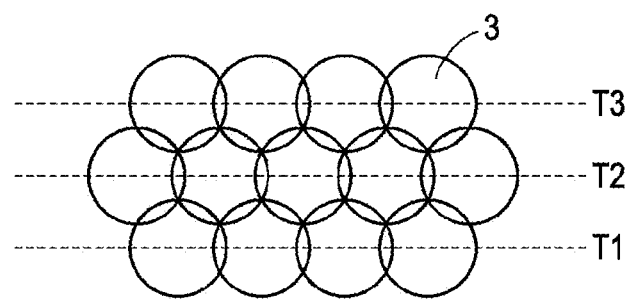
FIG. 9A is a view showing an example of the arrangement of structures each having a cone shape or a truncated cone shape.
Figure 9B:
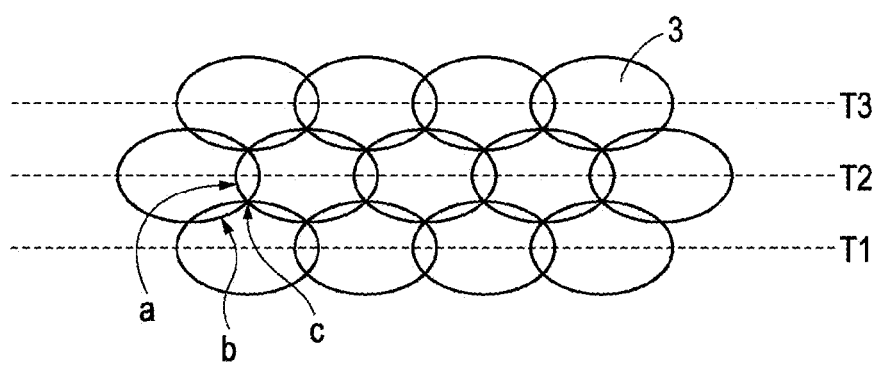
FIG. 9B is a view showing an example of the arrangement of structures each having an elliptical cone shape or a truncated elliptical cone shape.

FIG. 9A shows an example of the arrangement of structures 3 each having a cone shape or a truncated cone shape. FIG. 9B shows an example of the arrangement of structures 3 each having an elliptical cone shape or a truncated elliptical cone shape. As shown in FIGS. 9A and 9B, the structures 3 are preferably joined so that the lower portions thereof overlap each other. Specifically, the lower portion of a structure 3 is preferably joined to the lower portions of some or all of adjacent structures 3. More specifically, the lower portions of the structures 3 are preferably joined in the track direction or in the θ direction, or in these two directions. FIGS. 9A and 9B each show an example in which the lower portions of all of the adjacent structures 3 are joined to the lower portion of one structure 3. The filling factor of the structures 3 can be improved by joining the structures 3 in this manner. The structures are preferably joined to each other at portions located at ¼ or less of the maximum of the wavelength band of light under the use environment at an optical path length in which the refractive index is considered. In this case, good anti-reflection characteristics can be obtained.

As shown in FIG. 9B, when the lower portions of the structures 3 each having an elliptical cone shape or a truncated elliptical cone shape are joined to each other, the height of a joined portion is decreased in the order of joined portion a, joined portion b, and joined portion c.

The ratio ((2r/P1)×100) of the diameter 2r to the arrangement pitch P1 is 85% or more, preferably 90% or more, and more preferably 95% or more. This is because, by controlling the ratio to be within this range, the filling factor of the structures 3 can be improved to improve anti-reflection properties. When the ratio ((2r/P1)×100) increases and overlapping of the structures 3 becomes too large, anti-reflection characteristics tend to decrease. Accordingly, the upper limit of the ratio ((2r/P1)×100) is preferably determined so that the structures are joined to each other at portions located at ¼ or less of the maximum of the wavelength band of light under the use environment at an optical path length in which the refractive index is considered. Here, the arrangement pitch P1 is the arrangement pitch of the structures 3 in the track direction, and the diameter 2r is the diameter of the bottom surface of each of the structures in the track direction. When the bottom surface of each of the structures has a circular shape, the diameter 2r corresponds to the diameter of the circle. When the bottom surface of each of the structures has an elliptical shape, the diameter 2r corresponds to the major axis of the ellipse.

(Structure of Roll Master)

FIGS. 10A and 10B show an example of the structure of a roll master for preparing the optical element having the structure described above. As shown in FIG. 10A, a roll master 11 has a structure in which a large number of structures 13 which are recesses are arranged on a surface of a master 12 at a pitch substantially the same as the wavelength of visible light. The master 12 has a columnar shape of a cylindrical shape. For example, glass can be used as the material of the master 12, but the material is not particularly limited to this material. Patterning is performed using a roll master exposure apparatus described below at an adequate feed pitch at a constant angular velocity (CAV) while synchronizing a polarity inversion formatter signal with a rotation controller of a recording unit in each track to generate signals in such a manner that a two-dimensional pattern is spatially linked. Thus, a hexagonal lattice pattern or a quasi-hexagonal lattice pattern can be recorded. A lattice pattern having a uniform spatial frequency is formed in a desired recording area by adequately setting the frequency of the polarity inversion formatter signal and the number of rotations of the roll.

[Method for Producing Optical Element]

A method for producing the optical element 1 constituted as described above will now be described with reference to FIGS. 11 to 13D.

The method for producing an optical element according to the first embodiment includes a resist film formation step of forming a resist layer on a master, an exposure step of forming latent images of a moth-eye pattern in the resist layer using a roll master exposure apparatus, a development step of developing the resist layer on which the latent images are formed, an etching step of preparing a roll master using plasma etching, and a duplication step of preparing a duplicate substrate using a ultraviolet-curable resin.

(Structure of Exposure Apparatus)

Figure 11:
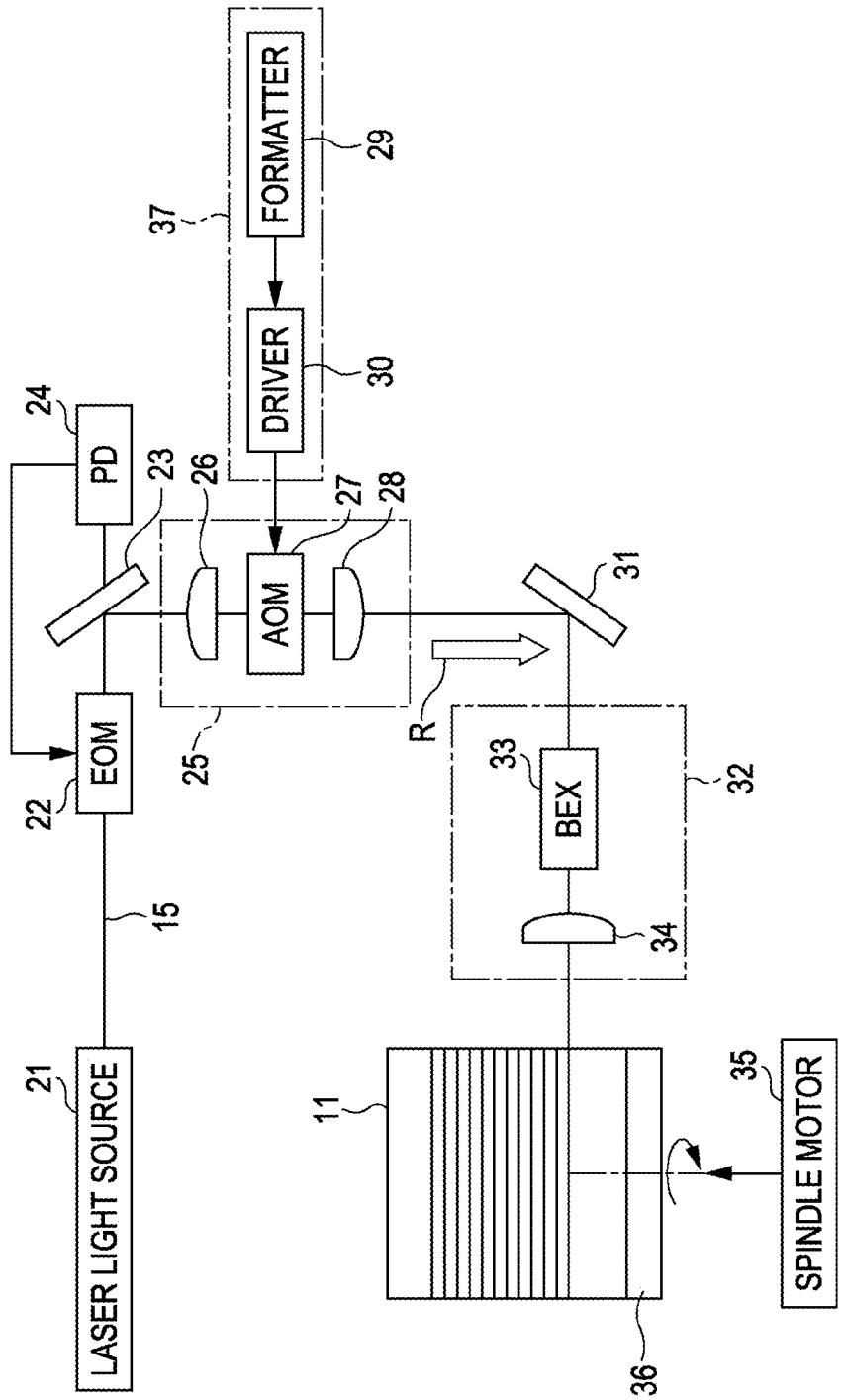
FIG. 11 is a schematic diagram showing an example of the structure of a roll master exposure apparatus.

First, the structure of a roll master exposure apparatus used in the exposure step of a moth-eye pattern will be described with reference to FIG. 11. This roll master exposure apparatus is constituted on the basis of an optical-disk recording apparatus.

A laser light source 21 is a light source for exposing a resist film formed on a surface of a master 12 serving as a recording medium and oscillates a laser beam 15 for recording with a wavelength λ=266 nm, for example. The laser beam 15 emitted from the laser light source 21 goes straight while remaining a collimated beam and enters an electro-optical modulator (EOM) 22. The laser beam 15 passing through the electro-optical modulator 22 is reflected at a mirror 23, and is led to a modulation optical system 25.

The mirror 23 is formed of a polarization beam splitter and has a function of reflecting one polarized component and transmitting the other polarized component. The polarized component passing through the mirror 23 is received by a photodiode 24. The electro-optical modulator 22 is controlled on the basis of the received light signal to conduct phase modulation of the laser beam 15.

In the modulation optical system 25, the laser beam 15 is focused by a condenser lens 26 to an acousto-optic modulator (AOM) 27 composed of glass ($SiO_2$) or the like. The laser beam 15 is diverged through intensity modulation with the acousto-optic modulator 27, and is then formed into a collimated beam by a lens 28. The laser beam 15 emitted from the modulation optical system 25 is reflected from a mirror 31 and horizontally guided to a moving optical table 32 in parallel.

The moving optical table 32 is provided with a beam expander (BEX) 33 and an objective lens 34. The laser beam 15 led to the moving optical table 32 is shaped into a desired beam shape with the beam expander 33 and is then applied to the resist layer on the master 12 through the objective lens 34. The master 12 is placed on a turntable 36 connected to a spindle motor 35. Subsequently, the exposure step of the resist layer is conducted by intermittently irradiating the resist layer with the laser beam 15 while the master 12 is rotated and, in addition, the laser beam 15 is moved in a height direction of the master 12. The formed latent images each have a substantially elliptical shape having a major axis extending in the circumferential direction. The movement of the laser beam 15 is conducted by a movement of the moving optical table 32 in the direction indicated by an arrow R.

The exposure apparatus includes a control mechanism 37 for forming latent images in the resist layer, the latent images corresponding to the two-dimensional pattern of the hexagonal lattice pattern or quasi-hexagonal lattice pattern shown in FIG. 1B. The control mechanism 37 includes a formatter 29 and a driver 30. The formatter 29 is provided with a polarity inversion unit. This polarity inversion unit controls the irradiation timing of the laser beam 15 applied to the resist layer. The driver 30 controls the acousto-optic modulator 27 on the basis of an output from the polarity inversion unit.

In this roll master exposure apparatus, a polarity inversion formatter signal and a rotation controller of the recording unit are synchronized in each track in such a manner that a two-dimensional pattern is spatially linked to generate signals, and intensity modulation is conducted by the acousto-optic modulator 27. A hexagonal lattice pattern or a quasi-hexagonal lattice pattern can be recorded by patterning at a constant angular velocity (CAV) and an appropriate number of rotations, an appropriate modulation frequency, and an appropriate feed pitch. For example, as shown in FIG. 10B, in order to control the period in the circumferential direction to be 315 nm and to control the period in a direction of about 60 degrees (direction about −60 degrees) with respect to the circumferential direction to be 300 nm, the feed pitch may be controlled to be 251 nm (Pythagorean theorem). The frequency of the polarity inversion formatter signal is changed by changing the number of rotations (1,800 rpm, 900 rpm, and 450 rpm) of the roll (refer to Table 1). In a desired recording area, a quasi-hexagonal lattice pattern having a uniform spatial frequency (period in the circumferential direction: 315 nm, period in the direction of about 60 degrees (direction about −60 degrees) with respect to the circumferential direction: 300 nm) is obtained by diverging a far-ultraviolet laser beam so that the beam diameter thereof increases fivefold with the beam expander 33 on the moving optical table 32, and irradiating the resist layer on the master 12 with the laser beam through the objective lens 34 with a numerical aperture (NA) of 0.9 to form fine latent images.

TABLE 1

| Number of rotations [rpm] | 1,800 | 900 | 450 | 225 |
|---|---|---|---|---|
| Moth eye [MHz] | 37.70 | 18.85 | 9.43 | 4.71 |

The steps of the method for producing an optical element according to the first embodiment of the present invention will now be sequentially described.

(Resist Film Formation Step)

Figure 12A:
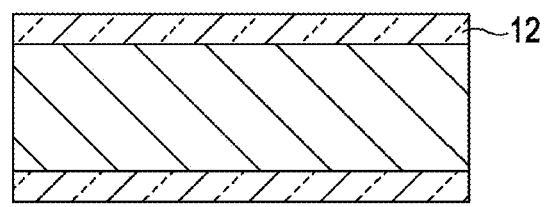
FIGS. 12A to 12C are process views illustrating a method for producing an optical element according to the first embodiment.
Figure 12B:
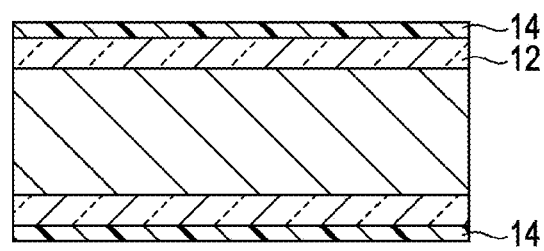

First, as shown in FIG. 12A, a columnar master 12 is prepared. The master 12 is, for example, a glass master. Next, as shown in FIG. 12B, a resist layer 14 is formed on a surface of the master 12. For example, either an organic resist or an inorganic resist may be used as the material of the resist layer 14. Examples of the organic resist that can be used include novolak resists and chemically amplified resists. Examples of the inorganic resist that can be used include metallic compounds including one type or two or more types of transition metals.

(Exposure Step)

Figure 12C:
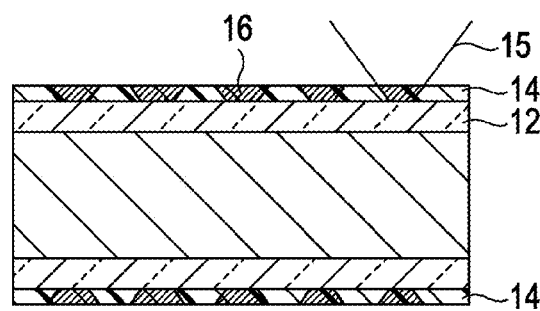

Next, a shown in FIG. 12C, the resist layer 14 is irradiated with a laser beam (exposure beam) 15 using the roll master exposure apparatus described above while the master 12 is rotated. In this step, the entire surface of the resist layer 14 is exposed by intermittently irradiating the resist layer 14 with the laser beam 15 while the laser beam 15 is moved in the height direction of the master 12 (direction parallel to the central axis of the columnar or cylindrical master 12). Thus, latent images 16 corresponding to the trajectory of the laser beam 15 are formed on the entire surface of the resist layer 14 at a pitch substantially the same as the wavelengths of visible light.

For example, the latent images 16 are arranged so as to form a plurality of rows of tracks on the surface of a master and form a hexagonal lattice pattern or a quasi-hexagonal lattice pattern. Each of the latent images 16 has, for example, an elliptical shape, the major axis direction of which is a direction in which the tracks extend.

(Development Step)

Figure 13A:
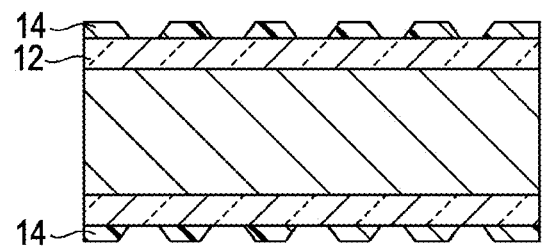
FIGS. 13A to 13D are process views illustrating the method for producing the optical element according to the first embodiment.

Next, as shown in FIG. 13A, the resist layer 14 is developed by dropping a developer on the resist layer 14 while the master 12 is rotated. As shown in the figure, when the resist layer 14 is formed of a positive resist, exposed portions exposed with the laser beam 15 have a high dissolution rate to the developer as compared with unexposed portions. Accordingly, a pattern corresponding to the latent images (exposed portions) 16 is formed on the resist layer 14.

(Etching Step)

Figure 13B:
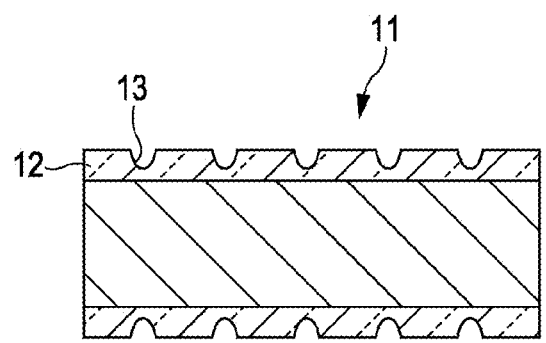

Next, the surface of the master 12 is subjected to an etching process using, as a mask, the pattern (resist pattern) of the resist layer 14 formed on the master 12. Accordingly, as shown in FIG. 13B, recesses, i.e., structures 13, each having an elliptical cone shape or truncated elliptical cone shape, the major axis direction of which is a direction in which the tracks extend, can be obtained. For example, dry etching is employed as the etching method. In this case, for example, a pattern of cone-shaped structures 13 can be formed by alternately performing an etching process and an ashing process. In addition, a glass master having a depth three times or more the thickness of the resist layer 14 (selection ratio: 3 or more) can be prepared, and thus a high aspect ratio of structures 3 can be realized.

Thus, a roll master 11 having a hexagonal lattice pattern or quasi-hexagonal lattice pattern including recesses each having a depth in the range of, for example, about 200 to 350 nm is obtained.

(Duplication Step)

Figure 13C:
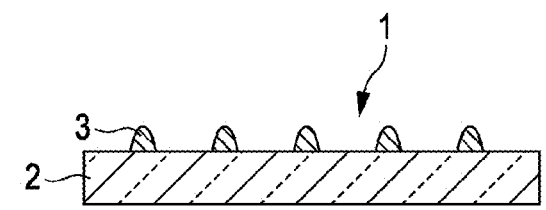

Next, a base 2 such as a sheet to which a transfer material is applied is brought into close contact with the roll master 11, and the base 2 is detached from the roll master 11 while curing the transfer material by irradiation of ultraviolet light. Accordingly, as shown in FIG. 13C, a target optical element 1 such as a moth-eye ultraviolet-cured duplicate sheet is prepared.

The transfer material contains, for example, an ultraviolet-curable material and an initiator, and optically contains a filler, functional additives, and the like.

Examples of the ultraviolet-curable material include monofunctional monomers, bifunctional monomers, and polyfunctional monomers. Specifically, the following materials may be used alone or as a mixture of two or more materials.

Examples of the monofunctional monomers include carboxylic acids (acrylic acid), hydroxy compounds (2-hydroxyethyl acrylate, 2-hydroxypropyl acrylate, and 4-hydroxybutyl acrylate), alkyls, alicyclic compounds (isobutyl acrylate, t-butyl acrylate, isooctyl acrylate, lauryl acrylate, stearyl acrylate, isobornyl acrylate, and cyclohexyl acrylate), and other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropyl acrylamide, N,N-dimethylacrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of the bifunctional monomers include tri(propylene glycol)diacrylate, trimethylolpropane diallyl ether, and urethane acrylate.

Examples of the polyfunctional monomers include trimethylolpropane triacrylate, dipentaerythritol penta/hexa acrylate, and ditrimethylolpropane tetraacrylate.

Examples of the initiator include 2,2-dimethoxy-1,2-diphenylethan-1-one, 1-hydroxy-cyclohexyl phenyl ketone, and 2-hydroxy-2-methyl-1-phenylpropan-1-one.

As the filler, for example, inorganic fine particles or organic fine particles can be used. Examples of the inorganic fine particles include fine particles of a metal oxide such as $SiO_2$, $TiO_2$, $ZrO_2$, $SnO_2$, or $Al_2O_3$.

Examples of the functional additives include a leveling agent, a surface control agent, and an anti-foaming agent. Examples of the material of the base 2 include methyl methacrylate (co)polymers, polycarbonate, styrene (co)polymers, methyl methacrylate-styrene copolymers, cellulose diacetate, cellulose triacetate, cellulose acetate butyrate, polyesters, polyamides, polyimides, polyethersulfone, polysulfone, polypropylene, polymethylpentene, polyvinyl chloride, polyvinyl acetal, polyetherketones, polyurethanes, and glass.

The method of forming the base 2 is not particularly limited. The base 2 may be an injection-molded body, an extruded body, or a cast body. A surface treatment such as a corona treatment may be optionally conducted on the surface of the base.

(Surface Treatment Step)

Figure 13D:
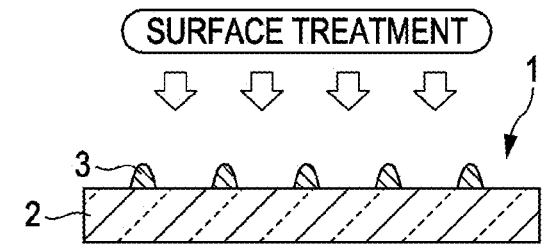

Next, as shown in FIG. 13D, a surface treatment is conducted on the irregular surface of the optical element 1. Consequently, a functional group having hydrophilicity, e.g., a hydroxyl group, a carboxyl group, or a carbonyl group is generated on the irregular surface to provide the irregular surface with hydrophilicity. Examples of the surface treatment include a corona treatment, a plasma treatment, and an ultraviolet treatment, and these treatments may be employed alone or in combinations. Either a vacuum plasma treatment or an atmospheric-pressure plasma treatment may be used as the plasma treatment. The gas used is not particularly limited, but nitrogen, oxygen, hydrogen, and the like can be used alone or in combination of two or more types of gas. As the ultraviolet treatment, any method using ultraviolet light, e.g., a UV-ozone treatment, with which a surface modification effect can be obtained, can be employed.

According to the first embodiment, the projecting structures 3 are arranged on a surface of a base in a hexagonal lattice pattern or a quasi-hexagonal lattice pattern at a fine pitch equal to or less than the wavelength of visible light. Therefore, the optical element 1 which has a high transmittance and in which reflected light is low to suppress reflection can be provided. Furthermore, hydrophilicity is imparted to the surface of the base, the surface having the structures 3 thereon, so that the contact angle to pure water is controlled to be 30° or less. Accordingly, stains adhering to the surface of the optical element 1 can be easily removed by wiping with water.

Since an anti-reflection function is realized by forming the plurality of structures 3 on the surface of the base, the wavelength dependence can be reduced. When the optical element 1 is prepared by a method in which a process for preparing a master of an optical disk is combined with an etching process, a master for preparing an optical element can be efficiently produced in a short time. Accordingly, productivity of the optical element 1 can be improved. Furthermore, an increase in the size of the optical element 1 can also be easily realized.

On a surface of the base, the surface having a plurality of structures 3 arranged at a fine pitch equal to or less than the wavelength of visible light (i.e., surface having a moth-eye structure), the ease of removal of stains by wiping with water is different depending on whether the surface is water-repellent or hydrophilic. Specifically, when the surface having the moth-eye structure is hydrophilic, stains such as fingerprints that enter between the structures by capillary action can be removed by wiping with water. On the other hand, when the surface having the moth-eye structure is water-repellent, it is difficult to remove stains such as fingerprints that enter between the structures by wiping with water.

In contrast, on a flat surface of a base, regardless of whether the surface is water-repellent or hydrophilic, it is possible to remove stains such as fingerprints adhering to the surface by wiping with water, though the degree of the ease of wiping of the stains such as fingerprints is different.

Second Embodiment (An example in which a hydrophilic surface layer is formed on a surface of an optical element)

Figure 14A:
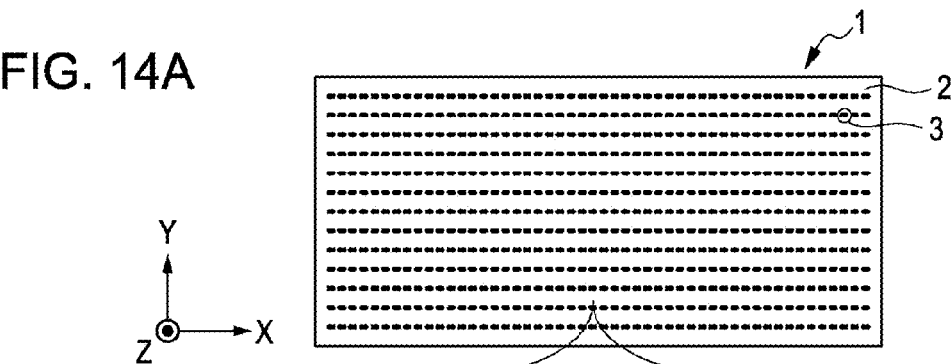
FIG. 14A is a schematic plan view showing an example of the structure of an optical element according to a second embodiment.
Figure 14B:
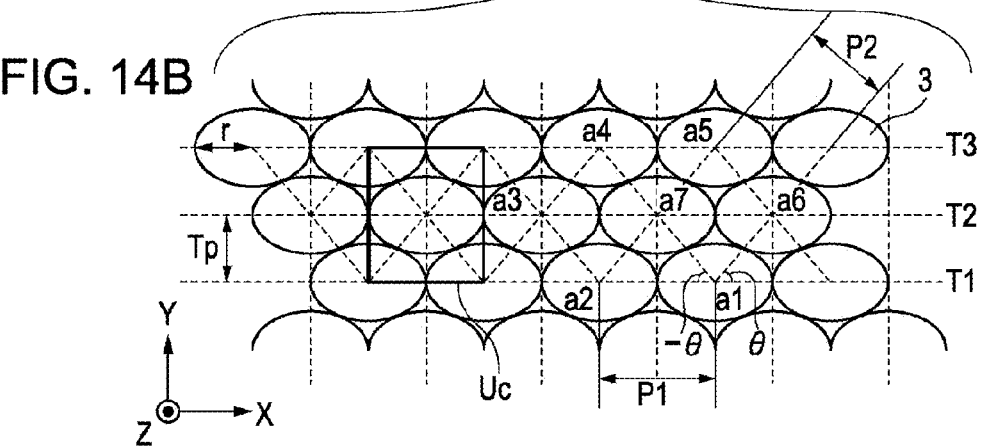
FIG. 14B is an enlarged plan view showing a part of the optical element shown in FIG. 14A.
Figure 14C:
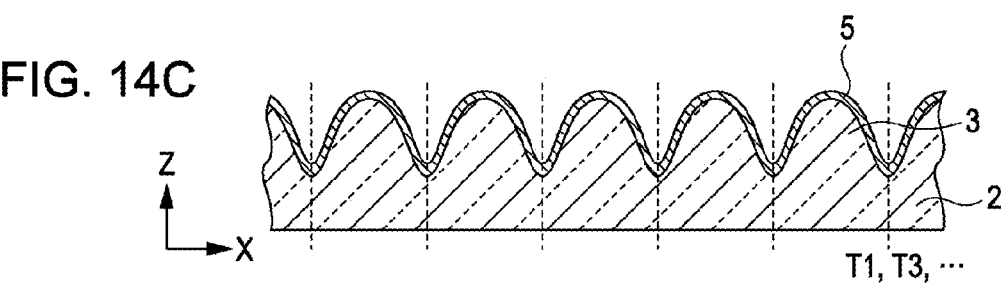
FIG. 14C is a cross-sectional view taken along tracks T1, T3, . . .
Figure 14D:
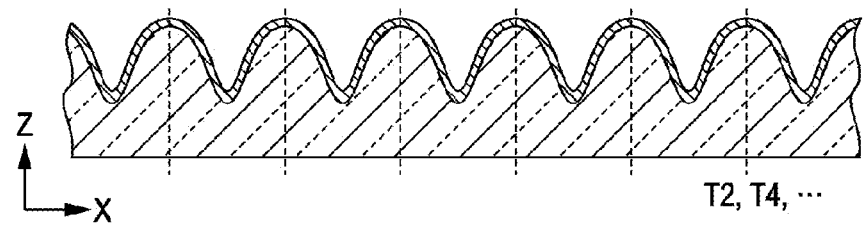
FIG. 14D is a cross-sectional view taken along tracks T2, T4, . . .

FIG. 14A is a schematic plan view showing an example of the structure of an optical element according to a second embodiment. FIG. 14B is an enlarged plan view showing a part of the optical element shown in FIG. 14A. FIG. 14C is a cross-sectional view taken along tracks T1, T3, . . . in FIG. 14B. FIG. 14D is a cross-sectional view taken along tracks T2, T4, . . . in FIG. 14B.

An optical element 1 of the second embodiment differs from that of the first embodiment in that a hydrophilic surface layer 5 is provided on a surface of a base 2, the surface having structures 3 thereon, and hydrophilicity is imparted to the surface of the optical element 1 by the hydrophilic surface layer 5.

The material of the hydrophilic surface layer 5 may be any material having hydrophilicity, and either organic materials or inorganic materials can be used. Examples of the inorganic materials having hydrophilicity include metal oxides such as $SiO_2$, $TiO_2$, ZnO, and $SrTiO_3$. As the inorganic materials having hydrophilicity, a material that is converted to an inorganic substance or the like by a chemical reaction after film formation can be used. Examples of such materials include polysilazane compounds, which react with moisture to convert to $SiO_2$ after the compounds are applied. Examples of the polysilazane compounds that can be used include perhydro-polysilazane (PHPS). The conversion of polysilazane compounds to $SiO_2$ can occur in any environment of heating, addition of moisture, and leaving at ordinary temperature. For example, polysilazane compounds can be converted to $SiO_2$ by heating in air or a water vapor atmosphere. A material that is converted to an inorganic substance or the like by performing a treatment after film formation can also be used. An example of such a material is a spin-on-glass (SOG) material, which is converted to $SiO_2$ after the material is applied and then heat-treated. Examples of the organic materials include materials having a hydrophilic group such as an —OH group, a —COOH group, a —CN group, or an —$NHCOHN_2$ group. Specific examples of the organic materials include organic compositions containing a hydrophilic resin such as 2-hydroxyethyl(meth)acrylate. Two or more types of these organic materials and inorganic materials having hydrophilicity may be blended and used. Furthermore, a hybrid material can also be used in which an organic or inorganic material that has hydrophilicity is blended with an organic material that does not have hydrophilicity so long as the contact angle of the hybrid material is within the range according to embodiments of the present invention. When the above organic or inorganic material having hydrophilicity forms a flat surface, the contact angle of the flat surface to pure water is preferably 90° or less.

As the hydrophilic resin, which is an organic material having hydrophilicity, from the standpoint of the ease of producing the optical element 1, an ionizing radiation-curable resin that is cured by light, an electron beam, or the like and that has hydrophilicity or a thermosetting resin that is cured by heat and that has hydrophilicity is preferably used. An ultraviolet-curable resin that is cured by ultraviolet light and that has hydrophilicity is the most preferable.

Examples of the ultraviolet-curable resin include hydrophilic ultraviolet-curable resin containing a compound (e.g., monomer) having at least one hydrophilic group and at least one (meth)acryloyl group. Herein, the term "(meth)acryloyl group" refers to either an acryloyl group or a methacryloyl group. Examples of the hydrophilic group include an —OH group, a —COOH group, a —CN group, and an —NHCOHN$_2$ group, and the compound may have different types of hydrophilic groups. The metal oxide is, for example, at least one selected from the group consisting of $SiO_2$, $TiO_2$, ZnO, and $SrTiO_3$.

As a method for forming the hydrophilic surface layer, for example, a dry method or a wet method can be employed. Examples of the dry method that can be used include chemical vapor deposition methods (CVD: a technology in which a thin film is deposited from a vapor phase using a chemical reaction) such as thermal CVD, plasma CVD, and photo-CVD; and physical vapor deposition methods (PVD: a technology in which a material that is physically vaporized in a vacuum is aggregated on a base 2 to form a thin film) such as a vacuum vapor deposition method, a plasma-enhanced vapor deposition method, a sputtering method, and an ion plating method. Examples of the wet method that can be used include application methods such as a gravure coater method, a dipping method, a bar coating method, a spin coating method, and a screen printing method; a Langmuir-Blodgett (LB) method; a chemical deposition method; an anodic oxidation method; and an electrolytic deposition method.

The method for forming the hydrophilic surface layer 5 is preferably an isotropic formation method in which the hydrophilic surface layer 5 can be gradually formed from a direction of a normal line of the film formation surface. By forming the layer in such a manner, the hydrophilic surface layer 5 can be formed so as to conform to the surface shape of the structures 3, whereby the surface shape of the structures 3 and the surface shape of the hydrophilic surface layer 5 can be similar or substantially similar to each other. That is, a change in the refractive index profile due to the formation of the hydrophilic surface layer 5 can be suppressed, so that optical characteristics such as good anti-reflection characteristics and/or transmission characteristics can be maintained.

It is ideal that the surface shape of the structures 3 and the surface shape of the hydrophilic surface layer 5 are similar to each other. However, when an isotropic deposition is performed by a sputtering method or the like, a part of the material of the hydrophilic surface layer 5 may de deposited on the side faces of the structures 3. Consequently, if the thickness of the deposited hydrophilic surface layer 5 is excessively large, the hydrophilic surface layer 5 may contact adjacent structures 3, and it becomes difficult to obtain desired optical characteristics. From the standpoint of suppressing such a decrease in the optical characteristics, the thickness of the hydrophilic surface layer 5 formed on the irregular surface having a plurality of structures 3 thereon (i.e., surface having a moth-eye structure) is preferably equal to or less than an arrangement pitch Pa of the structures 3. Here, the arrangement pitch Pa refers to the shortest arrangement pitch among the arrangement pitches in all directions. Accordingly, in the first embodiment, the arrangement pitch Pa is the shorter arrangement pitch (for example, the arrangement pitch P2) out of the arrangement pitch P1 in the direction in which the tracks extend and the arrangement pitch P2 in the direction of ±θ with respect to the direction in which the tracks extend.

Furthermore, in the case where the hydrophilic surface layer 5 has a large thickness, the layer may be detached when the surface is rubbed, and thus the durability of the layer tends to be degraded. Therefore, the thickness of the hydrophilic surface layer 5 is preferably 250 nm or less.

It is preferable to further perform a surface treatment on the hydrophilic surface layer 5 provided on the surface of the optical element 1. This is because stains such as fingerprints adhering to the surface of the optical element 1 can be more easily removed by wiping with water. The same surface treatments as those described in the first embodiment can be employed.

According to the second embodiment, since the hydrophilic surface layer 5 is formed on the surface of the base 2, the surface having the structures 3 thereon, the hydrophilic function of the surface of the optical element 1 can be maintained for a long time as compared with the first embodiment.

Third Embodiment (An example in which structures contain a hydrophilic resin)

A third embodiment will now be described, and parts corresponding to those in the first embodiment described above are assigned the same reference numerals. The third embodiment differs from the first embodiment in that hydrophilicity is imparted to the surface of an optical element 1 by incorporating a hydrophilic resin in the optical element 1.

The entire optical element 1 preferably contains a hydrophilic resin. However, the entire part of structures 3 or only the surfaces of the structures 3 may contain a hydrophilic resin. From the standpoint of the ease of producing the optical element 1, an ionizing radiation-curable resin that is cured by light, an electron beam, or the like and that has hydrophilicity or a thermosetting resin that is cured by heat and that has hydrophilicity is preferably used as the hydrophilic resin. An ultraviolet-curable resin that is cured by ultraviolet light and that has hydrophilicity is the most preferable. When the hydrophilic resin forms a flat surface, the contact angle of the flat surface to pure water is preferably 90° or less. As the hydrophilic resin, the same materials as the organic materials having hydrophilicity described in the second embodiment can be used.

In addition, it is preferable to further perform a surface treatment on the irregular surface of the optical element 1, the irregular surface having the plurality of structures 3 thereon. This is because stains such as fingerprints adhering to the surface of the optical element 1 can be more easily removed by wiping with water. The same surface treatments as those described in the first embodiment can be employed.

Modification

Hydrophilicity may be imparted to the surface of the optical element 1 by incorporating at least one of a hydrophilic organic material, a hydrophilic inorganic material, and a hydrophilic organic-inorganic hybrid material in the optical element 1. Alternatively, the optical element 1 may contain at least one of a hydrophilic organic material and a hydrophilic inorganic material, for example, may contain a hydrophilic inorganic material. In this case, the optical element 1 may contain at least one of an organic material that does not have hydrophilicity and an inorganic material that does not have hydrophilicity. As the hydrophilic organic material, the hydrophilic inorganic material, and the hydrophilic organic-inorganic hybrid material, those described in the second embodiment can be used.

In the third embodiment, the same advantages as those of the second embodiment can be achieved.

Fourth Embodiment (An example in which structures are two-dimensionally arranged in a tetragonal lattice pattern)

Figure 15A:
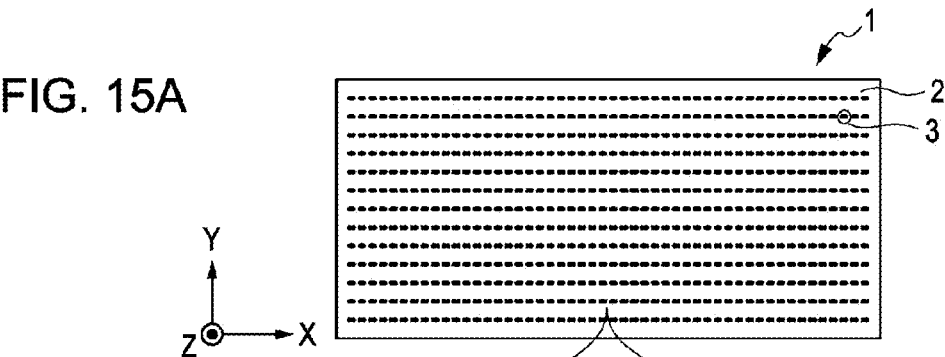
FIG. 15A is a schematic plan view showing an example of the structure of an optical element according to a fourth embodiment.
Figure 15B:
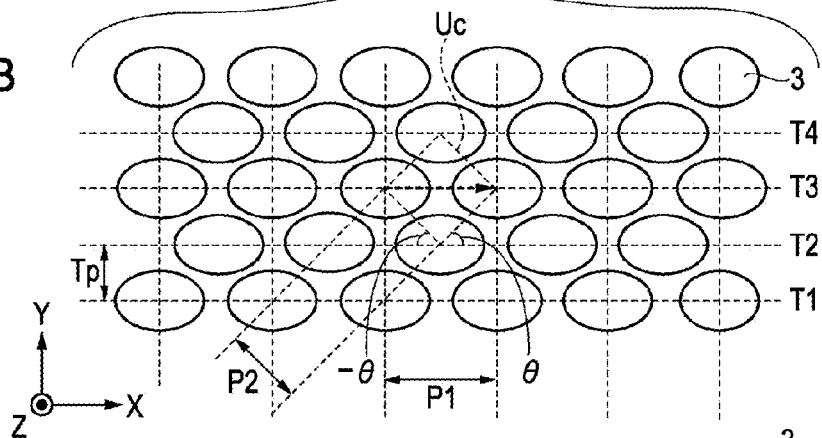
FIG. 15B is an enlarged plan view showing a part of the optical element shown in FIG. 15A.
Figure 15C:
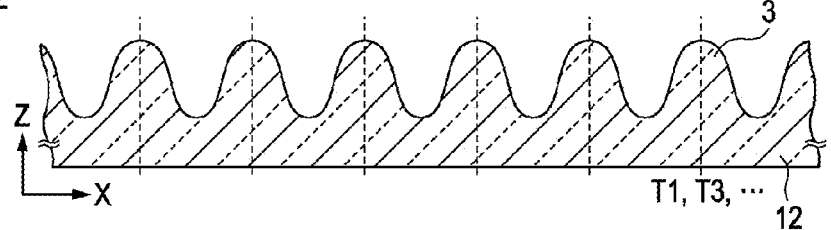
FIG. 15C is a cross-sectional view taken along tracks T1, T3, . . .
Figure 15D:
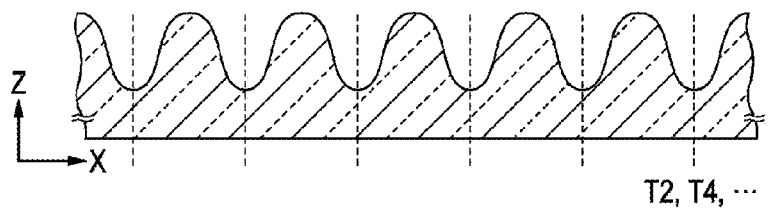
FIG. 15D is a cross-sectional view taken along tracks T2, T4, . . .
Figure 15E:
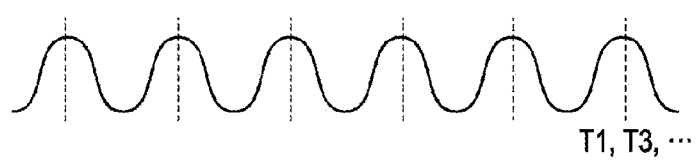
FIG. 15E is a schematic diagram showing a modulation waveform of a laser beam used in forming latent images corresponding to tracks T1, T3 . . . shown in FIG. 15B.
Figure 15F:
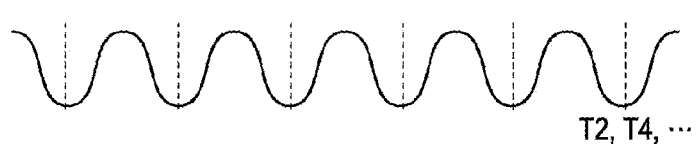
FIG. 15F is a schematic diagram showing a modulation waveform of a laser beam used in forming latent images corresponding to tracks T2, T4 . . . shown in FIG. 15B.

FIG. 15A is a schematic plan view showing an example of the structure of an optical element according to a fourth embodiment of the present invention. FIG. 15B is an enlarged plan view showing a part of the optical element shown in FIG. 15A. FIG. 15C is a cross-sectional view taken along tracks T1, T3, . . . in FIG. 15B. FIG. 15D is a cross-sectional view taken along tracks T2, T4, . . . in FIG. 15B. FIG. 15E is a schematic diagram showing a modulation waveform of a laser beam used in forming latent images corresponding to tracks T1, T3 . . . shown in FIG. 15B. FIG. 15F is a schematic diagram showing a modulation waveform of a laser beam used in forming latent images corresponding to tracks T2, T4 . . . shown in FIG. 15B.

An optical element 1 of the fourth embodiment differs from that of the first embodiment in that structures 3 form a tetragonal lattice pattern or a quasi-tetragonal lattice pattern in three adjacent tracks. In embodiments of the present invention, "quasi-tetragonal lattice pattern" means a tetragonal lattice pattern that is distorted by stretching in the direction in which the tracks extend (X direction) unlike a regular tetragonal lattice pattern.

The height or the depth of the structures 3 is not particularly limited, and is, for example, about 159 to 312 nm. A pitch P2 in a direction of (about) 45 degrees with respect to the tracks is, for example, about 275 to 297 nm. The aspect ratio (height/arrangement pitch) of the structures 3 is, for example, in the range of about 0.54 to 1.13. Furthermore, the aspect ratio of all the structures 3 may not be the same as each other. Alternatively, the structures 3 may be configured so as to have a certain height distribution.

An arrangement pitch P1 of the structures 3 in the same track is preferably longer than the arrangement pitch P2 of the structures 3 between two adjacent tracks. When the arrangement pitch of the structures 3 in the same track is represented by P1, and the arrangement pitch of the structures 3 between two adjacent tracks is represented by P2, the ratio P1/P2 preferably satisfies the relationship $1.4 < P1/P2 \leq 1.5$. By controlling the ratio to be within this numerical range, the filling factor of the structures 3 each having an elliptical cone shape or a truncated elliptical cone shape can be improved. Thus, anti-reflection characteristics can be improved. In addition, the height or the depth of the structures 3 in a direction of 45 degrees or about 45 degrees with respect to the tracks is preferably smaller than the height or the depth of the structures 3 in the direction in which the tracks extend.

A height H2 of the structures 3 in the arrangement direction (θ direction) that is slanted with respect to the direction in which the tracks extend is preferably smaller than a height H1 of the structures 3 in the direction in which the tracks extend. That is, the heights H1 and H2 of the structures 3 preferably satisfy the relationship H1>H2.

Figure 16:
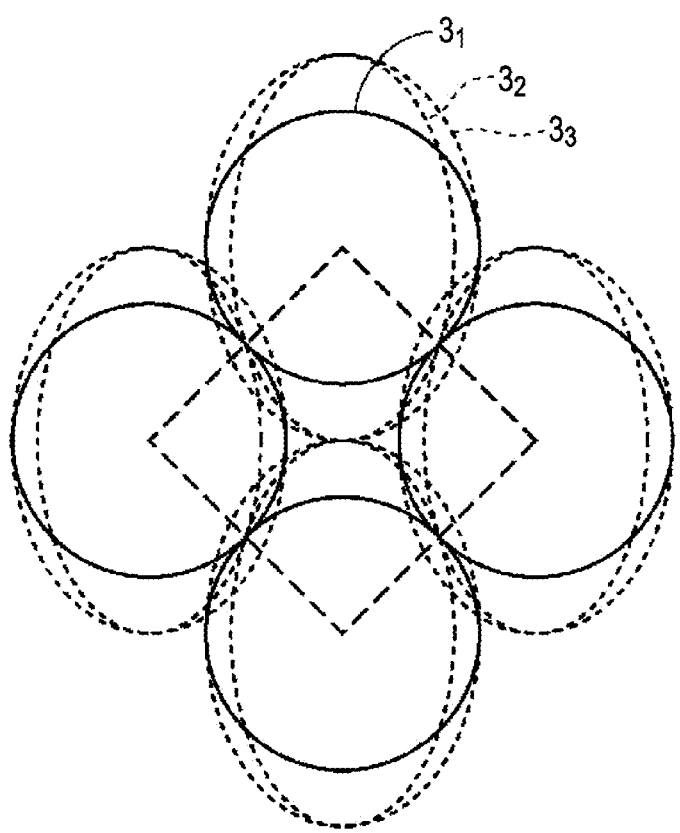
FIG. 16 is a schematic view showing the shapes of the bottom surfaces when the ellipticity of the bottom surfaces of structures is changed.

FIG. 16 is a view showing the shapes of the bottom surfaces when the ellipticity of the bottom surfaces of the structures 3 is changed. The ellipticities of the ellipses $3_1$, $3_2$, and $3_3$ are 100%, 163.3%, and 141%, respectively. By changing the ellipticity in this manner, the filling factor to the structures 3 on the surface of the base can be changed. When the structures 3 form a tetragonal lattice pattern or a quasi-tetragonal lattice pattern, the ellipticity e of the bottom surfaces of the structures is preferably $150\% \leq e \leq 180\%$. This is because, by controlling the ellipticity e to be within this range, the filling factor of the structures 3 is improved to obtain good anti-reflection characteristics.

The filling factor of the structures 3 on the surface of the base is in the range of 65% or more, preferably 73% or more, and more preferably 86% or more, and the upper limit thereof is 100%. By controlling the filling factor to be within these ranges, anti-reflection characteristics can be improved.

Here, the filling factor (average filling factor) of the structures 3 is a value determined as follows.

First, a photograph of the surface of the optical element 1 is taken in top view with a scanning electron microscope (SEM). Next, a unit cell Uc is selected from the obtained SEM photograph at random, and the arrangement pitch P1 and a track pitch Tp of the unit cell Uc are measured (refer to FIG. 15B). In addition, the area S of the bottom surface of any of four structures 3 included in the unit cell Uc is measured by image processing. Next, the filling factor is determined by formula (4) below using the measured arrangement pitch P1, the track pitch Tp, and the area S of the bottom surface.

$$\text{Filling factor} = (S(\text{tetra})/S(\text{unit})) \times 100 \quad (4)$$

Area of unit cell: $S(\text{unit}) = 2 \times ((P1 \times Tp) \times (1/2)) = P1 \times Tp$ Area of bottom surfaces of structures present in unit cell: $S(\text{tetra}) = S$.

The above-described process of calculating the filling factor is performed for ten unit cells selected from the obtained SEM photograph at random. The measured values are simply averaged (arithmetically averaged) to determine the average factor of the filling factor. This value is defined as the filling factor of the structures 3 on the surface of the base.

The ratio $(((2 \times 2r)/P1) \times 100)$ of the double of the diameter 2r to the arrangement pitch P1 is 127% or more, preferably 137% or more, and more preferably 146% or more. This is because, by controlling the ratio to be within this range, the filling factor of the structures 3 can be improved to improve anti-reflection properties. Here, the arrangement pitch P1 is the arrangement pitch of the structures 3 in the track direction, and the diameter 2r is the diameter of the bottom surface of each of the structures in the track direction. When the bottom surface of each of the structures has a circular shape, the diameter 2r corresponds to the diameter of the circle. When the bottom surface of each of the structures has an elliptical shape, the diameter 2r corresponds to the major axis of the ellipse.

FIGS. 17A and 17B show an example of the structure of a roll master for preparing the optical element having the above structure. This roll master differs from that of the first embodiment in that recessed structures 13 form a tetragonal lattice pattern or a quasi-tetragonal lattice pattern on the surface thereof.

Patterning is performed using a roll master exposure apparatus at an adequate feed pitch at a CAV while synchronizing a polarity inversion formatter signal with a rotation controller of a recording unit in each track to generate signals in such a manner that a two-dimensional pattern is spatially linked. Thus, a tetragonal lattice pattern or a quasi-tetragonal lattice pattern can be recorded. Preferably, a lattice pattern having a uniform spatial frequency is formed in a desired recording area of a resist formed on a master 12 by irradiation of a laser beam by adequately setting the frequency of the polarity inversion formatter signal and the number of rotations of the roll.

In the fourth embodiment, the projecting structures 3 are arranged on a surface of a base in a tetragonal lattice pattern or a quasi-tetragonal lattice pattern at a fine pitch equal to or less than the wavelength of visible light, and a hydrophilizing treatment is performed on the surface. Therefore, the same advantages as those of the first embodiment can be achieved.

Fifth Embodiment (An example in which structures are arranged in a meandering manner)

Figure 18A:
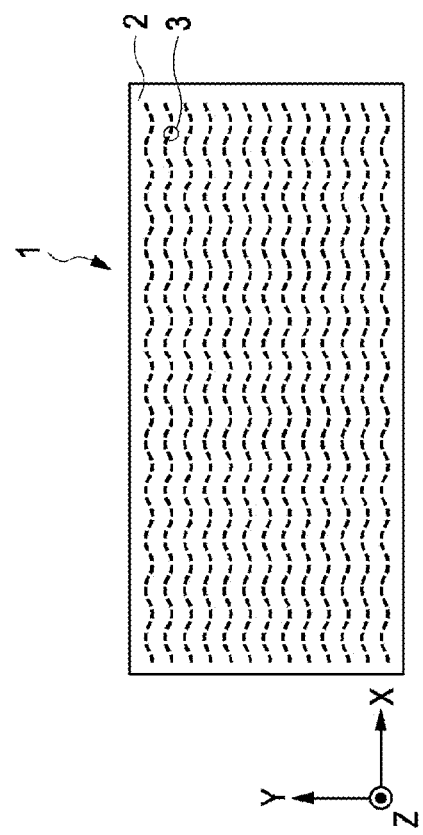
FIG. 18A is a schematic plan view showing an example of the structure of an optical element according to a fifth embodiment of the present invention.
Figure 18B:
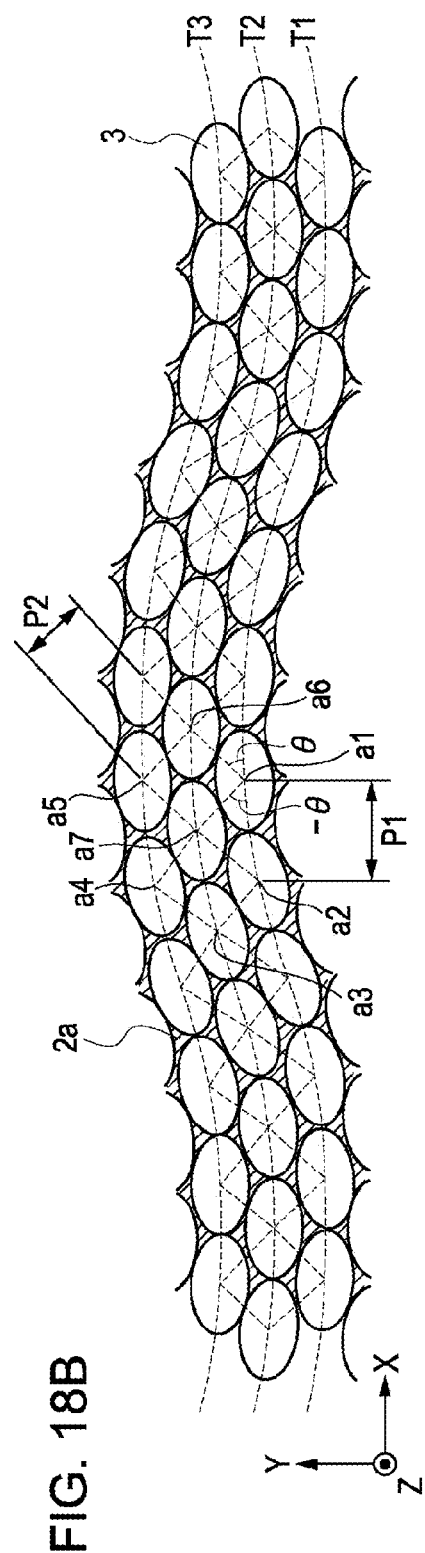
FIG. 18B is an enlarged plan view showing a part of the optical element shown in FIG. 18A.

FIG. 18A is a schematic plan view showing an example of the structure of an optical element according to a fifth embodiment. FIG. 18B is an enlarged plan view showing a part of the optical element shown in FIG. 18A.

An optical element 1 of the fifth embodiment differs from that of the first embodiment in that structures 3 are arranged on meandering tracks (hereinafter referred to as "wobble tracks"). The wobbles of respective tracks on a base 2 are preferably synchronized. That is, the wobbles are preferably synchronized wobbles. By synchronizing wobbles in this manner, a unit cell shape of a hexagonal lattice or a quasi-hexagonal lattice is maintained, and a high filling factor can be maintained. Examples of the waveform of the wobble tracks include sine waves and triangular waves. The waveform of the wobble tracks is not limited to a periodic waveform and may be an aperiodic waveform. The wobble amplitude of the wobble tracks is selected to be about ±10 μm, for example.

In this fifth embodiment, structures other than the structure described above are the same as those of the first embodiment.

According to the fifth embodiment, since the structures 3 are arranged on the wobble tracks, the generation of unevenness in the appearance can be suppressed.

Sixth Embodiment (An example in which recessed structures are formed on a surface of a base)

Figure 19A:
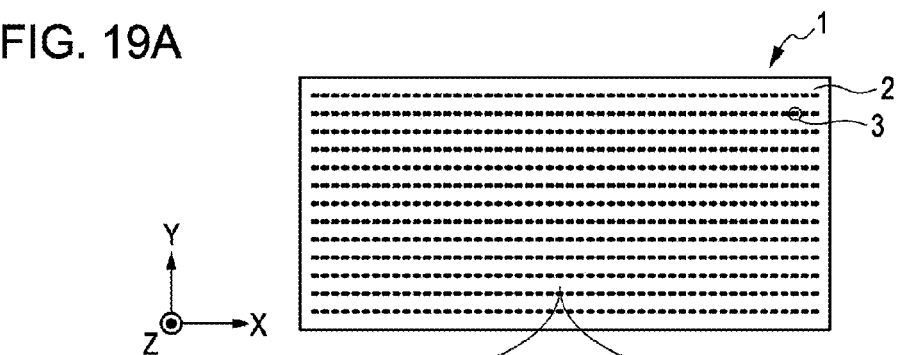
FIG. 19A is a schematic plan view showing an example of the structure of an optical element according to a sixth embodiment of the present invention.
Figure 19B:
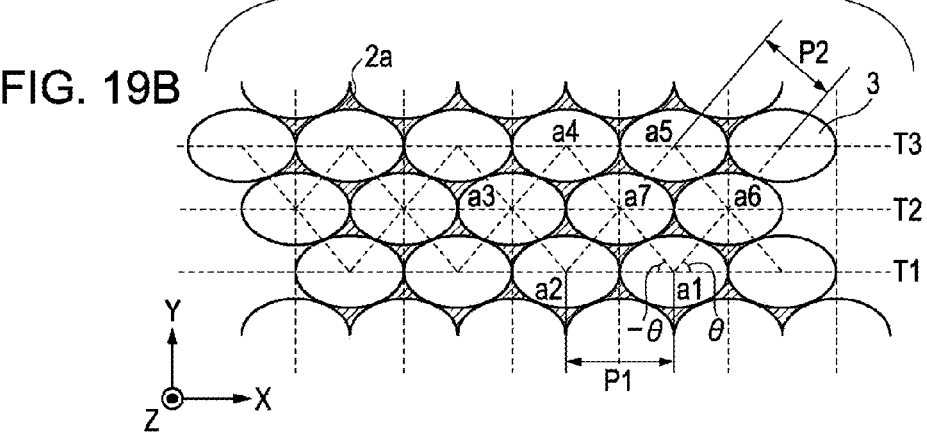
FIG. 19B is an enlarged plan view showing a part of the optical element shown in FIG. 19A.
Figure 19C:
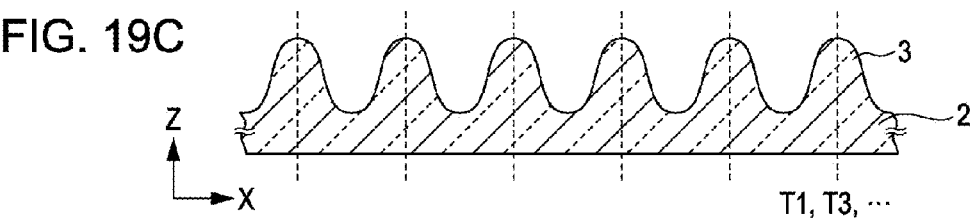
FIG. 19C is a cross-sectional view taken along tracks T1, T3, . . .
Figure 19D:
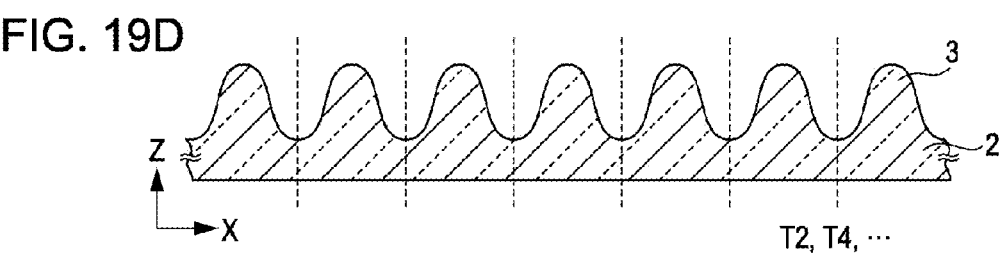
FIG. 19D is a cross-sectional view taken along tracks T2, T4, . . .
Figure 20:
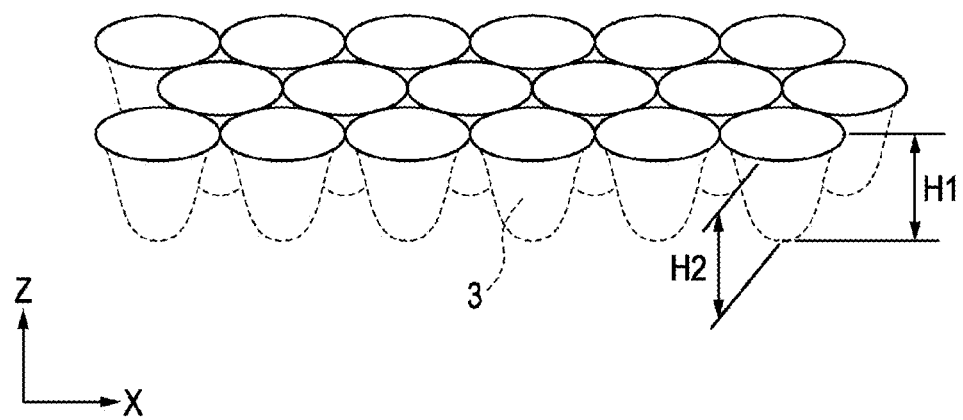
FIG. 20 is an enlarged perspective view showing a part of the optical element shown in FIGS. 19A to 19D.

FIG. 19A is a schematic plan view showing an example of the structure of an optical element according to a sixth embodiment. FIG. 19B is an enlarged plan view showing a part of the optical element shown in FIG. 19A. FIG. 19C is a cross-sectional view taken along tracks T1, T3, . . . in FIG. 19B. FIG. 19D is a cross-sectional view taken along tracks T2, T4, . . . in FIG. 19B. FIG. 20 is an enlarged perspective view showing a part of the optical element shown in FIGS. 19A to 19D.

An optical element 1 of the sixth embodiment differs from the optical element 1 of the first embodiment in that a large number of structures 3 which are recesses are arranged on a surface of a base. The shape of each of the structures 3 is a recessed shape obtained by inverting the projecting shape of each of the structures 3 in the first embodiment. When the structures 3 are composed of recesses as described above, an opening portion of each of the structures 3 which are recesses (an inlet portion of each of the recesses) is defined as a lower portion, and the lowermost portion (the deepest portion of each of the recesses) of the base 2 in the depth direction is defined as a top portion. That is, the top portion and the lower portion are defined using structures 3 that are unsubstantial spaces. Furthermore, in the sixth embodiment, since the structures 3 are recesses, the height H of the structures 3, for example, in formula (1) is the depth H of the structures 3.

In this sixth embodiment, structures other than the structure described above are the same as those of the first embodiment.

In the sixth embodiment, since the shape of the projecting structures 3 in the first embodiment is inversed to obtain shape of the recesses, the same advantages as those of the first embodiment can be achieved.

Seventh Embodiment (A first application example to a display apparatus)

[Structure of Liquid Crystal Display Apparatus]

Figure 21:
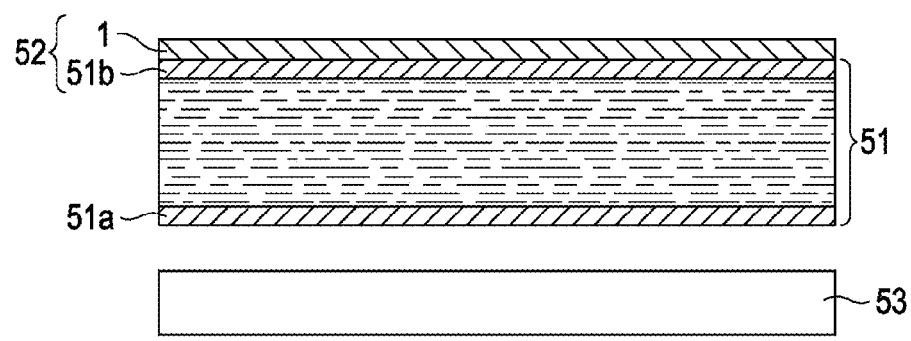
FIG. 21 is a cross-sectional view showing an example of the structure of a liquid crystal display apparatus according to a seventh embodiment.

FIG. 21 shows an example of the structure of a liquid crystal display apparatus according to a seventh embodiment. As shown in FIG. 21, the liquid crystal display apparatus includes a backlight 53 that emits light and a liquid crystal panel 51 that temporally and spatially modulates light emitted from the backlight 53 to display images. Polarizers 51a and 51b which are optical components are respectively provided on two surfaces of the liquid crystal panel 51. An optical element 1 is provided on the polarizer 51b provided on the display surface side of the liquid crystal panel 51. Here, the polarizer 51b having the optical element 1 on one main surface thereof is referred to as a polarizer 52 having an anti-reflection function. This polarizer 52 having an anti-reflection function is an example of an optical component having an anti-reflection function.

The backlight 53, the liquid crystal panel 51, polarizers 51a and 51b, and the optical element 1, all of which constitute the liquid crystal display apparatus, will now be sequentially described.

(Backlight)

For example, a direct-type backlight, an edge-type backlight, or a planar light source-type backlight can be used as the backlight 53. The backlight 53 includes, for example, a light source, a reflecting plate, an optical film, and the like. For example, a cold cathode fluorescent lamp (CCFL), a hot cathode fluorescent lamp (HCFL), an organic electroluminescence (OEL), an inorganic electroluminescence (IEL), a light-emitting diode (LED), or the like is used as the light source.

(Liquid Crystal Panel)

Examples of the display mode that can be used for the liquid crystal panel 51 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer-dispersed liquid crystal (PDLC) mode, and a phase-change guest host (PCGH) mode.

(Polarizer)

The polarizers 51a and 51b are respectively provided on two surfaces of the liquid crystal panel 51 so that transmission axes thereof are orthogonal to each other, for example. Each of the polarizers 51a and 51b allows only one of orthogonal polarized components of incident light to pass and blocks the other component by absorption. Each of the polarizers 51a and 51b may be a uniaxially stretched hydrophilic polymer film such as a polyvinyl alcohol film, a partially formalized polyvinyl alcohol film, an ethylene-vinyl acetate copolymer partially saponified film, or the like, with a dichroic substance, such as iodine or a dichroic dye, adsorbed thereto. A protective layer such as a triacetyl cellulose (TAC) film is preferably provided on each surface of the polarizers 51a and 51b. When a protective layer is provided in this manner, preferably, the base 2 of the optical element 1 also functions as the protective layer. This is because the thickness of the polarizer 52 having an anti-reflection function can be reduced in such a structure.

(Optical Element)

The optical element 1 is the same as any of the optical elements of the first to sixth embodiments described above. Therefore, a description thereof is omitted.

According to the seventh embodiment, since the optical element 1 is provided on the display surface of the liquid crystal display apparatus, the anti-reflection function of the display surface of the liquid crystal display apparatus can be improved. Accordingly, the visibility of the liquid crystal display apparatus can be improved.

Eighth Embodiment (A second application example to a display apparatus)

[Structure of Liquid Crystal Display Apparatus]

Figure 22:
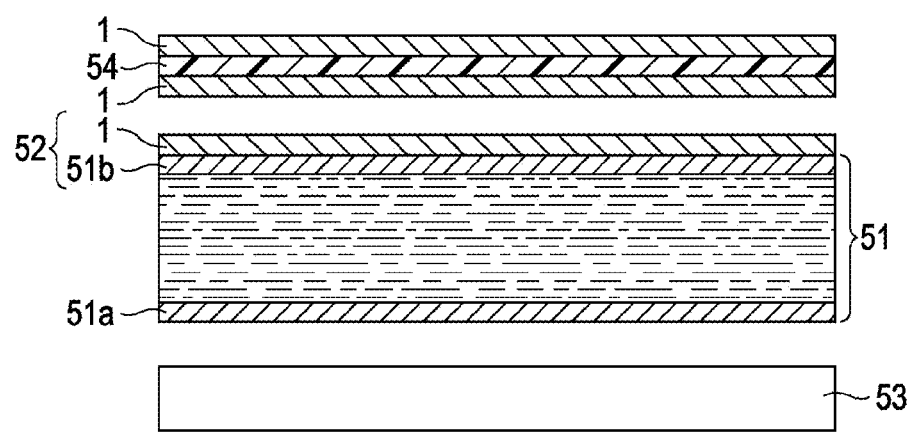
FIG. 22 is a cross-sectional view showing an example of the structure of a liquid crystal display apparatus according to an eighth embodiment.

FIG. 22 shows an example of the structure of a liquid crystal display apparatus according to an eighth embodiment of the present invention. This liquid crystal display apparatus differs from that of the seventh embodiment in that the liquid crystal display apparatus includes a front surface member 54 provided at the front surface side of a liquid crystal panel 51, and that an optical element 1 is provided on at least one of the front surface of the liquid crystal panel 51, and the front surface and the rear surface of the front surface member 54. FIG. 22 shows an example in which optical elements 1 are provided on all of the front surface of the liquid crystal panel 51, and the front surface and the rear surface of the front surface member 54. For example, an air layer is formed between the liquid crystal panel 51 and the front surface member 54. Parts the same as those of the seventh embodiment are assigned the same reference numerals, and a description thereof is omitted. Note that, in embodiments of the present invention, the "front surface" is the surface serving as a display surface, i.e., the surface located at the viewer's side, and the "rear surface" is the surface opposite the display surface.

The front surface member 54 is a front panel or the like used for the purpose of providing mechanical, thermal, and weathering protections and a design function to the front surface (viewer's side) of the liquid crystal panel 51. The front surface member 54 is, for example, sheet-shaped, film-shaped, or plate-shaped. Examples of the material of the front surface member 54 that can be used include glass, triacetyl cellulose (TAC), polyesters (TPEE), polyethylene terephthalate (PET), polyimides (PI), polyamides (PA), aramids, polyethylene (PE), polyacrylates, polyethersulfone, polysulfone, polypropylene (PP), diacetyl cellulose, polyvinyl chloride, acrylic resins (PMMA), and polycarbonate (PC). However, the material is not particularly limited to these materials and any material having transparency can be used.

According to the eighth embodiment, the visibility of the liquid crystal display apparatus can be improved as in the seventh embodiment.

EXAMPLES

The present invention will now be described by way of examples according to an embodiment.

(Thickness of $SiO_2$ Film)

In examples below, the thickness of a $SiO_2$ film was determined as follows.

First, an optical element (optical sheet) was cut in a direction in which tracks extend so as to include a top portion of a structure. An image of the cross section of the optical element (optical sheet) was taken with a transmission electron microscope (TEM). Next, the thickness of a $SiO_2$ film at the top portion of the structure was measured using the TEM image, and the measured thickness was determined as the thickness of the $SiO_2$ film.

Example 1

First, a glass roll master having an outer diameter of 126 mm was prepared, and a film of a resist was formed on a surface of the glass master as follows. Specifically, a photoresist was diluted to 1/10 with a thinner, and the diluted resist was then applied onto the columnar surface of the glass roll master by dipping so as to have a thickness of about 130 nm to form a film of the resist. Next, the glass master serving as a recording medium was transferred to the roll master exposure apparatus shown in FIG. 11, and the resist was exposed, thereby patterning latent images in the resist, the latent images being arranged in the form of a single spiral and forming a hexagonal lattice pattern in three adjacent tracks.

Specifically, an area where the hexagonal lattice pattern was to be formed was irradiated with a laser beam of 0.50 mW/m, which was a power with which exposure to the surface of the glass roll master could be performed, thus forming a recess-shaped hexagonal lattice pattern.

Next, a development treatment was performed on the resist formed on the glass roll master to dissolve the resist located in the exposed portions, thus conducting development. Specifically, the undeveloped glass roll master was placed on a turntable of a developing device (not shown), and a developer was dropped on the surface of the glass roll master while rotating the turntable, thus developing the resist on the surface. Accordingly, a resist glass master having a resist layer in which openings were formed in a hexagonal lattice pattern was prepared.

Next, plasma etching was conducted in a $CHF_3$ gas atmosphere using roll plasma etching. Consequently, on the surface of the glass roll master, the etching proceeded in only portions of the hexagonal lattice pattern exposed from the resist layer, and the other areas were not etched because the photoresist functioned as a mask. Thus, recesses each having an elliptical cone shape were obtained. The amount (depth) of etching in the pattern of this case was changed by changing the etching time. Lastly, the photoresist was completely removed by $O_2$ ashing to prepare a moth-eye glass roll master having a recess-shaped hexagonal lattice pattern. The depth of each of the recesses in the row direction was deeper than the depth of each of the recesses in the direction in which the tracks extend.

An acrylic sheet or the like onto which an ultraviolet-curable resin was applied was brought into close contact with the moth-eye glass roll master, and was then detached while conducting curing by applying ultraviolet light. Accordingly, an optical element was prepared in which an irregular surface having structures (surface having a moth-eye structure) was formed on a main surface thereof.

Next, a plasma treatment was conducted as a surface treatment on the irregular surface of the prepared optical element. Consequently, an optical element having an irregular surface to which hydrophilicity was imparted was obtained.

Example 2

An optical element having an irregular surface to which hydrophilicity was imparted was obtained as in Example 1 except that a corona treatment was conducted as the surface treatment.

Example 3

An optical element having an irregular surface to which hydrophilicity was imparted was obtained as in Example 1 except that a UV-ozone treatment was conducted as the surface treatment.

Example 4

An optical element having an irregular surface to which hydrophilicity was imparted was obtained as in Example 1 except that, as the surface treatment, a $SiO_2$ film having a thickness of 10 nm was formed by a sputtering method.

Example 5

An optical element having an irregular surface to which hydrophilicity was imparted was obtained as in Example 4 except that the thickness of the $SiO_2$ film was changed to 20 nm.

Example 6

An optical element having an irregular surface to which hydrophilicity was imparted was obtained as in Example 4 except that the thickness of the $SiO_2$ film was changed to 40 nm.

Example 7

An optical element having an irregular surface to which hydrophilicity was imparted was obtained as in Example 4 except that the thickness of the $SiO_2$ film was changed to 95 nm.

Example 8

An optical element having an irregular surface to which hydrophilicity was imparted was obtained as in Example 4 except that the thickness of the $SiO_2$ film was changed to 250 nm.

Example 9

An optical element having an irregular surface to which hydrophilicity was imparted was obtained as in Example 4 except that the thickness of the $SiO_2$ film was changed to 320 nm.

Example 10

A hexagonal lattice pattern with an arrangement pitch of 250 nm was recorded in a resist layer by patterning the resist layer while adjusting the frequency of a polarity inversion formatter signal, the number of rotations of a roll, and an appropriate feed pitch in each track. Furthermore, etching conditions for the resist layer were adjusted. Thus, the aspect ratio of each structure was controlled to be 1.1. An optical element having an irregular surface to which hydrophilicity was imparted was obtained as in Example 4 except for this.

Example 11

An optical element having an irregular surface to which hydrophilicity was imparted was obtained as in Example 4 except that before a $SiO_2$ film was formed by a sputtering method, a corona treatment was conducted on the irregular surface as the surface treatment.

Example 12

First, a moth-eye glass roll master was prepared as in Example 1. Next, an acrylic sheet onto which perhydro-polysilazane was applied was brought into close contact with the moth-eye glass roll master, and was then detached while conducting curing by heating. Accordingly, an optical element was prepared in which an irregular surface having structures was formed on a main surface thereof.

Example 13

An optical element having an irregular surface to which hydrophilicity was imparted was obtained as in Example 12 except that a corona treatment was conducted on the irregular surface as the surface treatment.

Example 14

An optical element having an irregular surface to which hydrophilicity was imparted was obtained as in Example 12 except that, as the surface treatment, a $SiO_2$ film having a thickness of 10 nm was formed by a sputtering method.

Example 15

An optical element having an irregular surface to which hydrophilicity was imparted was obtained as in Example 1 except that, as the surface treatment, perhydro-polysilazane was applied onto the irregular surface to form a $SiO_2$ film having a thickness of 50 nm.

Example 16

First, a moth-eye glass roll master was prepared as in Example 1. Next, a resin mixed solution (transfer material) was prepared by mixing 2-hydroxyethyl methacrylate/a tri-functional acrylic resin/a photopolymerization initiator/MEK in a mixing ratio (mass ratio) of 50/50/5/100. Subsequently, the resin mixed solution was applied onto an acrylic sheet, and dried. Next, the resulting acrylic sheet was brought into close contact with the moth-eye glass roll master, and was then detached while conducting curing by applying ultraviolet light. Accordingly, an optical element was prepared in which an irregular surface having structures was formed on a main surface thereof.

Example 17

An optical element having an irregular surface to which hydrophilicity was imparted was obtained as in Example 16 except that a corona treatment was conducted on the irregular surface as the surface treatment.

Example 18

An optical element having an irregular surface to which hydrophilicity was imparted was obtained as in Example 16 except that, as the surface treatment, a $SiO_2$ film having a thickness of 10 nm was formed by a sputtering method.

Example 19

First, an optical element was prepared as in Example 1. Next, a resin mixed solution was prepared by mixing 2-hydroxyethyl methacrylate/a trifunctional acrylic resin/a photopolymerization initiator/MEK in a mixing ratio (mass ratio) of 50/50/5/100. Subsequently, the resin mixed solution was applied onto an irregular surface of the optical element, dried, and then cured by applying ultraviolet light. Thus, a hydrophilic surface layer having a thickness of 50 nm was formed on the irregular surface of the optical element. An optical element having an irregular surface to which hydrophilicity was imparted was obtained.

Comparative Example 1

An optical element having an irregular surface was obtained as in Example 1 except that the step of plasma treatment as a surface treatment was omitted.

Comparative Example 2

An optical element having an irregular surface was obtained as in Example 1 except that an ultraviolet-curable resin containing $SnO_2$ was used as the ultraviolet-curable resin.

Comparative Example 3

An optical element having an irregular surface to which water repellency was imparted was obtained as in Example 1 except that a fluorine treatment was conducted as the surface treatment. The fluorine treatment was conducted by applying a fluorine-based coating material onto the irregular surface of the optical element by a dipping method and then performing curing.

(Evaluation of Shape)

The irregular surfaces of the optical elements of Examples 1 to 19 and Comparative Examples 1 to 3 were observed with an atomic force microscope (AFM). However, the observation was performed before the surface treatment. The heights H and arrangement pitches Pa of the structures of the respective examples were determined from cross-sectional profiles of the AFM. In addition, the aspect ratio (H/Pa) was determined using the height H and the arrangement pitch Pa. The results are shown in Table 2.

The height of the structures in the direction in which the tracks extend was smaller than the height of the structures in the row direction of the tracks, and the height of the structures in directions other than the direction in which the tracks extend was substantially the same as the height of the structures in the row direction of the tracks. Accordingly, the height of the structures was represented by the height in the row direction of the tracks.

(Evaluation of Reflectivity)

The reflectivity of the optical elements of Examples 1 to 19 and Comparative Examples 1 to 3 was evaluated with an evaluation apparatus (V-550) manufactured by JASCO Corporation. Among the evaluation results, the reflectivity at a wavelength of 550 nm is shown in Table 2.

(Evaluation of Contact Angle)

The contact angles of pure water and oleic acid on the irregular surfaces of the optical elements of Examples 1 to 19 and Comparative Examples 1 to 3 were measured. The measurement of the contact angles was conducted with a model CA-XE manufactured by Kyowa Interface Science Co., Ltd. The results are shown in Table 2.

(Evaluation of Property of Wiping Off Fingerprints with Water)

First, a fingerprint was put on the irregular surface of each of the prepared optical elements of Examples 1 to 19 and Comparative Examples 1 to 3 by pressing, and was then wiped off with a cotton wiper soaked with pure water. Subsequently, the wiped portion was visually observed to evaluate the presence or absence of the fingerprint. The results are shown in Table 2 using symbol "B" and symbol "D". Note that symbol "B" and symbol "D" represent the evaluation results below.

B: The trace of the fingerprint was not seen.
D: The trace of the fingerprint remained.

First, a fingerprint was put on the irregular surface of each of the prepared optical elements of Examples 1 to 19 and Comparative Examples 1 to 3 by pressing. The fingerprint was then wiped off with a cotton wiper soaked with pure water, and the number of times necessary for wiping off the fingerprint was counted. The results are shown in Table 2 using symbols "A", "B", "C", and "D". Note that the symbols represent the evaluation results below.

A: The fingerprint could be removed by wiping once.
B: The fingerprint could be removed by wiping twice.
C: The fingerprint could be removed by wiping three times.
D: The fingerprint could not be removed by wiping three times.

(Evaluation of Abrasion Resistance)

In order to evaluate abrasion resistance of the prepared optical elements of Examples 4 to 10, first, the surface of each of the optical elements was rubbed 100 times in a reciprocating manner using gauze at a load of 100 gf. Next, a fingerprint was put on the irregular surface of each of the optical elements by pressing. The fingerprint was then wiped off with a cotton wiper soaked with pure water, and the number of times necessary for wiping off the fingerprint was counted. The results are shown in Table 2 using symbols "A", "B", "C", and "D". Note that the symbols represent the evaluation results below.

A: The fingerprint could be removed by wiping once.
B: The fingerprint could be removed by wiping twice.
C: The fingerprint could be removed by wiping three times.
D: The fingerprint could not be removed by wiping three times.

TABLE 2

|  | Surface treatment | Formation of structures | Pitch (nm) | Aspect ratio | Reflectivity (%) | |
| --- | --- | --- | --- | --- | --- | --- |
|  |  |  |  |  | Before treatment | After treatment |
| Example 1 | Plasma treatment | UV-curable resin | 300 | 0.7 | 0.05 | 0.05 |
| Example 2 | Corona treatment | UV-curable resin | 300 | 0.7 | 0.05 | 0.05 |
| Example 3 | UV-ozone treatment | UV-curable resin | 300 | 0.7 | 0.05 | 0.05 |

TABLE 2-continued

| | | | | | | |
|---|---|---|---|---|---|---|
| Example 4 | SiO₂ sputtering (10 nm) | UV-curable resin | 300 | 0.7 | 0.05 | 0.05 |
| Example 5 | SiO₂ sputtering (20 nm) | UV-curable resin | 300 | 0.7 | 0.05 | 0.05 |
| Example 6 | SiO₂ sputtering (40 nm) | UV-curable resin | 300 | 0.7 | 0.05 | 0.05 |
| Example 7 | SiO₂ sputtering (95 nm) | UV-curable resin | 300 | 0.7 | 0.05 | 0.06 |
| Example 8 | SiO₂ sputtering (250 nm) | UV-curable resin | 300 | 0.7 | 0.05 | 0.08 |
| Example 9 | SiO₂ sputtering (320 nm) | UV-curable resin | 300 | 0.7 | 0.05 | 0.5 |
| Example 10 | SiO₂ sputtering (10 nm) | UV-curable resin | 250 | 1.1 | 0.03 | 0.03 |
| Example 11 | Corona treatment + SiO₂ sputtering (10 nm) | UV-curable resin | 300 | 0.7 | 0.05 | 0.05 |
| Example 12 | Non-treated | Perhydro-polysilazane | 300 | 0.7 | 0.05 | — |
| Example 13 | Corona treatment | Perhydro-polysilazane | 300 | 0.7 | 0.05 | 0.05 |
| Example 14 | SiO₂ sputtering (10 nm) | Perhydro-polysilazane | 300 | 0.7 | 0.05 | 0.05 |
| Example 15 | Application of perhydro-polysilazane | UV-curable resin | 300 | 0.7 | 0.05 | 0.05 |
| Example 16 | Non-treated | Hydrophilic resin | 300 | 0.7 | 0.05 | — |
| Example 17 | Corona treatment | Hydrophilic resin | 300 | 0.7 | 0.05 | 0.05 |
| Example 18 | SiO₂ sputtering (10 nm) | Hydrophilic resin | 300 | 0.7 | 0.05 | 0.05 |
| Example 19 | Application of hydrophilic resin on surface | UV-curable resin | 300 | 0.7 | 0.05 | 0.05 |
| Comparative Example 1 | Non-treated | UV-curable resin | 300 | 0.7 | 0.05 | — |
| Comparative Example 2 | Non-treated | SnO₂-added UV-curable resin | 300 | 0.7 | 0.05 | — |
| Comparative Example 3 | Fluorine treatment | UV-curable resin | 300 | 0.7 | 0.05 | 0.05 |

| | Contact angle (deg.) | | Initial Evaluation of property of wiping off | Initial The number of times of wiping | Evaluation of property of wiping off | Abrasion resistance (100 times) The number of times of wiping | Evaluation of property of wiping off |
|---|---|---|---|---|---|---|---|
| | Pure water | Oleic acid | fingerprint with water | | fingerprint with water | | fingerprint with water |
| Example 1 | 10.6 | 8.8 | B | 1 | A | — | — |
| Example 2 | 13.7 | 8.5 | B | 1 | A | — | — |
| Example 3 | 14.1 | 9.4 | B | 1 | A | — | — |
| Example 4 | 3.7 | 11 | B | 1 | A | 1 | A |
| Example 5 | 3.6 | 10.8 | B | 1 | A | 1 | A |
| Example 6 | 3.2 | 10.9 | B | 1 | A | 1 | A |
| Example 7 | 3.3 | 10.3 | B | 1 | A | 2 | B |
| Example 8 | 3.1 | 10.5 | B | 1 | A | 3 | C |
| Example 9 | 3.4 | 10.4 | B | 1 | A | 3 | C |
| Example 10 | 2.9 | 10.7 | B | 1 | A | 1 | A |
| Example 11 | 4.2 | 13.2 | B | 1 | A | — | — |
| Example 12 | 18.2 | 14.8 | B | 2 | B | — | — |
| Example 13 | 12.5 | 9 | B | 1 | A | — | — |
| Example 14 | 3.6 | 11.1 | B | 1 | A | — | — |
| Example 15 | 20.1 | 18.7 | B | 2 | B | — | — |
| Example 16 | 20.4 | 15.8 | B | 3 | C | — | — |
| Example 17 | 12.6 | 9.2 | B | 1 | A | — | — |
| Example 18 | 3.4 | 10.6 | B | 1 | A | — | — |
| Example 19 | 22.5 | 16.8 | B | 3 | C | — | — |
| Comparative Example 1 | 69.6 | 16.4 | D | — | D | — | — |
| Comparative Example 2 | 40.2 | 14.8 | D | — | D | — | — |
| Comparative Example 3 | 121.7 | 94.1 | D | — | D | — | — |

The following is seen from Table 2.

In Examples 1 to 5, in which hydrophilicity was imparted to the irregular surface of the optical element, the contact angles to pure water and oleic acid could be made to be 30° or less. Accordingly, stains adhering to the irregular surface could be easily removed by wiping with water. In contrast, in Comparative Examples 1 and 2, in which no treatment was conducted on the irregular surface of the optical element, the contact angle to oleic acid was 30° or less, but the contact angle to pure water exceeded 30°. Accordingly, it was difficult to remove stains adhering to the irregular surface by wiping with water. In Comparative Example 3, in which water repellency was imparted to the irregular surface of the optical element, both the contact angle to pure water and the contact angle to oleic acid exceeded 90°. Accordingly, it was difficult to remove stains adhering to the irregular surface by wiping with water.

Reference Example 1

First, a glass roll master having an outer diameter of 126 mm was prepared, and a film of a resist was formed on a surface of the glass master as follows. Specifically, a photoresist was diluted to 1/10 with a thinner, and the diluted resist was then applied onto the columnar surface of the glass roll master by dipping so as to have a thickness of about 130 nm to form a film of the resist. Next, the glass master serving as a recording medium was transferred to the roll master exposure apparatus shown in FIG. 11, and the resist was exposed, thereby patterning latent images in the resist, the latent images being arranged in the form of a single spiral and forming a hexagonal lattice pattern in three adjacent tracks.

Specifically, an area where the hexagonal lattice pattern was to be formed was irradiated with a laser beam of 0.50 mW/m, which was a power with which exposure to the surface of the glass roll master could be performed, thus forming a recess-shaped hexagonal lattice pattern. As shown in FIG. 13A, the thickness of the resist in the row direction of the track rows was about 120 nm, and the thickness of the resist in the direction in which the tracks extend was about 100 nm.

Next, a development treatment was performed on the resist formed on the glass roll master to dissolve the resist located on the exposed portions, thus conducting development. Specifically, the undeveloped glass roll master was placed on a turntable of a developing device (not shown), and a developer was dropped on the surface of the glass roll master while rotating the turntable, thus developing the resist on the surface. Accordingly, a resist glass master having a resist layer in which openings were formed in a hexagonal lattice pattern was prepared.

Next, plasma etching was conducted in a $CHF_3$ gas atmosphere using roll plasma etching. Consequently, on the surface of the glass roll master, the etching proceeded in only portions of the hexagonal lattice pattern exposed from the resist layer, and the other areas were not etched because the photoresist functioned as a mask. Thus, recesses each having an elliptical cone shape were obtained. The amount (depth) of etching in the pattern of this case was changed by changing the etching time. Lastly, the photoresist was completely removed by $O_2$ ashing to prepare a moth-eye glass roll master having a recess-shaped hexagonal lattice pattern. The depth of each of the recesses in the row direction was deeper than the depth of each of the recesses in the direction in which the tracks extend.

An acrylic sheet or the like onto which an ultraviolet-curable resin was applied was brought into close contact with the moth-eye glass roll master, and was then detached while conducting curing by applying ultraviolet light. Thus, an optical element (FIG. 13C) was prepared.

Reference Example 2

A quasi-hexagonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

Reference Example 3

A tetragonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

Reference Example 4

A quasi-tetragonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

(Evaluation of Shape)

The optical elements of Reference Examples 1 to 4 prepared as described above were observed with an atomic force microscope (AFM). The heights of the structures of the respective reference examples were determined from cross-sectional profiles of the AFM. The results are shown in Tables 3 and 4.

TABLE 3

|  | Reference Example 1 | Reference Example 2 |
| --- | --- | --- |
| Lattice pattern | Hexagonal lattice | Quasi-hexagonal lattice |
| Height in the direction in which tracks extend | 243 nm | 308 nm |
| Height in the row direction | 301 nm | 348 nm |
| Period (P1) in the direction in which tracks extend | 300 nm | 315 nm |
| Period (P2) in the direction of 60 degrees | 300 nm | 300 nm |
| Average period | 300 nm | 305 nm |
| Aspect ratio | 1 | 1.14 |

TABLE 4

|  | Reference Example 3 | Reference Example 4 |
| --- | --- | --- |
| Lattice pattern | Tetragonal lattice | Quasi-tetragonal lattice |
| Height in the direction of (about) 45 degrees with respect to the direction in which tracks extend | 248 nm | 202 nm |
| Height in the row direction | 275 nm | 226 nm |

TABLE 4-continued

|  | Reference Example 3 | Reference Example 4 |
|---|---|---|
| Period (P1) in the direction in which tracks extend | 360 nm | 360 nm |
| Track period | 180 nm | 160 nm |
| Period (P2) | 255 nm | 241 nm |
| Aspect ratio | 1.08 | 0.94 |

The moth-eye shape of the optical elements in Reference Examples 1 and 2 is a projection-shaped truncated elliptical cone (elliptical cone) of a hexagonal lattice and a quasi-hexagonal lattice, respectively. From the measurement of the cross-sectional shape with the AFM, it is found that the height of the structures in the direction in which the tracks extend is smaller than the height of the structures in the row direction of the tracks. In addition, since the height of the structures in directions other than the direction in which the tracks extend is substantially the same as the height of the structures in the row direction of the tracks, the height of the structures is represented by the height in the row direction of the tracks.

The moth-eye shape of the optical elements in Reference Examples 3 and 4 is a projection-shaped truncated elliptical cone (elliptical cone) of a tetragonal lattice and a quasi-tetragonal lattice, respectively. From the measurement of the cross-sectional shape with the AFM, it is found that the height of the structures in a direction 45 degrees with respect to the direction in which the tracks extend is smaller than the height of the structures in the row direction of the tracks. In addition, since the height of the structures in directions other than the direction 45 degrees with respect to the direction in which the tracks extend is substantially the same as the height of the structures in the row direction of the tracks, the height of the structures is represented by the height in the row direction of the tracks.

(Evaluation of Reflectivity/Transmittance)

Figure 23:
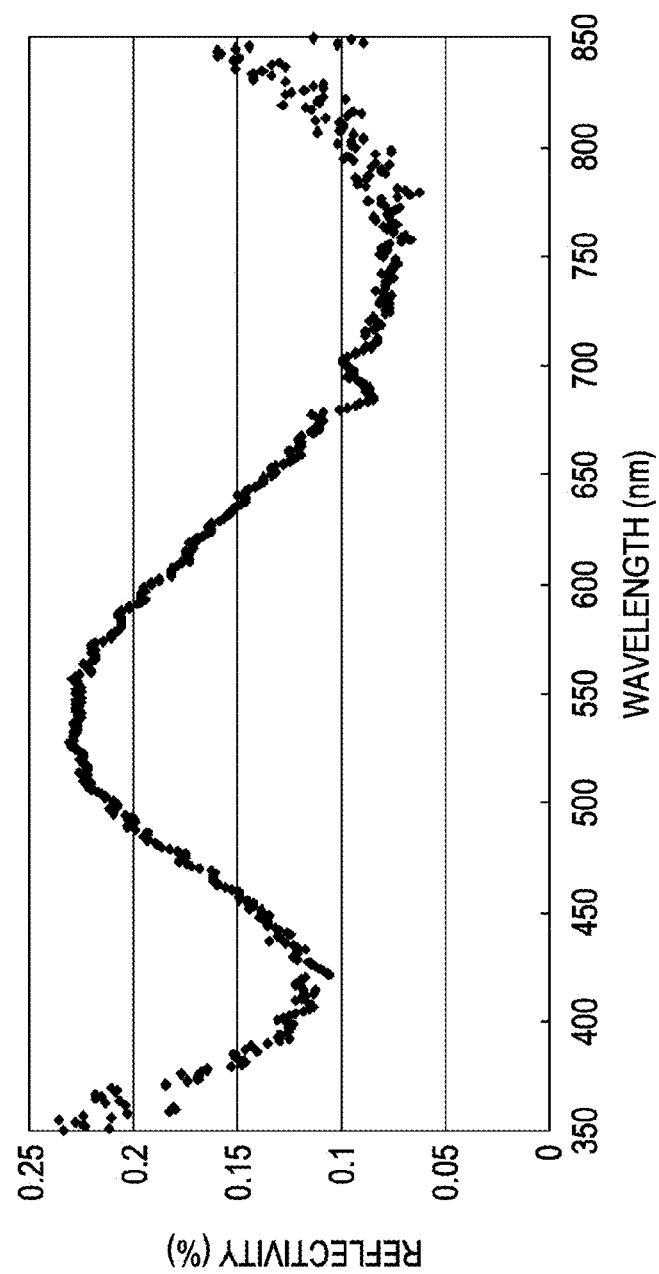
FIG. 23 is a graph showing the wavelength dependence of the reflectivity in an optical element of Reference Example 1.
Figure 24:
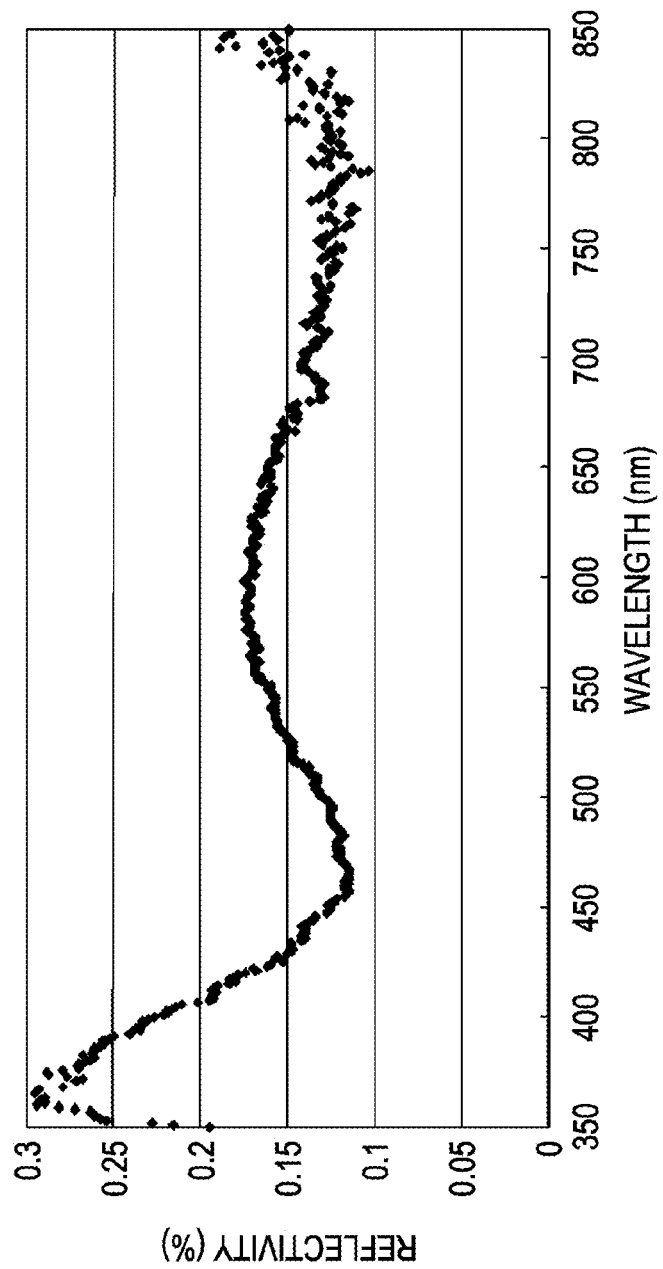
FIG. 24 is a graph showing the wavelength dependence of the reflectivity in an optical element of Reference Example 2.
Figure 25:
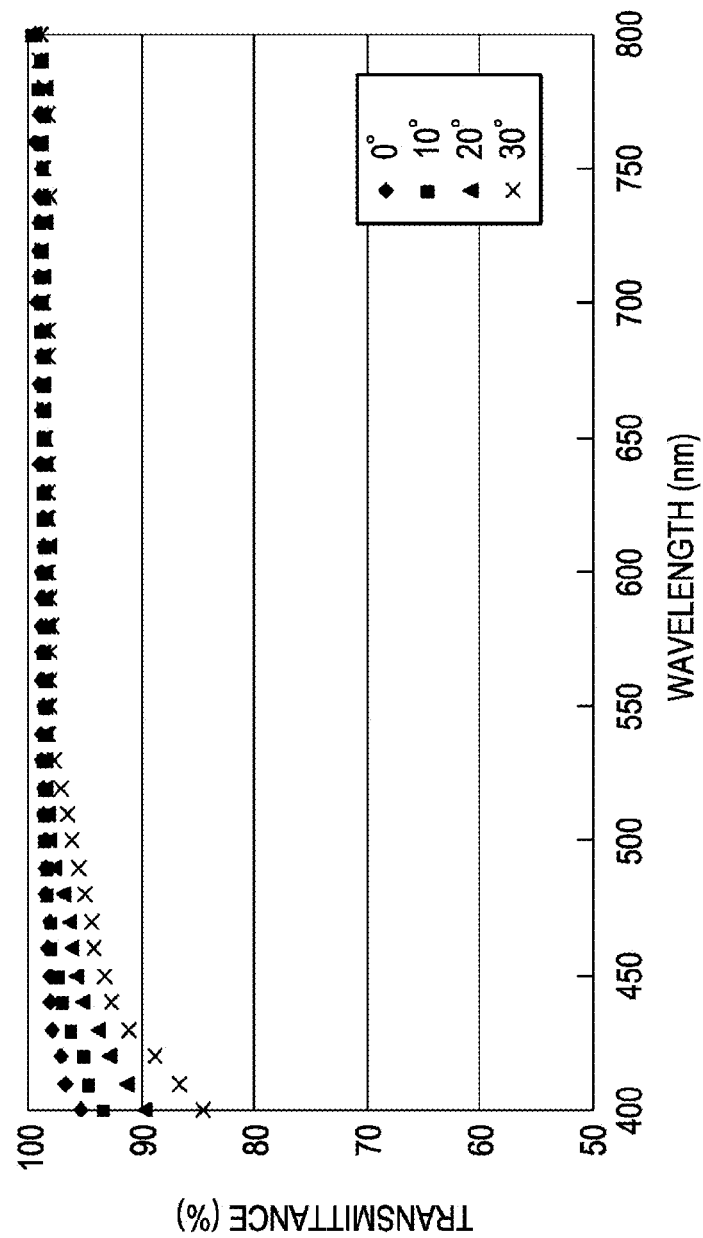
FIG. 25 is a graph showing the wavelength dependence of the transmittance in an optical element of Reference Example 3.
Figure 26:
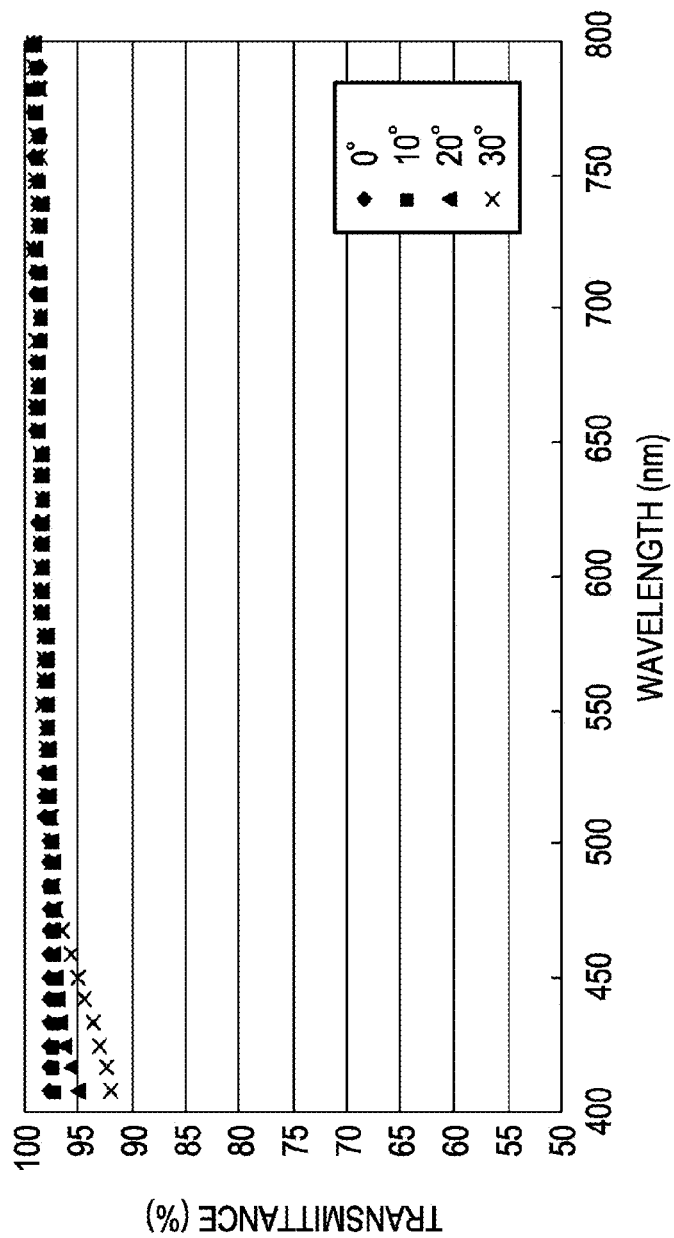
FIG. 26 is a graph showing the wavelength dependence of the transmittance in an optical element of Reference Example 4.

The reflectivity and the transmittance of the optical elements of Reference Examples 1 to 4 were evaluated with an evaluation apparatus (V-550) manufactured by JASCO Corporation. FIGS. 23 and 24 show the wavelength dependence of the reflectivity in the optical elements of Reference Examples 1 and 2, respectively. FIGS. 25 and 26 show the wavelength dependence of the transmittance in the optical elements of Reference Examples 3 and 4, respectively.

In the optical elements of Reference Examples 1 and 2, there is a wavelength dependence of the reflectivity. However, the reflectivity of a substrate that does not have a moth-eye pattern is 4.5%. In addition, the average reflectivity in the range from UV light to visible light (wavelength: 350 to 800 nm) is 0.15%, and thus this is a sufficiently small value. It was confirmed that a satisfactory anti-reflection effect could be obtained in optical elements including structures each having a small height in the direction in which the tracks extend.

In Reference Examples 3 and 4, the transmittance is in the range of 98% to 99% in the visible light range (wavelength: 400 to 800 nm), and thus satisfactory transmission characteristics are obtained. Up to an angle of incidence of 30 degrees, the transmittance of RGB light beams having the wavelengths of 650 nm, 540 nm, and 460 nm, respectively, is 99%. Thus, the angular dependence is also satisfactory. It was also confirmed that satisfactory transmission characteristics could be obtained in optical elements including structures each having a small height in the direction of 45 degrees with respect to the direction in which the tracks extend.

As described above, the moth-eye shape of the above optical elements was a projection-shaped truncated elliptical cone (elliptical cone) of a hexagonal lattice, a quasi-hexagonal lattice, a tetragonal lattice, or a quasi-tetragonal lattice, and satisfactory anti-reflection characteristics could be obtained in optical elements having an aspect ratio in the range of 0.94 to 1.14. Also in the moth-eye glass masters, it was confirmed that recessed elliptical cone-shaped grooves were formed.

Reference Example 5

First, a moth-eye glass master was prepared as in Reference Example 2. Next, an ultraviolet-curable resin was applied onto the moth-eye glass master, and an acrylic sheet (having a thickness of 0.20 mm) was then brought into close contact with the ultraviolet-curable resin. The ultraviolet-curable resin was cured by irradiation of ultraviolet light and then detached to prepare a moth-eye ultraviolet-cured duplicate sheet.

Next, the reverse face of the moth-eye ultraviolet-cured duplicate sheet was brought into close contact with a convex surface of a plano-convex lens having a diameter φ of 25 mm (focal length: 70 mm). Subsequently, the moth-eye ultraviolet-cured duplicate sheet was bent into a convex lens shape while bringing the plano-convex lens into closer contact with the moth-eye ultraviolet-cured duplicate sheet using a lens holder in a hot water bath at 80° C. Next, after being left to stand for several minutes in the hot water bath, the moth-eye ultraviolet-cured duplicate sheet and the plano-convex lens were taken out. The lens holder was then detached to prepare a moth-eye ultraviolet-cured duplicate sheet that was bent into the convex lens shape.

Next, a conductivity-imparting film composed of a nickel film was formed on an irregular pattern of the moth-eye ultraviolet-cured duplicate sheet that was bent into the convex lens shape by an electroless plating method or the like. Next, the optical disk master having the conductivity-imparting film thereon was attached to an electroforming apparatus, and a nickel plating layer was formed on the conductivity-imparting film by an electroplating method so as to have a thickness of about 300±5 μm. Next, the nickel plating layer was detached from the moth-eye ultraviolet-cured duplicate sheet with a cutter or the like, and a photoresist on a signal-forming surface of the nickel plating layer was washed with acetone and the like to prepare a moth-eye nickel (Ni) metal master that was bent into the convex lens shape.

Next, a moth-eye molded duplicate substrate that was bent into the convex lens shape was prepared as follows. The moth-eye Ni metal master that was bent into the convex lens shape was placed in a mold, and a substrate was formed by injection molding using a transparent resin of polycarbonate (refractive index: 1.59). Thus, the quasi-hexagonal lattice pattern formed on the signal-forming surface was transferred to the transparent resin to prepare the moth-eye molded duplicate substrate that was bent into the convex lens shape.

(Evaluation of Reflectivity/Transmittance)

Figure 27:
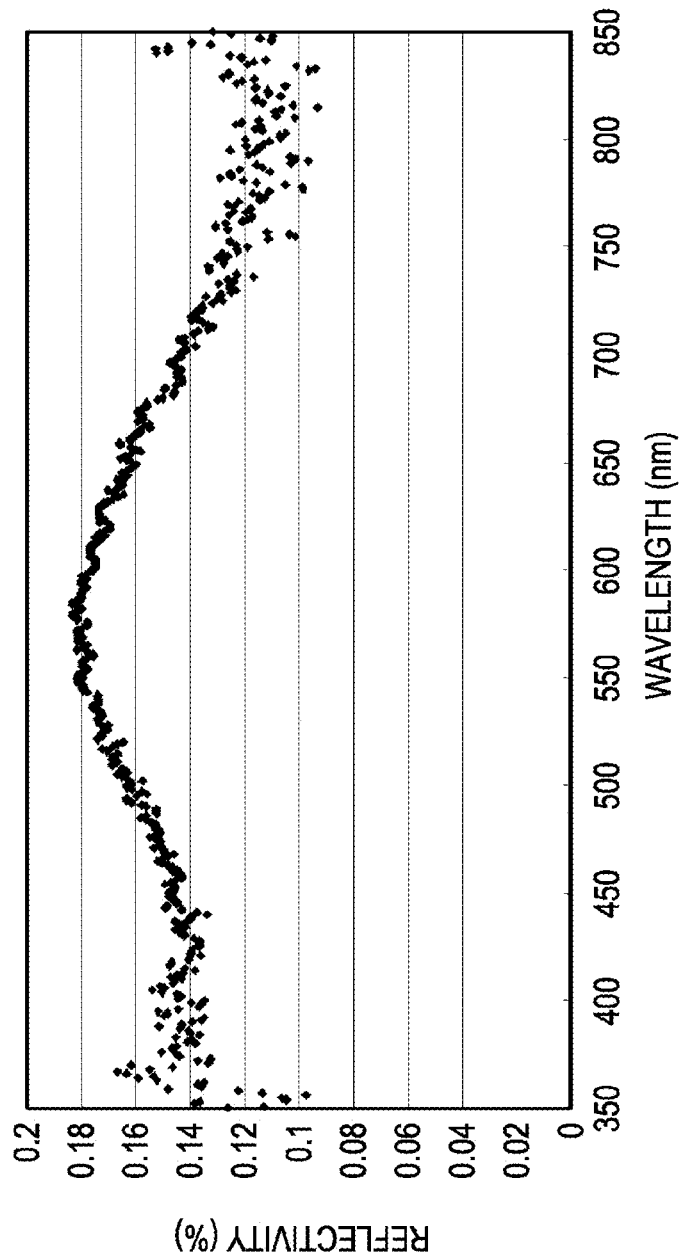
FIG. 27 is a graph showing the wavelength dependence of the reflectivity in an optical element of Reference Example 5.

The reflectivity of the optical element of Reference Example 5 was evaluated with an evaluation apparatus (V-550) manufactured by JASCO Corporation. FIG. 27 shows the wavelength dependence of the reflectivity in the optical element of Reference Example 5.

Reference Example 6

A quasi-hexagonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

Reference Example 7

A tetragonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

Reference Example 8

A tetragonal lattice pattern was recorded in a resist layer by patterning the resist layer while adjusting the frequency of a polarity inversion formatter signal, the number of rotations of a roll, and an appropriate feed pitch in each track. An optical element was prepared as in Reference Example 1 except for this.

(Evaluation of Shape)

The optical elements of Reference Examples 6 to 8 prepared as described above were observed in top view with a scanning electron microscope (SEM). The results are shown in Table 5.

TABLE 5

Figure 28:
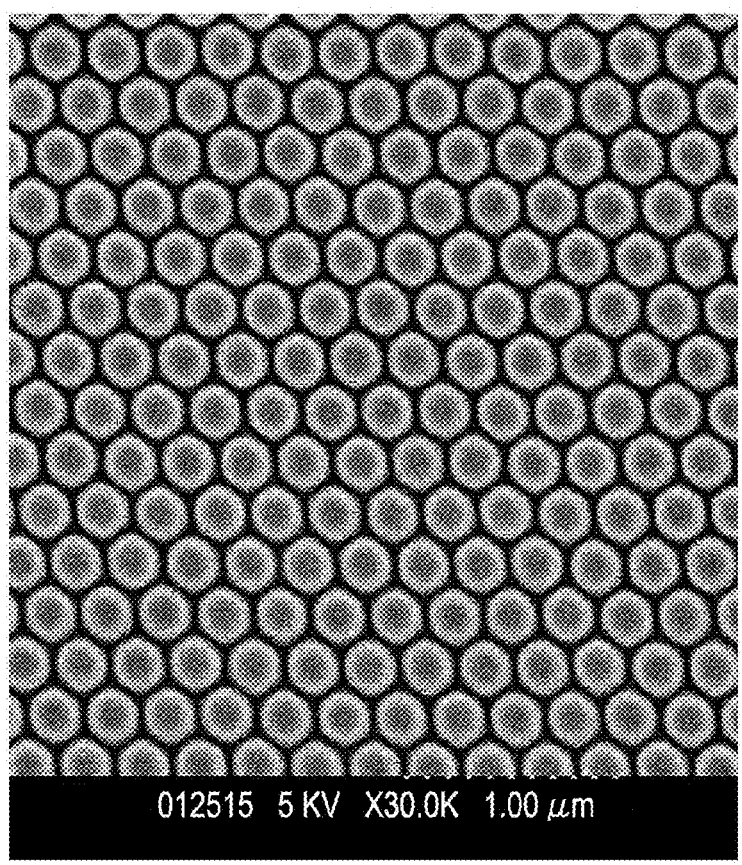
FIG. 28 is a scanning electron microscope (SEM) photograph showing a top view of an optical element of Reference Example 6.
Figure 29:
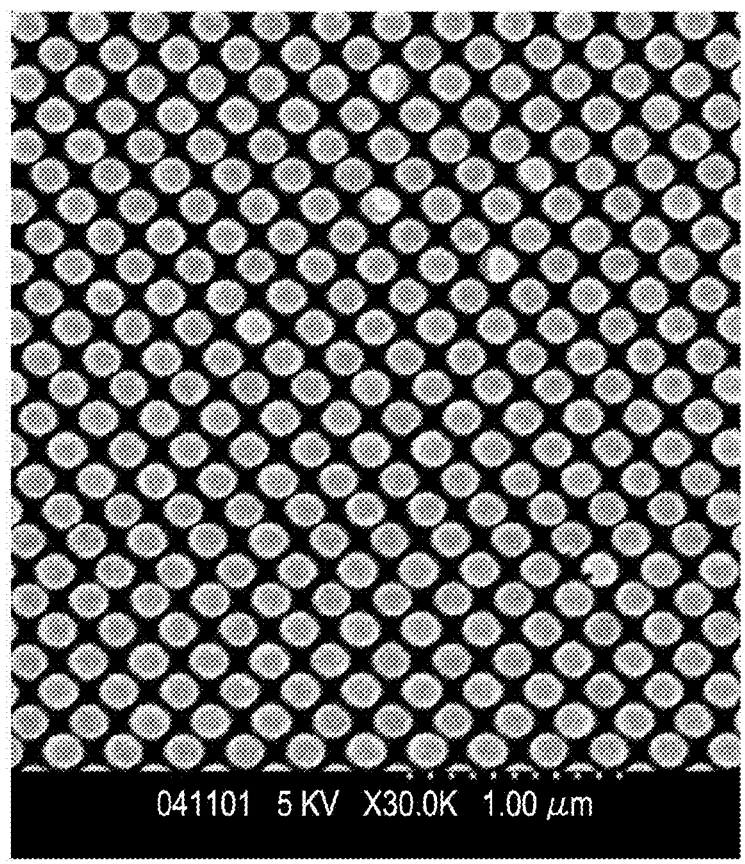
FIG. 29 is a SEM photograph showing a top view of an optical element of Reference Example 8.
Figure 30:
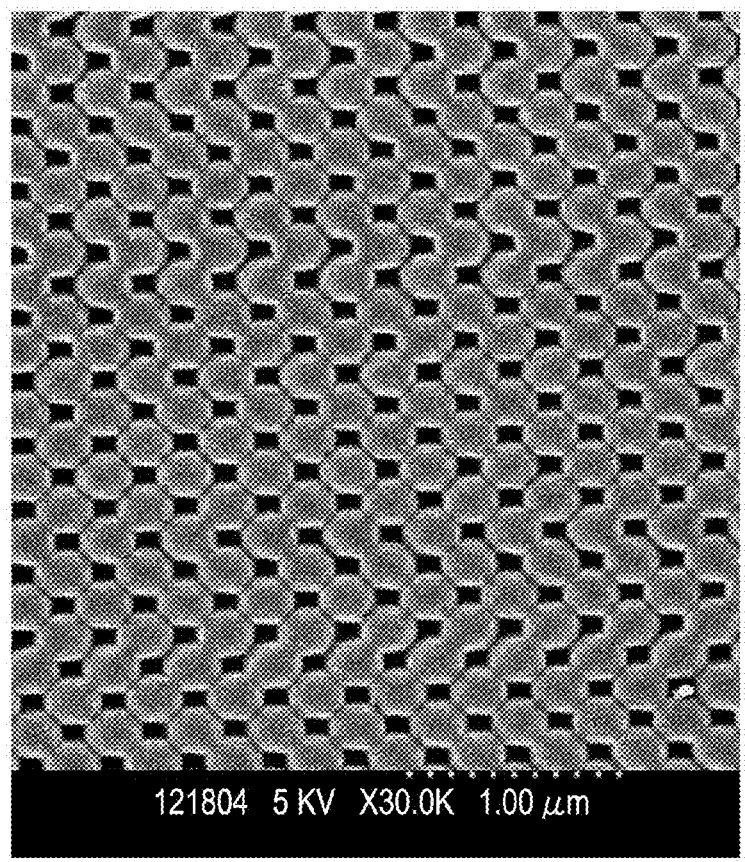
FIG. 30 is a SEM photograph showing a top view of an optical element of Reference Example 7.

|  | Reference Example 6 | Reference Example 8 | Reference Example 7 |
| --- | --- | --- | --- |
| SEM image | FIG. 28 | FIG. 29 | FIG. 30 |
| Lattice pattern | Quasi-hexagonal lattice | Tetragonal lattice | Tetragonal lattice |
| Shape of bottom surface of structure | Ellipse | Ellipse | Ellipse |
| Height H2 in the row direction | 317 nm | 218 nm | 279 nm |
| Arrangement pitch P1 | 315 nm | 280 nm | 300 nm |
| Track pitch | 250 nm | 140 nm | 150 nm |
| Arrangement pitch P2 | 296 nm | 198.0 nm | 212.1 nm |

Referring to FIG. 28, in Reference Example 6, structures are arranged in a quasi-hexagonal lattice pattern. Also, the figure shows that the shape of the bottom surface of each of the structures is an elliptical shape.

Referring to FIGS. 29 and 30, in Reference Examples 7 and 8, structures are arranged in a tetragonal lattice pattern. Also, the figures show that the shape of the bottom surface of the structures is an elliptical shape. Furthermore, in Reference Example 7, the structures are arranged so that lower portions of the structures overlap each other.

Next, the relationship between the height of structures and the reflectivity was examined by a rigorous coupled-wave analysis (RCWA) simulation.

Test Example 1

Figure 31:
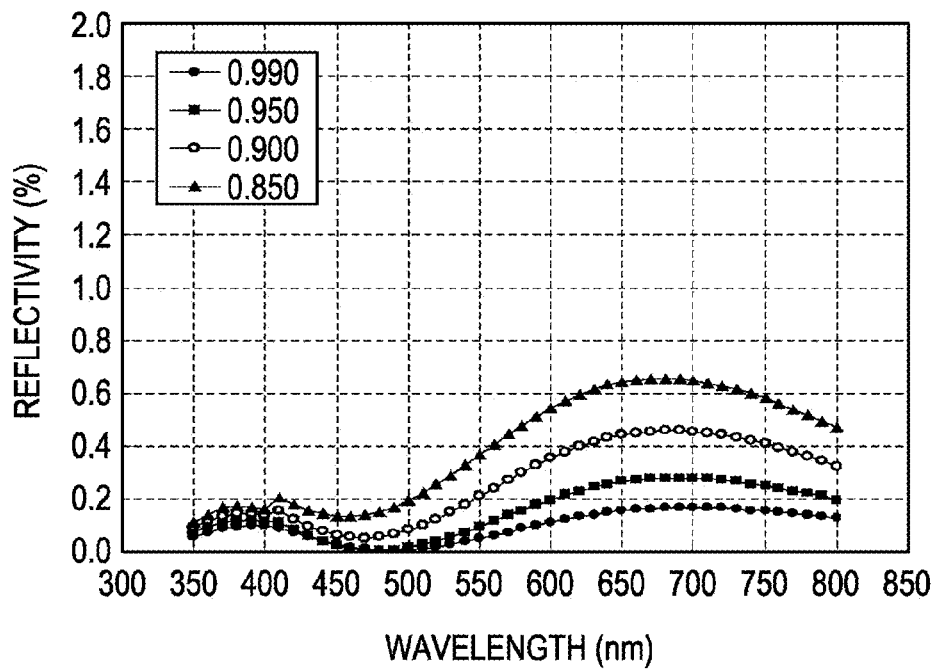
FIG. 31 is a graph showing the results of a simulation of Test Example 1.

The RCWA simulation was conducted while the bottom surface diameter (diameter) 2r of the structures was made to be 85%, 90%, 95%, and 99% with respect to the arrangement pitch P1. The results are shown in FIG. 31.

The conditions for the simulation are described below.
Shape of structures: Hanging bell shape
Polarization: Non-polarization
Refractive index: 1.48
Track pitch Tp: 320 nm
Height of structures: 365 nm
Aspect ratio: 1.14
Arrangement of structures: Hexagonal lattice Referring to FIG. 31, when the bottom surface diameter of the structures is changed and the filling factor decreases, the reflectivity degrades.

Test Example 2

The RCWA simulation was conducted as in Test Example 1 except that low protruding portions with an aspect ratio of 0.3 were provided between structures arranged in the track direction. The results are shown in FIG. 32.

Figure 32:
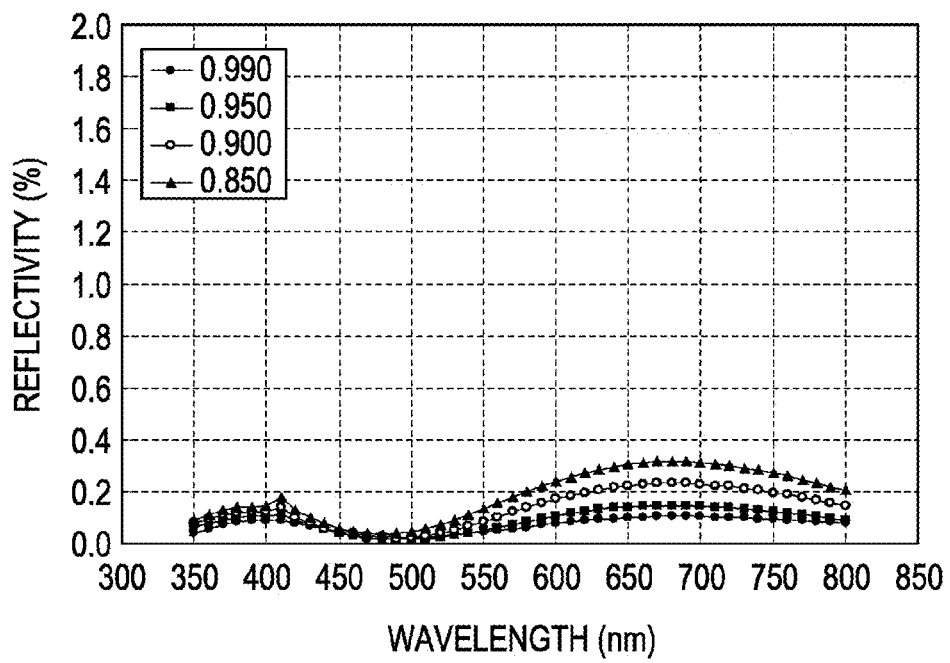
FIG. 32 is a graph showing the results of a simulation of Test Example 2.

Referring to FIG. 32, in the case where the low protruding portions are provided between the structures arranged in the track direction, even when the filling factor decreases, the reflectivity can be reduced to a low level.

Test Example 3

The RCWA simulation was conducted under the conditions below while low protruding portions corresponding to ¼ of the height of the structures were provided between the structures arranged in the track direction, and the height of the structures was changed. The results are shown in FIG. 33.

Shape of structures: Hanging bell shape
Polarization: Non-polarization
Refractive index: 1.48
Track pitch Tp: 320 nm
Bottom surface diameter of structures: 90% of track pitch Tp
Aspect ratio: 0.93, 1.00, 1.14, and 1.30 (depth: 0.270, 0.320, 0.385, and 0.415 µm, respectively)
Arrangement of structures: Hexagonal lattice Test Example 4

Figure 34:
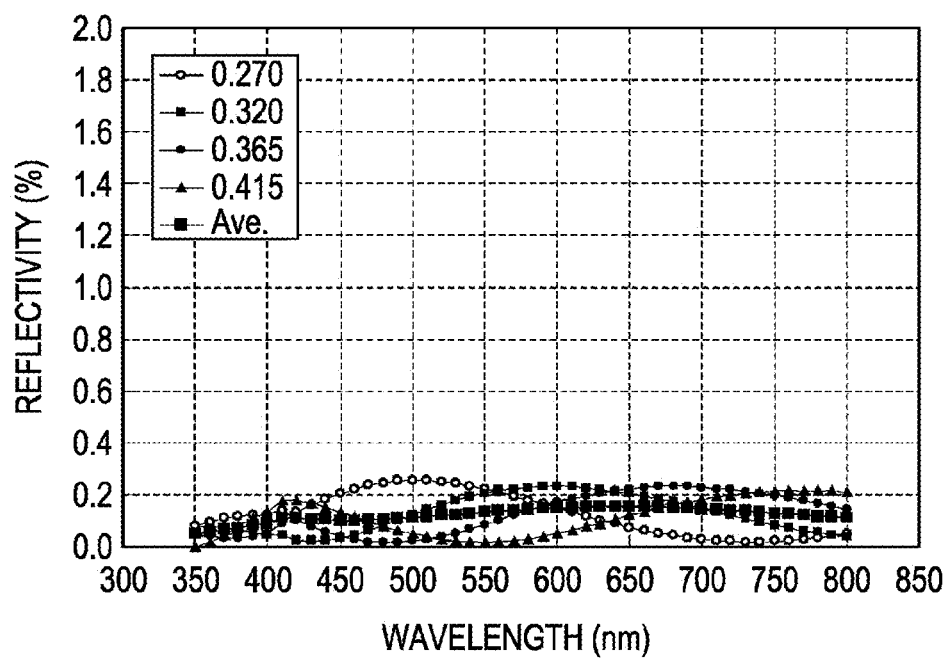
FIG. 34 is a graph showing the results of a simulation of Test Example 4.

FIG. 34 is a graph in which results (Ave.) are added to the graph of Test Example 3, the results being obtained when structures having the respective heights in Test Example 3 are allowed to be present in the same proportion so as to have a depth distribution.

Figure 33:
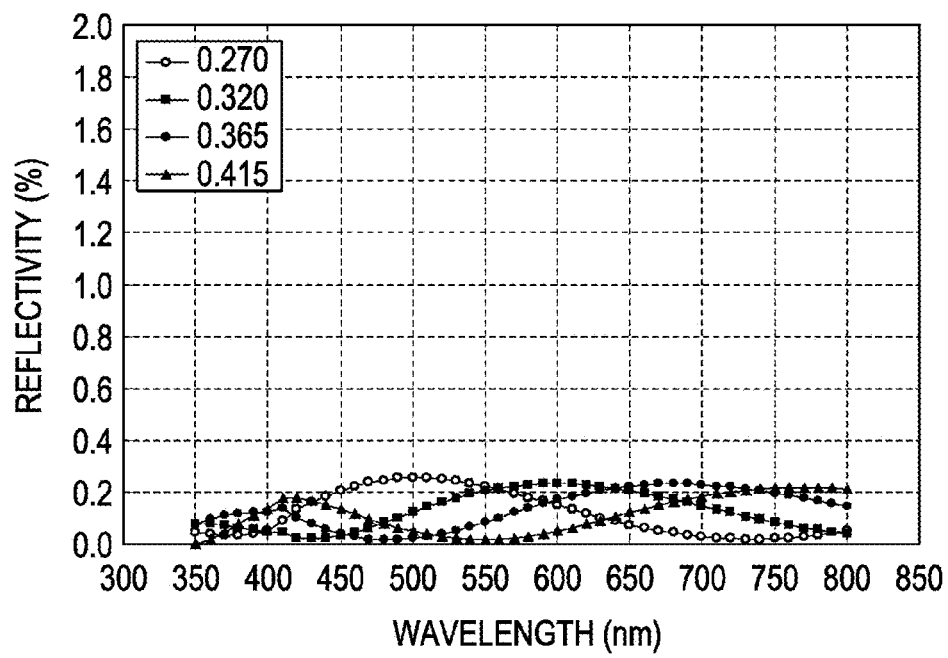
FIG. 33 is a graph showing the results of a simulation of Test Example 3.

Referring to FIGS. 33 and 34, when the low protruding portions are provided between the structures arranged in the track direction and the structures have a height distribution, low reflection characteristics with small wavelength dependence can be obtained.

Test Example 5

Figure 35:
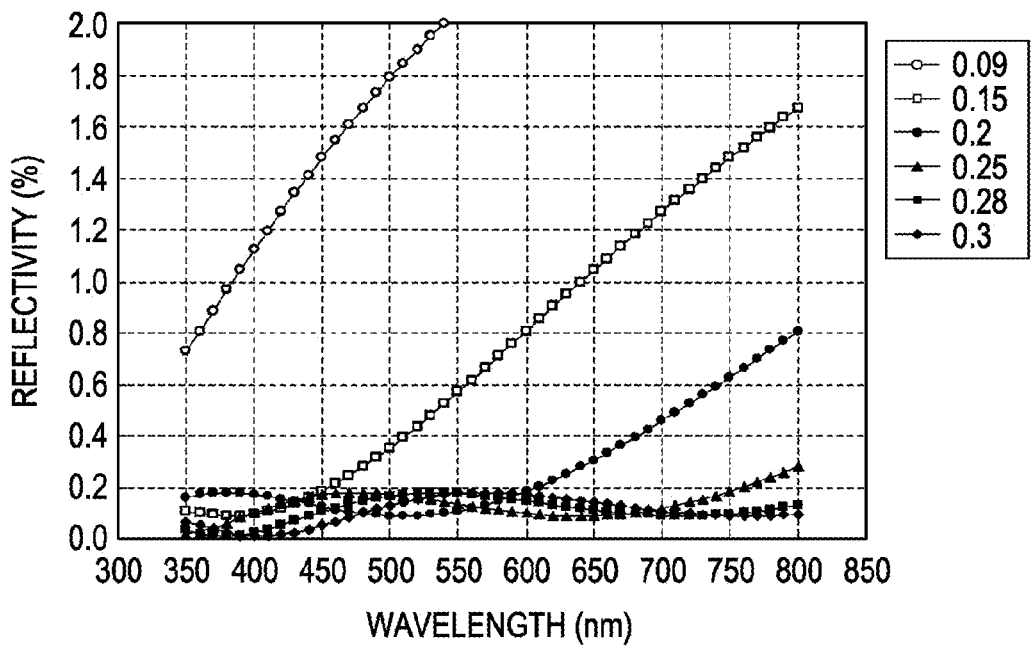
FIG. 35 is a graph showing the results of a simulation of Test Example 5.
Figure 37:
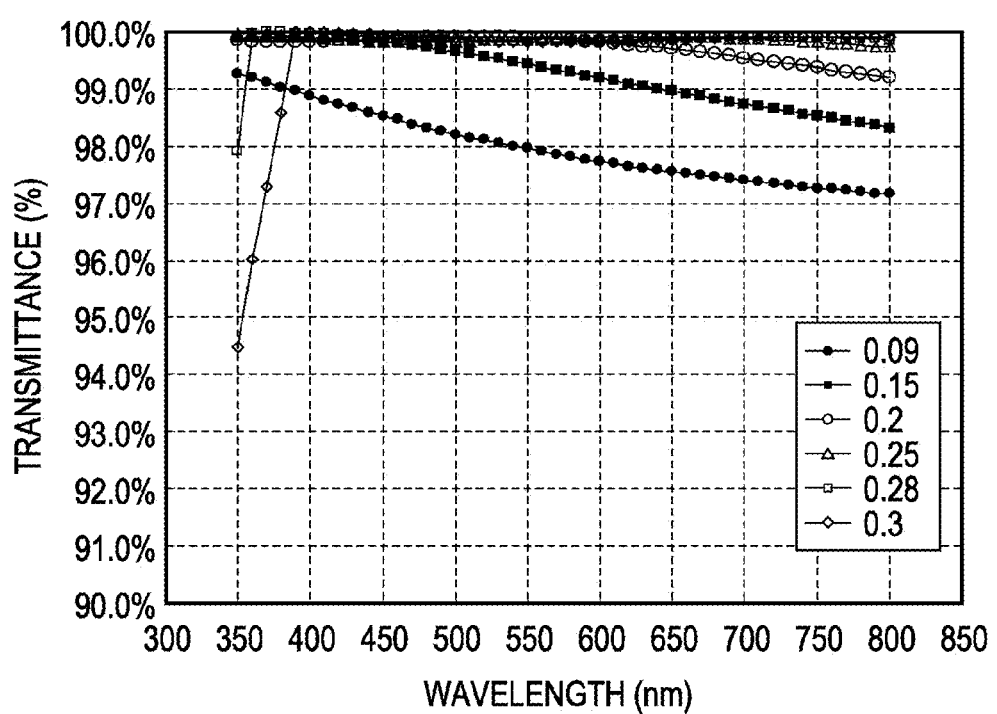
FIG. 37 is a graph showing the results of a simulation of Test Example 5.

The RCWA simulation was conducted while the track pitch was changed. The results are shown in FIGS. 35 and 37.

The conditions for the simulation are described below.
Shape of structures: Hanging bell shape
Polarization: Non-polarization
Lattice arrangement: Hexagonal lattice
Refractive index: 1.48
Track pitch Tp: 0.09 to 0.30 µm Height of structures: 0.09 to 0.30 µm
Aspect ratio: constant at 1.0
Bottom surface diameter of structures: A dimension of 99% of track pitch Tp (filling factor: approximately the maximum)

Test Example 6

The RCWA simulation was conducted as in Test Example 5 except that fine protruding portions were provided around the structures. The results are shown in FIG. 36.

Figure 36:
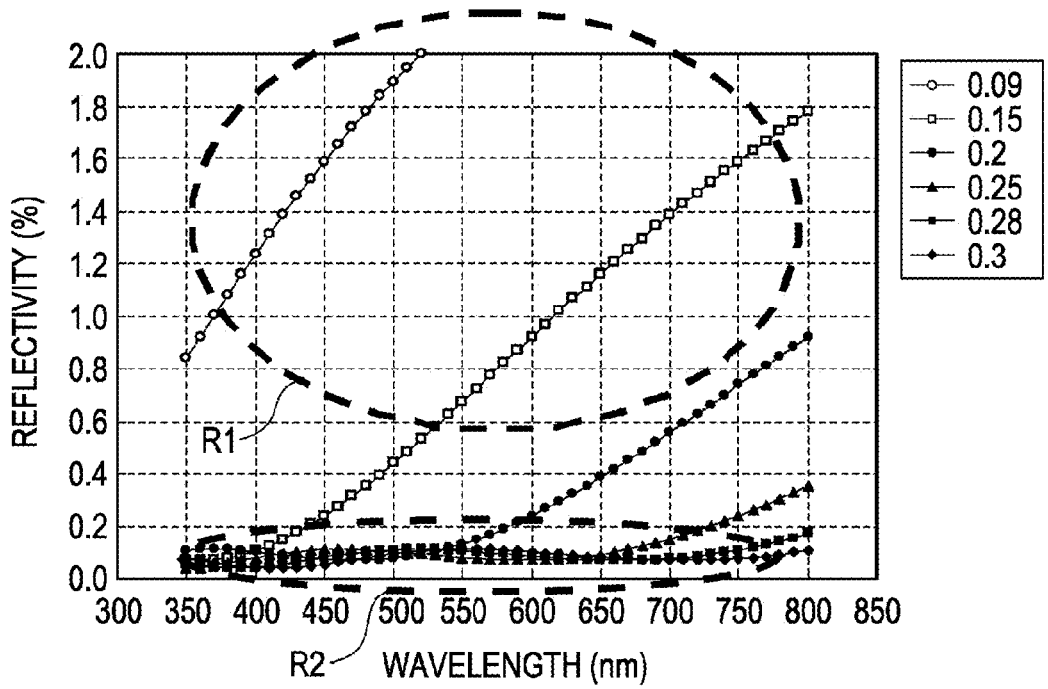
FIG. 36 is a graph showing the results of a simulation of Test Example 6.

Referring to FIGS. 35 and 36, in the case where the fine protruding portions are provided around the structures, when the track pitch Tp is large, the reflectivity tends to decrease, whereas when the structures themselves are small, the reflectivity tends to degrade (in particular, refer to regions R1 and R2 in FIG. 36).

Furthermore, referring to FIG. 37, when the track pitch Tp is 0.3 µm, the suppression of diffraction at a wavelength of 400 nm tends to decrease.

Test Example 7

Figure 38A:
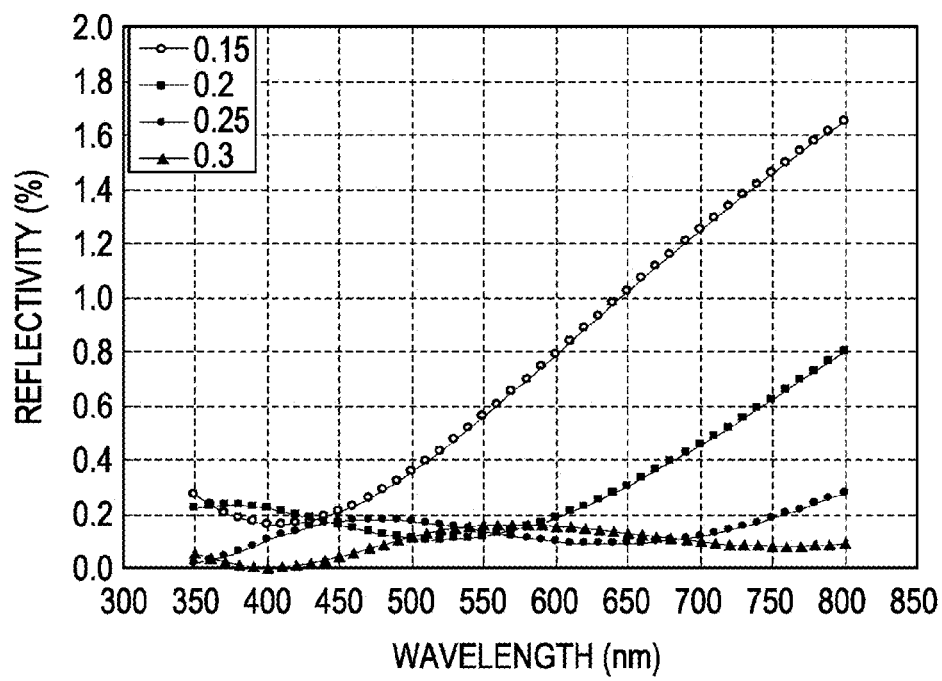
FIG. 38A is a graph showing the results of a simulation of Test Example 7.

The RCWA simulation was conducted while the track pitch was 0.25 µm and the height of structures and the aspect ratio were changed. The results are shown in FIG. 38A.
The conditions for the simulation are described below.
Shape of structures: Hanging bell shape
Polarization: Non-polarization
Lattice arrangement: Hexagonal lattice
Refractive index: 1.48
Track pitch Tp: 0.25 µm
Height of structures: 0.15 nm, 0.2 nm, 0.25 nm, and 0.3 nm
Aspect ratio: 0.6, 0.8, 1.0, and 1.2
Bottom surface diameter of structures: 99% of track pitch Tp Test Example 8

Figure 38B:
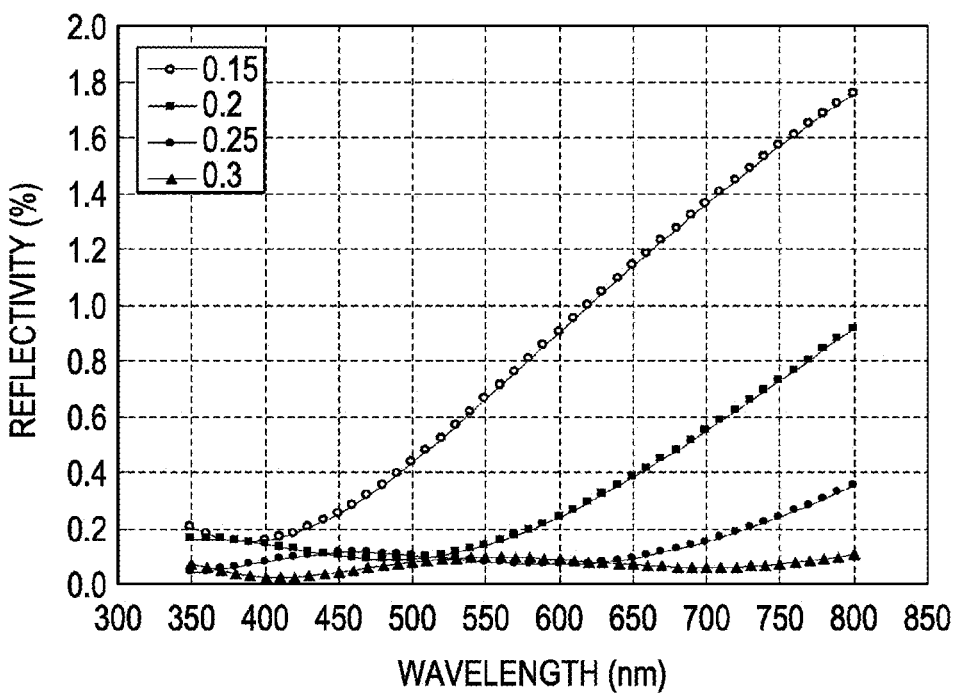
FIG. 38B is a graph showing the results of a simulation of Test Example 8.

The RCWA simulation was conducted as in Test Example 7 except that fine protruding portions were provided around the structures. The results are shown in FIG. 38B.

Test Example 9

Figure 39A:
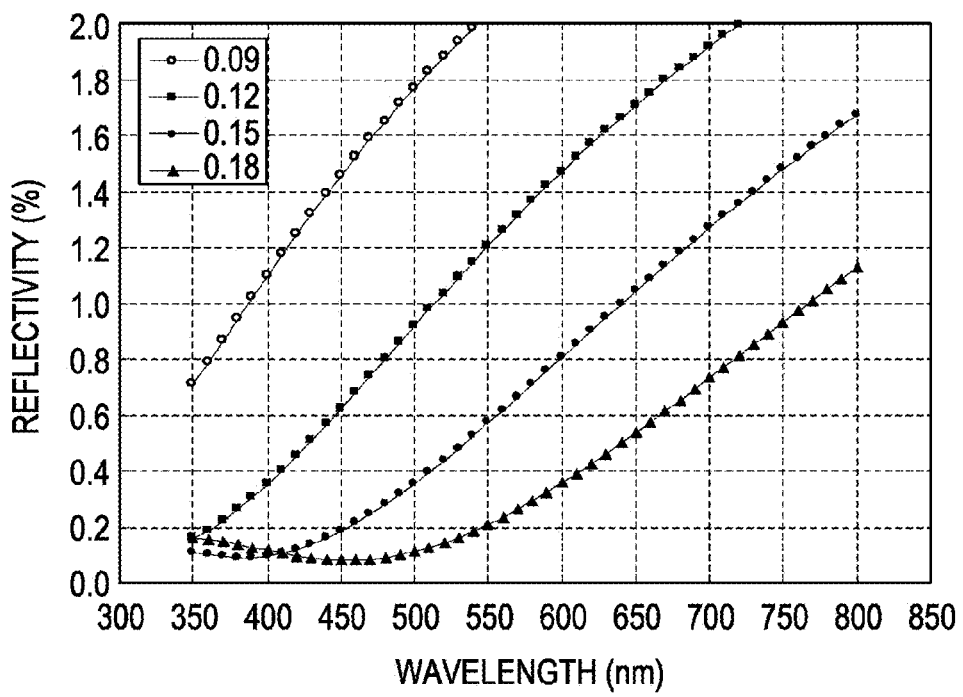
FIG. 39A is a graph showing the results of a simulation of Test Example 9.

The RCWA simulation was conducted as in Test Example 7 except that the track pitch was 0.15 µm, the height of structures was 0.09 µm, 0.12 µm, 0.15 µm, and 0.18 µm, and the aspect ratio was 0.6, 0.8, 1.0, and 1.2, respectively. The results are shown in FIG. 39A.

Test Example 10

Figure 39B:
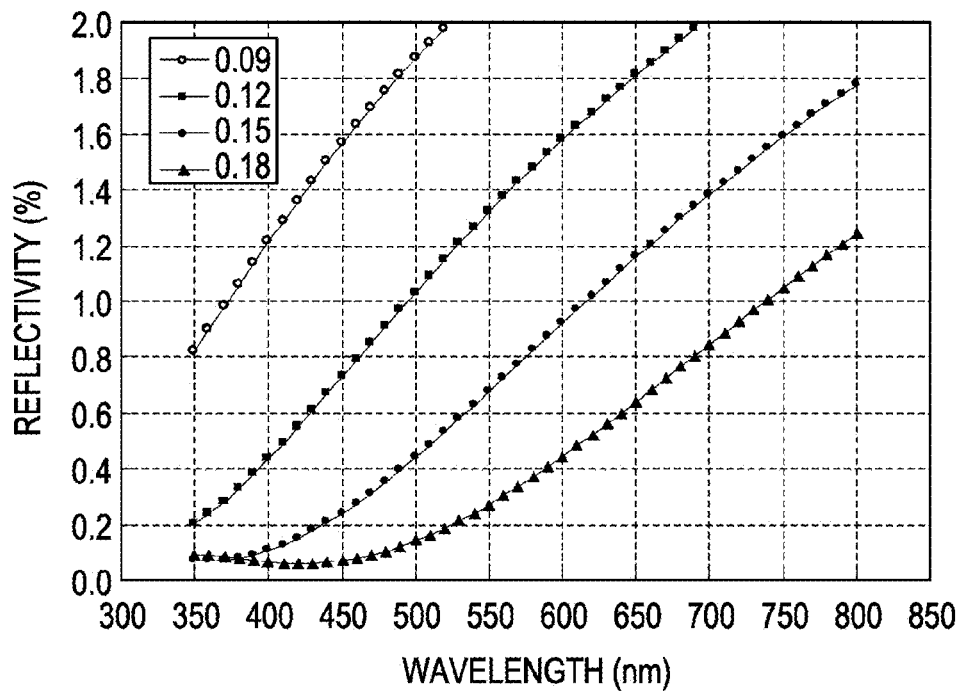
FIG. 39B is a graph showing the results of a simulation of Test Example 10.

The RCWA simulation was conducted as in Test Example 9 except that fine protruding portions were provided around the structures. The results are shown in FIG. 39B.

Test Example 11

Figure 40A:
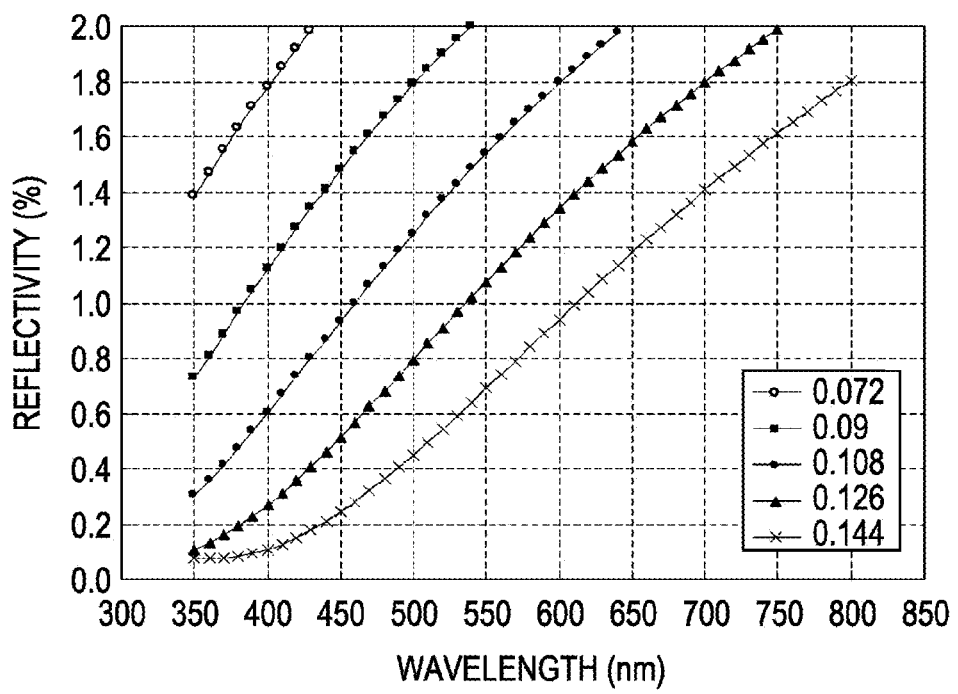
FIG. 40A is a graph showing the results of a simulation of Test Example 11.

The track pitch was 0.09 µm, the height of structures was 0.072 µm, 0.09 µm, 0.108 µm, 0.126 µm, and 0.144 µm, and the aspect ratio was 0.8, 1.0, 1.2, 1.4, and 1.6, respectively. The RCWA simulation was conducted as in Test Example 7 except for this. The results are shown in FIG. 40A.

Test Example 12

Figure 40B:
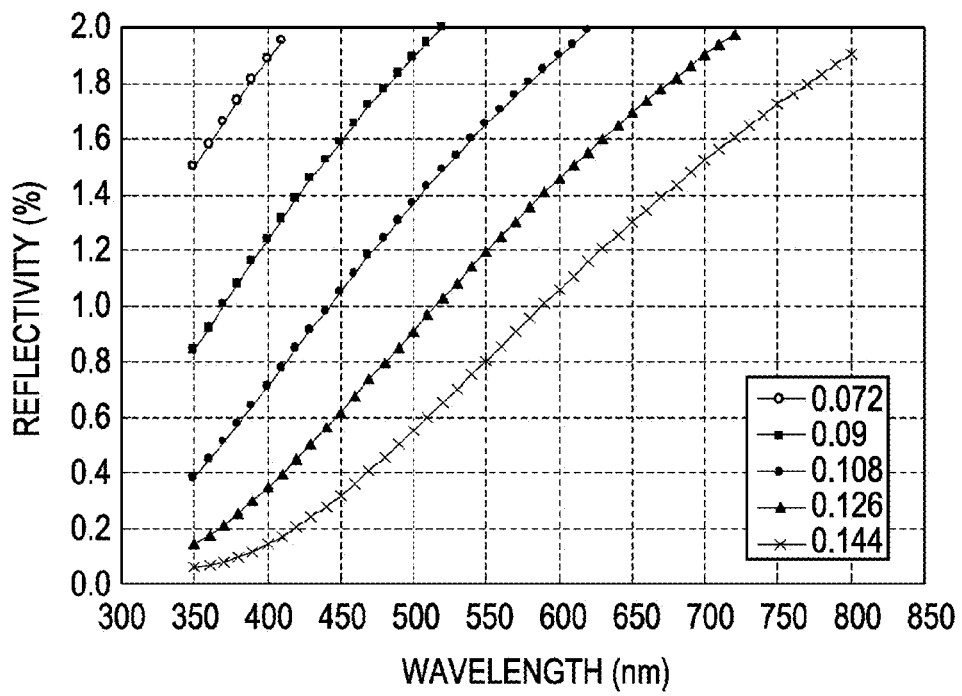
FIG. 40B is a graph showing the results of a simulation of Test Example 12.

The RCWA simulation was conducted as in Test Example 11 except that fine protruding portions were provided around the structures. The results are shown in FIG. 40B.

Referring to FIGS. 38A to 40B, in order to suppress the reflectivity R to about 1% or less, it is believed that the a track pitch Tp of 0.15 µm and an aspect ratio of 1.0 are the limits. Furthermore, it is found that even when the fine protruding portions are provided, the effect of suppressing the reflectivity tends to decrease in a case of a small track pitch Tp.

Next, the relationship among the ratio ($(2r/P1)\times100$), the ratio ($((2\times2r)/P1)\times100$) and anti-reflection characteristics was examined by a rigorous coupled-wave analysis (RCWA) simulation.

Test Example 13

Figure 41A:
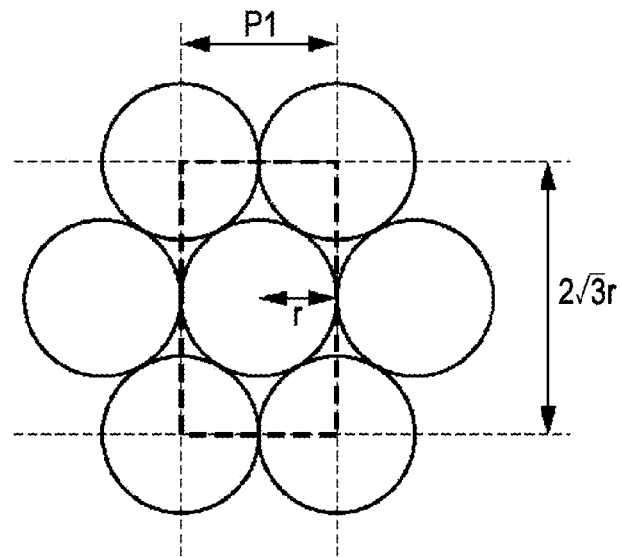
FIG. 41A is a view for explaining a filling factor when structures are arranged in a hexagonal lattice pattern.

FIG. 41A is a view for explaining a filling factor when structures are arranged in a hexagonal lattice pattern. In the case where the structures are arranged in the hexagonal lattice pattern as shown in FIG. 41A, filling factors when the ratio ($(2r/P1)\times100$) (wherein P1 represents an arrangement pitch of structures in the same track and r represents the radius of the bottom surface of each of the structures) was changed were determined by formula (3) below.

$$\text{Filling factor}=(S(\text{hex.})/S(\text{unit}))\times100 \quad (3)$$

Area of unit cell: $S(\text{unit})=2r\times(2\sqrt{3})r$
Area of bottom surfaces of structures present in unit cell: $S(\text{hex.})=2\times\pi r^2$
(However, when $2r>P1$, these areas are determined on the basis of the drawing.)
For example, when the arrangement pitch $P1=2$ and the radius r of the bottom surface of each of the structures=1, $S(\text{unit})$, $S(\text{hex.})$, the ratio ($(2r/P1)\times100$), and the filling factor are the values below.
$S(\text{unit})=6.9282$
$S(\text{hex.})=6.28319$ $(2r/P1)\times100=100.0\%$ $\text{Filling factor}=(S(\text{hex.})/S(\text{unit}))\times100=90.7\%$ Table 6 shows the relationship between the filling factor determined by formula (3) above and the ratio ($(2r/P1)\times100$).

TABLE 6

| $(2r/P1) \times 100$ | Filling factor |
|---|---|
| 115.4% | 100.0% |
| 110.0% | 95.6% |
| 105.0% | 92.5% |
| 100.0% | 90.7% |
| 99.0% | 88.9% |
| 95.0% | 81.8% |
| 90.0% | 73.5% |
| 85.0% | 65.5% |
| 80.0% | 58.0% |
| 75.0% | 51.0% |

Test Example 14

Figure 41B:
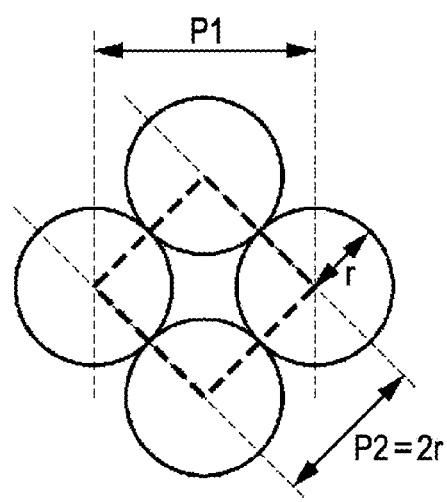
FIG. 41B is a view for explaining a filling factor when structures are arranged in a tetragonal lattice pattern.

FIG. 41B is a view for explaining a filling factor when structures are arranged in a tetragonal lattice pattern. In the case where the structures are arranged in the tetragonal lattice pattern as shown in FIG. 41B, filling factors when the ratio $(((2\times2r)/P1)\times100)$ and the ratio $((2r/P2)\times100)$ (wherein P1 represents an arrangement pitch of structures in the same track, P2 represents an arrangement pitch in a direction of 45 degrees with respect to the tracks, and r represents the radius of the bottom surface of each of the structures) were changed were determined by formula (4) below.

Filling factor=$(S(\text{tetra})/S(\text{unit}))\times100$      (4)

Area of unit cell: $S(\text{unit})=2r\times2r$
Area of bottom surfaces of structures present in unit cell: $S(\text{tetra})=\pi r^2$
(However, when 2r>P1, these areas are determined on the basis of the drawing.)

FIG. 41B is a view for explaining a filling factor when structures are arranged in a tetragonal lattice pattern. In the case where the structures are arranged in the tetragonal lattice pattern as shown in FIG. 41B, filling factors when the ratio $(((2\times2r)/P1)\times100)$ and the ratio $((2r/P2)\times100)$ (wherein P1 represents an arrangement pitch of structures in the same track, P2 represents an arrangement pitch in a direction of 45 degrees with respect to the tracks, and r represents the radius of the bottom surface of each of the structures) were changed were determined by formula (4) below.

Filling factor=$(S(\text{tetra})/S(\text{unit}))\times100$      (4)

Area of unit cell: $S(\text{unit})=2r\times2r$
Area of bottom surfaces of structures present in unit cell: $S(\text{tetra})=\pi r^2$
(However, when 2r>P1, these areas are determined on the basis of the drawing.)

For example, when the arrangement pitch P2=2 and the radius r of the bottom surface of each of the structures=1, S(unit), S(tetra), the ratio $(((2\times2r)/P1)\times100)$, the ratio $((2r/P2)\times100)$, and the filling factor are the values below.

S(unit)=4
S(tetra)=3.14159

$((2\times2r)/P1)\times100=141.4\%$ $(2r/P2)\times100=100.0\%$

Filling factor=$(S(\text{tetra})/S(\text{unit}))\times100=78.5\%$

Table 7 shows the relationship among the filling factor determined by formula (4) above, the ratio $(((2\times2r)/P1)\times100)$, and the ratio $((2r/P2)\times100)$.

In addition, the relationship between the arrangement pitch P1 and the arrangement pitch P2 of the tetragonal lattice is represented by $P1=\sqrt{2}\times P2$.

TABLE 7

| $((2\times2r)/P1)\times100$ | $(2r/P2)\times100$ | Filling factor |
|---|---|---|
| 200.0% | 141.4% | 100.0% |
| 169.7% | 120.0% | 95.1% |
| 162.6% | 115.0% | 92.4% |
| 155.6% | 110.0% | 88.9% |
| 148.5% | 105.0% | 84.4% |
| 141.4% | 100.0% | 78.5% |
| 140.0% | 99.0% | 77.0% |
| 134.4% | 95.0% | 70.9% |
| 127.3% | 90.0% | 63.6% |
| 120.2% | 85.0% | 56.7% |
| 113.1% | 80.0% | 50.3% |
| 106.1% | 75.0% | 44.2% |

Test Example 15

Figure 42:
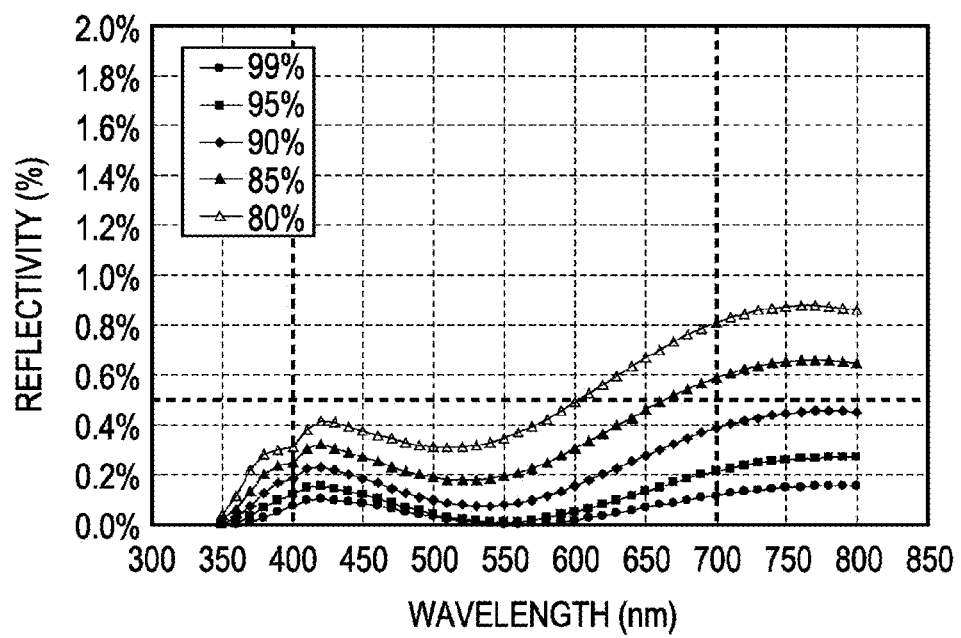
FIG. 42 is a graph showing the results of a simulation of Test Example 15.

The reflectivity was determined by a simulation under the conditions below while the ratio $((2r/P1)\times100)$ of the diameter 2r of the bottom surface of each of the structures to the arrangement pitch P1 was made to be 80%, 85%, 90%, 95%, and 99%. A graph of the results is shown in FIG. 42.

Shape of structures: Hanging bell shape
Polarization: Non-polarization
Refractive index: 1.48
Arrangement pitch P1: 320 nm
Height of structures: 415 nm
Aspect ratio: 1.30
Arrangement of structures: Hexagonal lattice Referring to FIG. 42, when the ratio $((2r/P1)\times100)$ is 85% or more, the average reflectivity R satisfies R<0.5% in the wavelength range (400 to 700 nm) of visible light. The filling factor of the bottom surface in this case is 65% or more. Furthermore, when the ratio $((2r/P1)\times100)$ is 90% or more, the average reflectivity R satisfies R<0.3% in the wavelength range of visible light. Thus, an anti-reflection effect with higher performance can be obtained. The filling factor of the bottom surface in this case is 73% or more. With an increase in the filling factor up to the upper limit of 100%, the performance also improves. When the structures overlap each other, a height from the lowest position is considered to be as the height of the structures. Furthermore, it was also confirmed that similar tendencies of the filling factor and the reflectivity were observed in a tetragonal lattice.

Examples of the present invention have been described using anti-reflection substrates, but the examples described above can be variously changed on the basis of the technical idea of the present invention.

While the embodiments and examples of the present invention have been specifically described, the present invention is not limited to the foregoing embodiments and examples. Various changes can be made on the basis of the technical idea of the present invention.

For example, the structures, methods, shapes, materials, numerical values, and the like described in the embodiments and examples described above are merely exemplary, and other structures, methods, shapes, materials, numerical values, and the like, all of which are different from the above, may be used if necessary.

Furthermore, the structures of the embodiments described above can be combined with each other without departing from the gist of the present invention.

In the embodiments described above, the case where the present invention is applied to liquid crystal display apparatuses has been described as an example. However, the present invention is also applicable to various display apparatuses other than liquid crystal display apparatuses. For example, the present invention is also applicable to various display apparatuses such as cathode ray tube (CRT) displays, plasma display panels (PDPs), electro luminescence (EL) displays, and surface-conduction electron-emitter displays (SEDs).

Furthermore, in the embodiments described above, the case where the present invention is applied to a polarizer to produce a polarizer having an anti-reflection function has been described as an example. However, the present invention is not limited to this example. Optical components having an anti-reflection function can be produced by applying the present invention to a lens, a light guide plate, a window material, a display element, a camera lens barrel, or the like, besides a polarizer. In addition, the present invention is applicable to components other than optical components. For example, the present invention is applicable to solar cells.

Alternatively, in the embodiments described above, a function of preventing peeping may be imparted to an optical element by generating diffracted light from the front to an oblique direction by appropriately changing the pitch of structures.

Furthermore, in the embodiments described above, a low-refractive-index layer may further be provided on a surface of a base, the surface having structures thereon. The low-refractive-index layer preferably contains, as a main component, a material having a refractive index lower than the material constituting the base and the structures. Examples of the material of such a low-refractive-index layer include organic materials such as fluorine-based resins and inorganic low-refractive-index materials such as LiF and $MgF_2$.

Furthermore, in the embodiments described above, the case where an optical element is produced using a photosensitive resin has been described as an example. However, the method for producing an optical element is not limited to this example. For example, an optical element may be produced by thermal transfer or injection molding.

Furthermore, in the embodiments described above, the case where recessed or projecting structures are formed on the outer peripheral surface of a columnar or cylindrical master has been described as an example. Alternatively, when the master has a cylindrical shape, recessed or projecting structures may be formed on the inner peripheral surface of the master.

Furthermore, in the embodiments described above, the case where a corona treatment or a plasma treatment is used as a surface treatment has been described as an example. However, the method of the surface treatment is not limited thereto. Alternatively, an atmospheric-pressure glow discharge, an ultraviolet treatment, an electron-beam treatment, a UV-ozone treatment, a flame treatment, or the like may also be used.

In the embodiments described above, configurations in which a plurality of structures are arranged in a hexagonal lattice pattern, a quasi-hexagonal lattice pattern, a tetragonal lattice pattern, or a quasi-tetragonal lattice pattern have been described as examples. However, the arrangement form of the structures is not limited to these examples and can be adequately selected in accordance with desired optical characteristics or the like. For example, the structures may be arranged in a polygonal lattice pattern (e.g., a triangle pattern, or an octagonal pattern) other than a hexagonal lattice pattern and a tetragonal lattice pattern. Alternatively, the structures may be arranged in a quasi-polygonal lattice pattern other than a quasi-hexagonal lattice pattern and a quasi-tetragonal lattice pattern. Here, the quasi-polygonal lattice pattern refers to a distorted regular polygonal lattice pattern unlike a regular polygonal lattice pattern. In addition, the arrangement form of the structures is not limited to a regular pattern. Alternatively, the arrangement form may be a random pattern.

In the embodiments described above, configurations in which the structures each have an elliptical cone shape or a truncated elliptical cone shape have been described as examples. However, the shape of the structures is not limited thereto and can be adequately selected in accordance with desired optical characteristics or the like. For example, each of the structures may have a pyramid shape such as a quadrangular pyramid shape.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element having an anti-reflection function, comprising:
   a base having a main surface; and
   a plurality of projecting or recessed structures arranged on the main surface of the base at a fine pitch equal to or less than the wavelength of visible light,
   wherein the main surface of the base, the main surface having the structures thereon, has hydrophilicity,
   a contact angle of the main surface of the base, the main surface having the structures thereon, to pure water is 30° or less, and
   a contact angle of the main surface of the base, the main surface having the structures thereon, to oleic acid is 30° or less.

2. The optical element according to claim 1,
   wherein the contact angle of the main surface of the base, the main surface having the structures thereon, to pure water is 10.6° or more and 30° or less.

3. The optical element according to claim 1,
   the contact angle of the main surface of the base, the main surface having the structures thereon, to oleic acid is 5° or more and 30° or less.

4. The optical element according to claim 1,
   the contact angle of the main surface of the base, the main surface having the structures thereon, to pure water is 10.6° or more and 30° or less, and
   the contact angle of the main surface of the base, the main surface having the structures thereon, to oleic acid is 5° or more and 30° or less.

5. The optical element according to claim 1,
   wherein the structures each have an elliptical cone shape or a truncated elliptical cone shape, the major axis direction of which is a direction in which the tracks extend.

6. The optical element according to claim 1,
   wherein the structures are arranged so as to form a plurality of rows of tracks on the main surface of the base and form a hexagonal lattice pattern, a quasi-hexagonal lattice pattern, a tetragonal lattice pattern, or a quasi-tetragonal lattice pattern.

7. The optical element according to claim 1, wherein a filling factor of the structures to the main surface of the base is 65% or more.

8. The optical element according to claim 6,
   wherein the structures are arranged so as to form a plurality of rows of linear tracks and form a quasi-hexagonal lattice pattern, and
   an average difference between a maximum height and a minimum depth between adjacent structures in the direction in which the tracks extend is smaller than an average difference between a maximum height and a minimum depth between adjacent structures in a row direction of the tracks.

9. The optical element according to claim 6,
   wherein the structures are arranged so as to form a plurality of rows of linear tracks and form a tetragonal lattice pattern or a quasi-tetragonal lattice pattern, and
   an average difference between a maximum height and a minimum depth between adjacent structures in an arrangement direction that is slanted with respect to the direction in which the tracks extend is smaller than an average difference between a maximum height and a minimum depth between adjacent structures in the direction in which the tracks extend.

10. The optical element according to claim 6, wherein an arrangement pitch P1 of the structures in the same track is longer than an arrangement pitch P2 of the structures between two adjacent tracks.

11. The optical element according to claim 6,
wherein the structures form a hexagonal lattice pattern or a quasi-hexagonal lattice pattern on the main surface of the base, and
when an arrangement pitch of the structures in the same track is represented by P1 and an arrangement pitch of the structures between two adjacent tracks is represented by P2, the ratio P1/P2 satisfies the relationship 1.00≤P1/P2≤1.1 or 1.00<P1/P2≤1.1.

12. The optical element according to claim 6,
wherein the structures form a tetragonal lattice pattern or a quasi-tetragonal lattice pattern on the main surface of the base, and
when an arrangement pitch of the structures in the same track is represented by P1 and an arrangement pitch of the structures between two adjacent tracks is represented by P2, the ratio P1/P2 satisfies the relationship 1.4<P1/P2≤1.5.

13. A display apparatus comprising:
an optical element having an anti-reflection function, comprising:
a base having a main surface; and
a plurality of projecting or recessed structures arranged on the main surface of the base at a fine pitch equal to or less than the wavelength of visible light,
wherein the main surface of the base, the main surface having the structures thereon, has hydrophilicity,
a contact angle of the main surface of the base, the main surface having the structures thereon, to pure water is 30° or less, and
a contact angle of the main surface of the base, the main surface having the structures thereon, to oleic acid is 30° or less.

14. A method for producing an optical element having an anti-reflection function, the method comprising:
forming a plurality of projecting or recessed structures arranged on a main surface of a base at a fine pitch equal to or less than the wavelength of visible light by transferring recesses and projections formed on a surface of a master to a transfer material; and
wherein the main surface of the base, the main surface having the structures thereon, has hydrophilicity,
a contact angle of the main surface of the base, the main surface having the structures thereon, to pure water is 30° or less, and
a contact angle of the main surface of the base, the main surface having the structures thereon, to oleic acid is 30° or less.

* * * * *